United States Patent
McAlister

(10) Patent No.: US 9,341,152 B2
(45) Date of Patent: May 17, 2016

(54) INTEGRATED FUEL INJECTORS AND IGNITERS AND ASSOCIATED METHODS OF USE AND MANUFACTURE

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

(*) Notice: Subject to any disclaimer, the term of this patent is extended or adjusted under 35 U.S.C. 154(b) by 0 days.

(21) Appl. No.: 14/054,565

(22) Filed: Oct. 15, 2013

(65) Prior Publication Data
US 2014/0263697 A1    Sep. 18, 2014

Related U.S. Application Data

(60) Continuation of application No. 12/841,170, filed on Jul. 21, 2010, now Pat. No. 8,555,860, which is a continuation-in-part of application No. 12/581,825, filed on Oct. 19, 2009, now Pat. No. 8,297,254, which is a division of application No. 12/006,774, filed on Jan. 7, 2008, now Pat. No. 7,628,137, said application No. 12/841,170 is a continuation-in-part of application No. 12/653,085, filed on Dec. 7, 2009, now Pat. No.
(Continued)

(51) Int. Cl.
| | |
|---|---|
| *F02M 45/06* | (2006.01) |
| *F02M 45/08* | (2006.01) |
| *F02M 61/04* | (2006.01) |
| *F02M 57/00* | (2006.01) |
| *F02M 57/06* | (2006.01) |
| *F02M 51/06* | (2006.01) |

(Continued)

(52) U.S. Cl.
CPC ........... *F02M 45/086* (2013.01); *F02D 19/027* (2013.01); *F02M 21/0206* (2013.01); *F02M 21/0227* (2013.01); *F02M 21/0254* (2013.01); *F02M 21/0269* (2013.01); *F02M 21/0275* (2013.01); *F02M 51/0625* (2013.01); *F02M 51/0671* (2013.01); *F02M 57/005* (2013.01); *F02M 57/06* (2013.01); *F02M 61/047* (2013.01); *F02B 2075/125* (2013.01); *F02M 2200/26* (2013.01); *H01M 8/04089* (2013.01); *H01M 8/04186* (2013.01); *Y02P 70/56* (2015.11); *Y02T 10/123* (2013.01); *Y02T 10/32* (2013.01); *Y02T 10/36* (2013.01)

(58) Field of Classification Search
CPC .......... F02M 51/0671; F02M 2200/26; F02M 45/086; F02M 61/047
USPC ......... 123/490, 499, 297, 298, 467, 468, 469, 123/470; 239/585.1, 533.13, 533.14
See application file for complete search history.

(56) References Cited

U.S. PATENT DOCUMENTS 5,738,283 A * 4/1998 Potz et al. .................. 239/533.3
6,318,646 B1 * 11/2001 Mattioli et al. ............ 239/585.1
(Continued)

*Primary Examiner* — Mahmoud Gimie
(74) *Attorney, Agent, or Firm* — Perkins Coie LLP

(57) ABSTRACT

The present disclosure is directed to integrated injector/igniters providing efficient injection, ignition, and complete combustion of various types of fuels. One example of such an injectors/igniter can include a body having a base portion opposite a nozzle portion, and a fuel passageway extending from the base portion to the nozzle portion. A force generator and a first valve are carried by the base portion. The first valve is movable in response to actuation from the force generator to move between closed and open positions. The injector/igniter also includes a second valve at the nozzle portion that is deformable in response to pressure in the fuel passageway to deform between a closed position and an open position.

20 Claims, 39 Drawing Sheets

Related U.S. Application Data 8,635,985, which is a continuation-in-part of application No. 12/006,774, filed on Jan. 7, 2008, now Pat. No. 7,628,137, said application No. 12/841,170 is a continuation-in-part of application No. PCT/US2009/067044, filed on Dec. 7, 2009.

(60) Provisional application No. 61/237,425, filed on Aug. 27, 2009, provisional application No. 61/237,479, filed on Aug. 27, 2009, provisional application No. 61/237,466, filed on Aug. 27, 2009, provisional application No. 61/304,403, filed on Feb. 13, 2010, provisional application No. 61/312,100, filed on Mar. 9, 2010.

(51) Int. Cl.
    *F02M 21/02* (2006.01)
    *F02D 19/02* (2006.01)
    *F02B 75/12* (2006.01)
    *H01M 8/04* (2016.01)

(56) References Cited

U.S. PATENT DOCUMENTS

| | | | |
|---|---|---|---|
| 6,748,918 B2* | 6/2004 | Rieger et al. | 123/297 |
| 2004/0061006 A1* | 4/2004 | Petrone et al. | 239/585.1 |
| 2007/0108317 A1* | 5/2007 | Boecking | 239/533.12 |

* cited by examiner

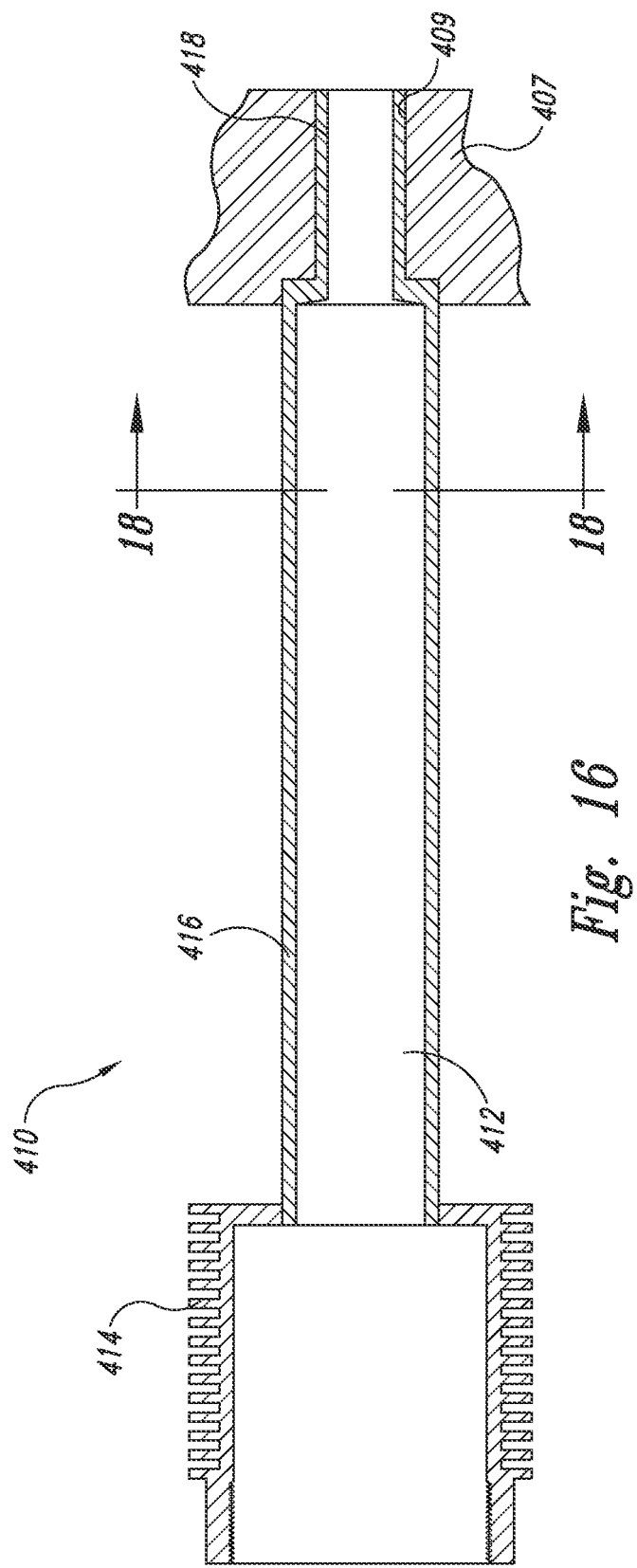

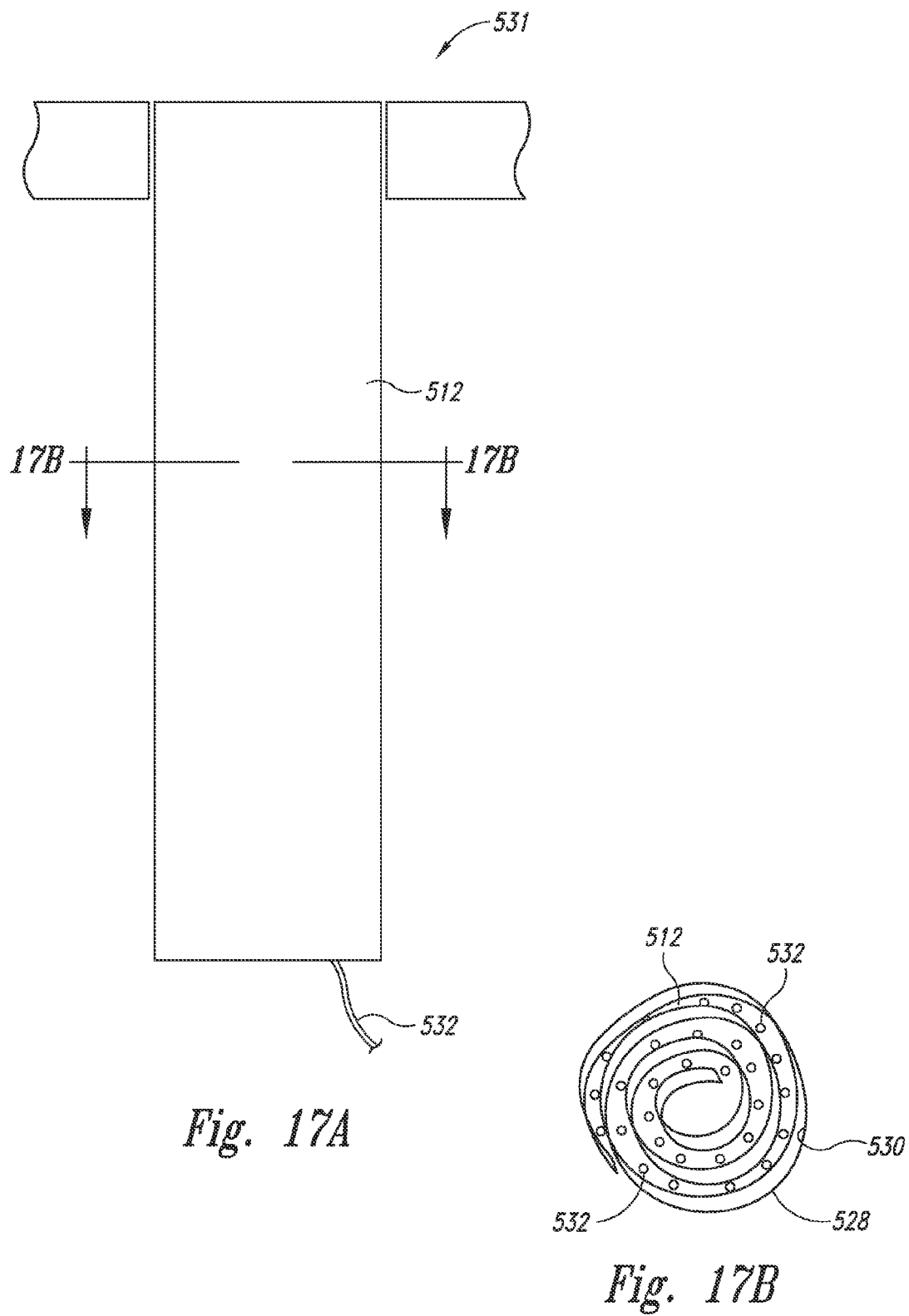

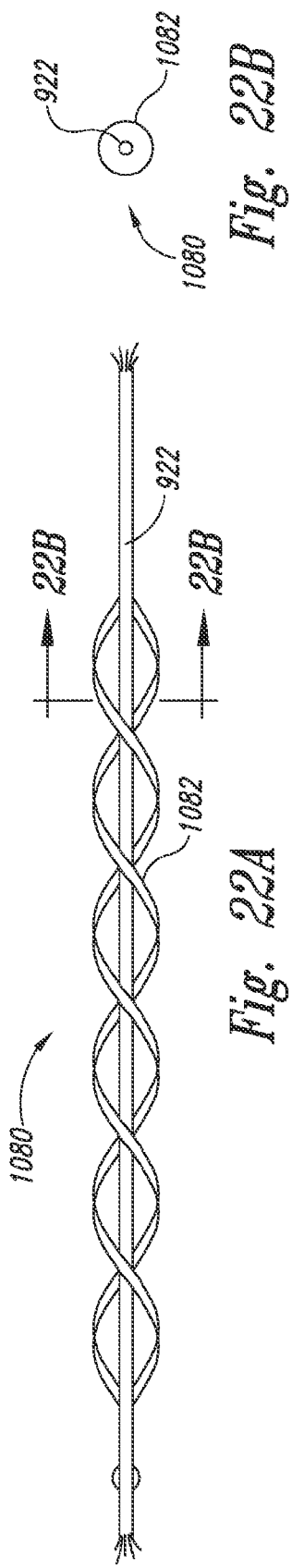
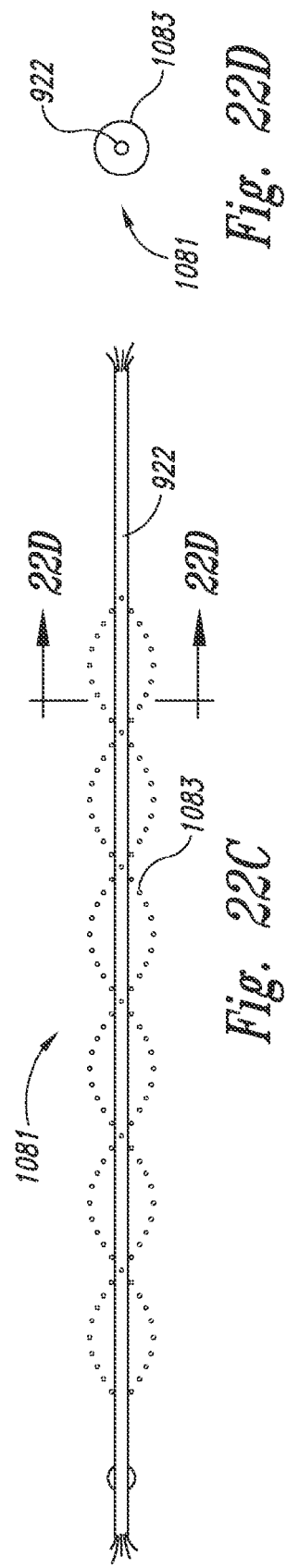
Fig. 22A
Fig. 22B
Fig. 22C
Fig. 22D

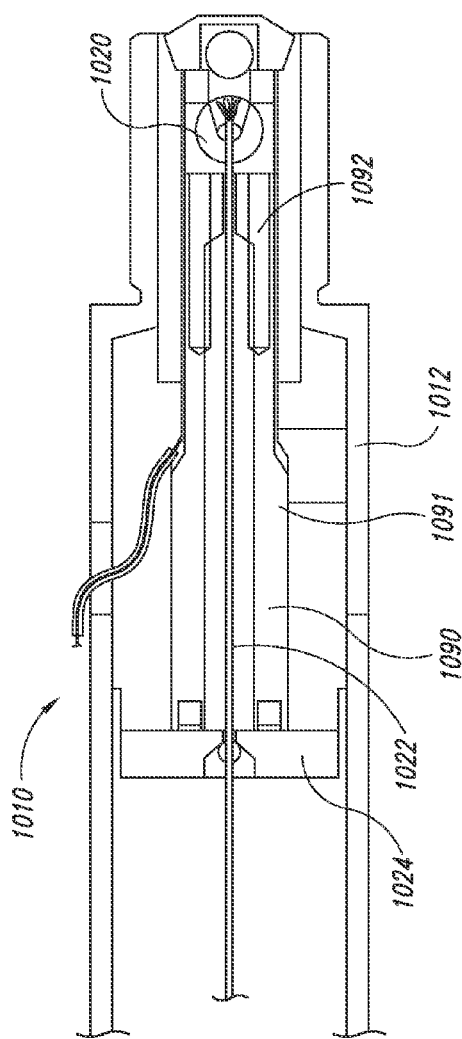
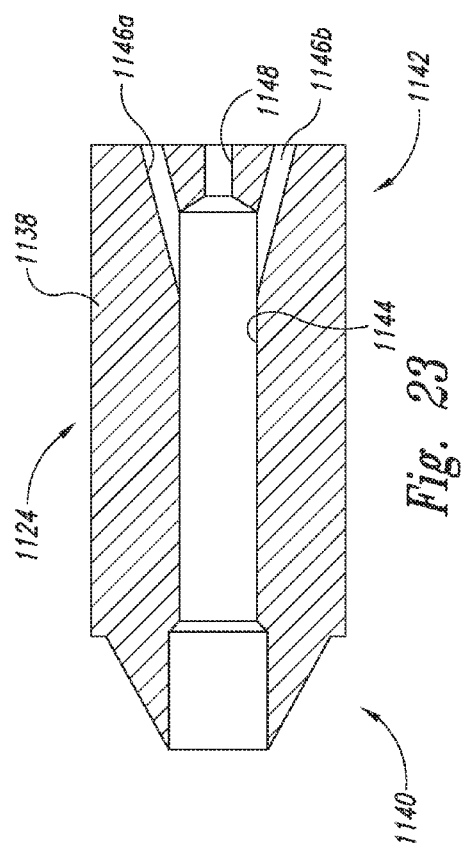

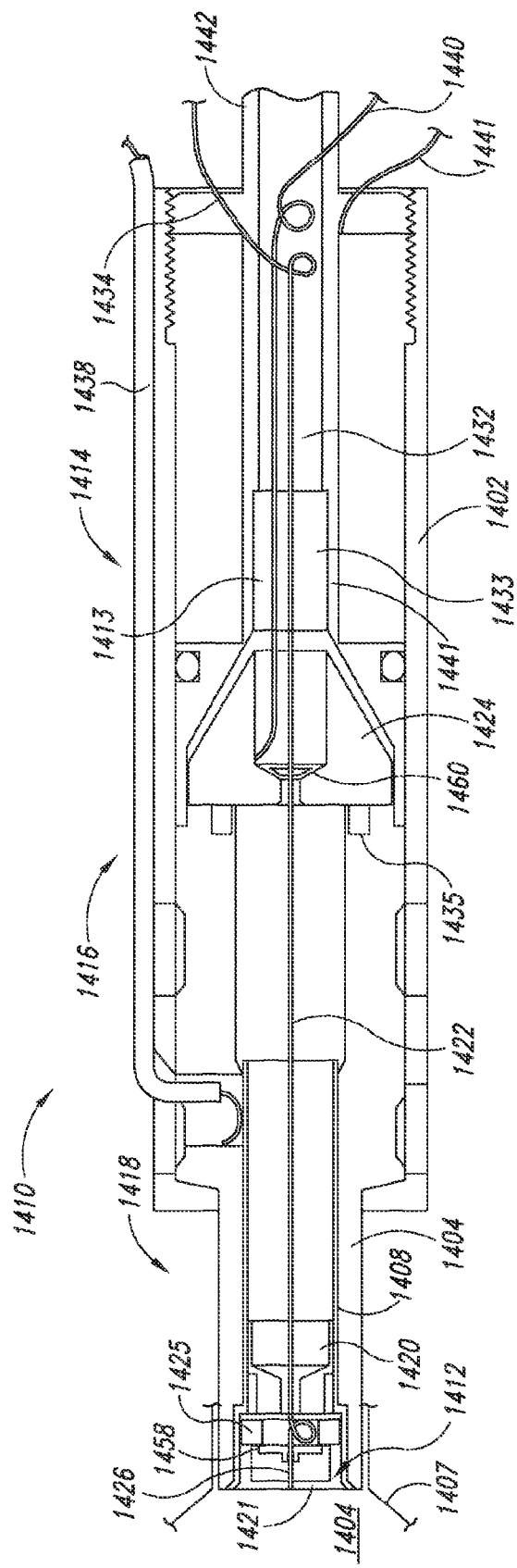
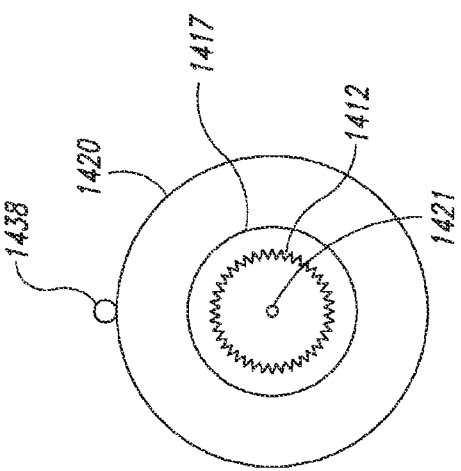
Fig. 26A
Fig. 26B

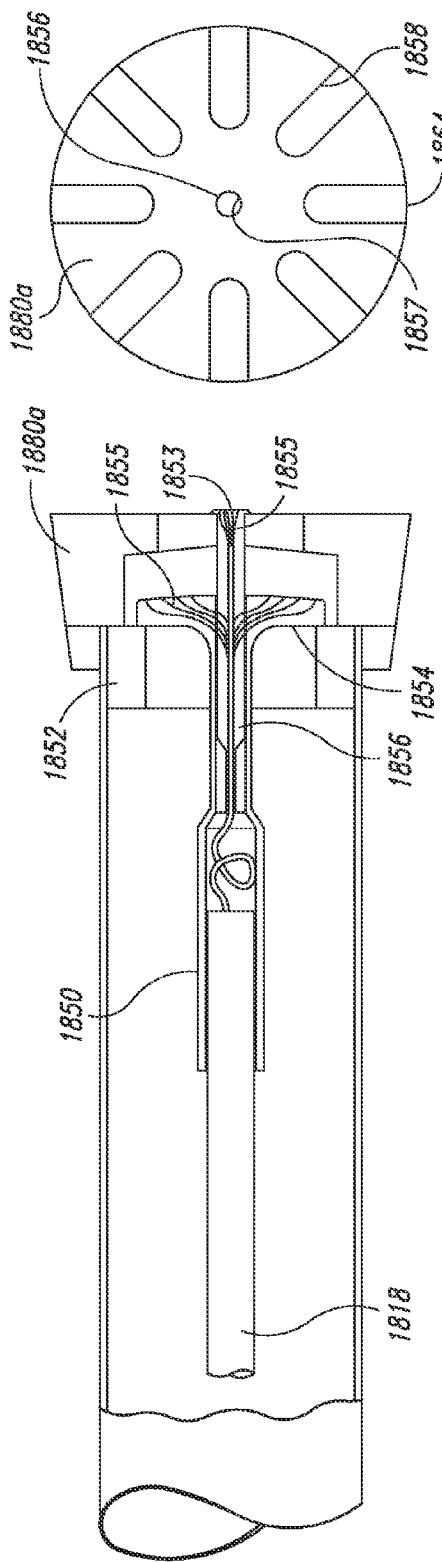
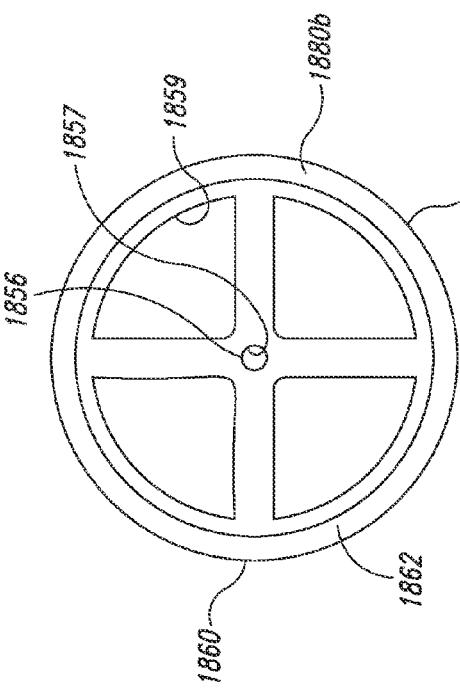
Fig. 30A
Fig. 30B
Fig. 30C

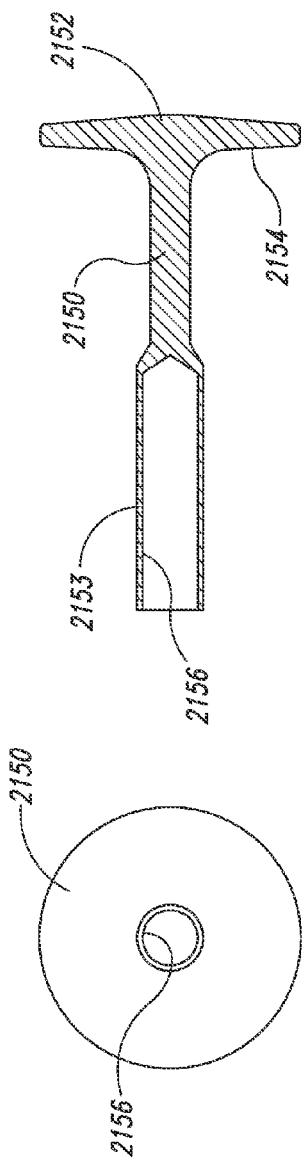
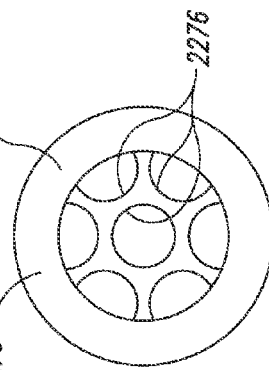
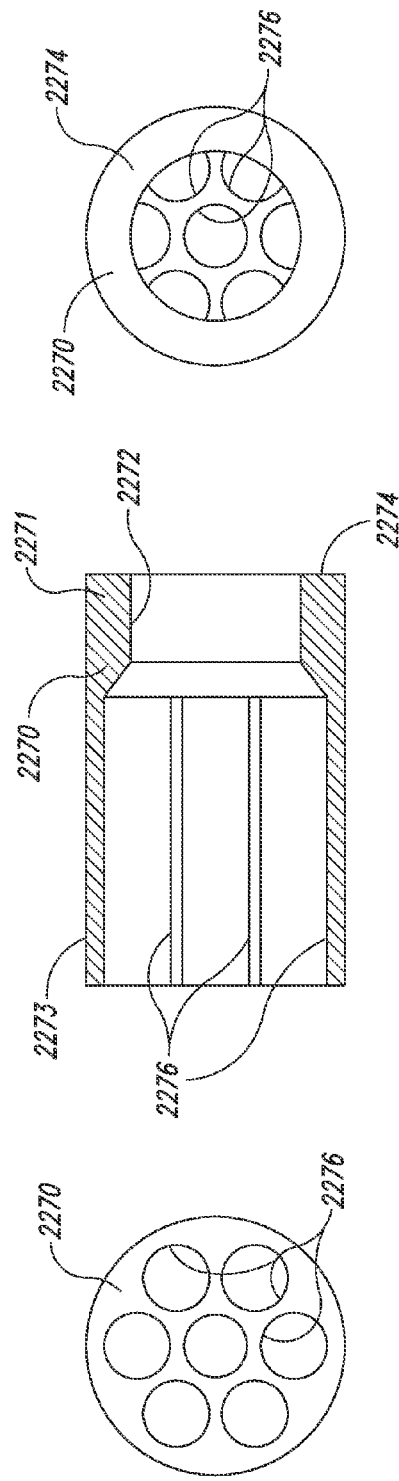
Fig. 33A
Fig. 33B
Fig. 34A
Fig. 34B
Fig. 34C

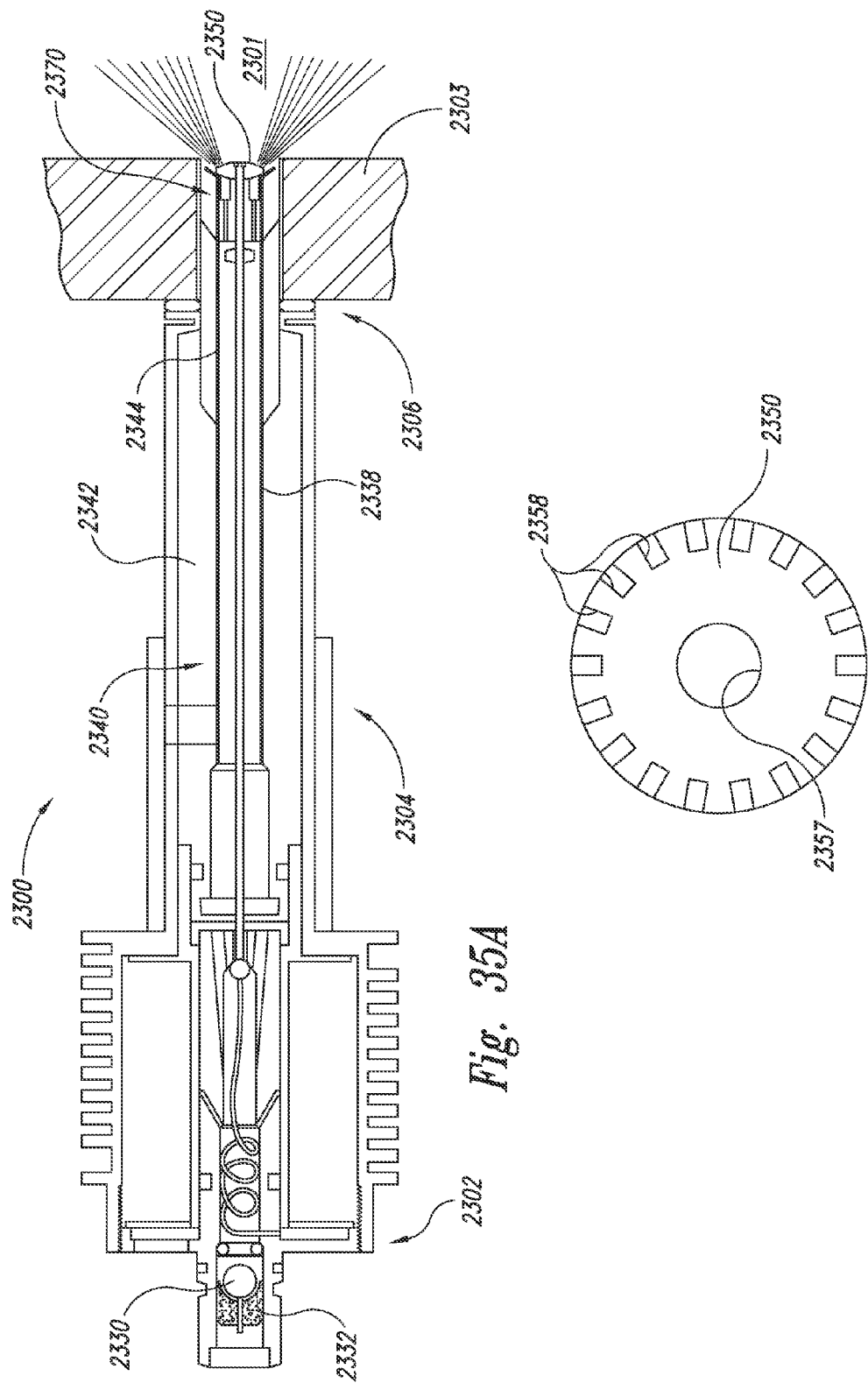

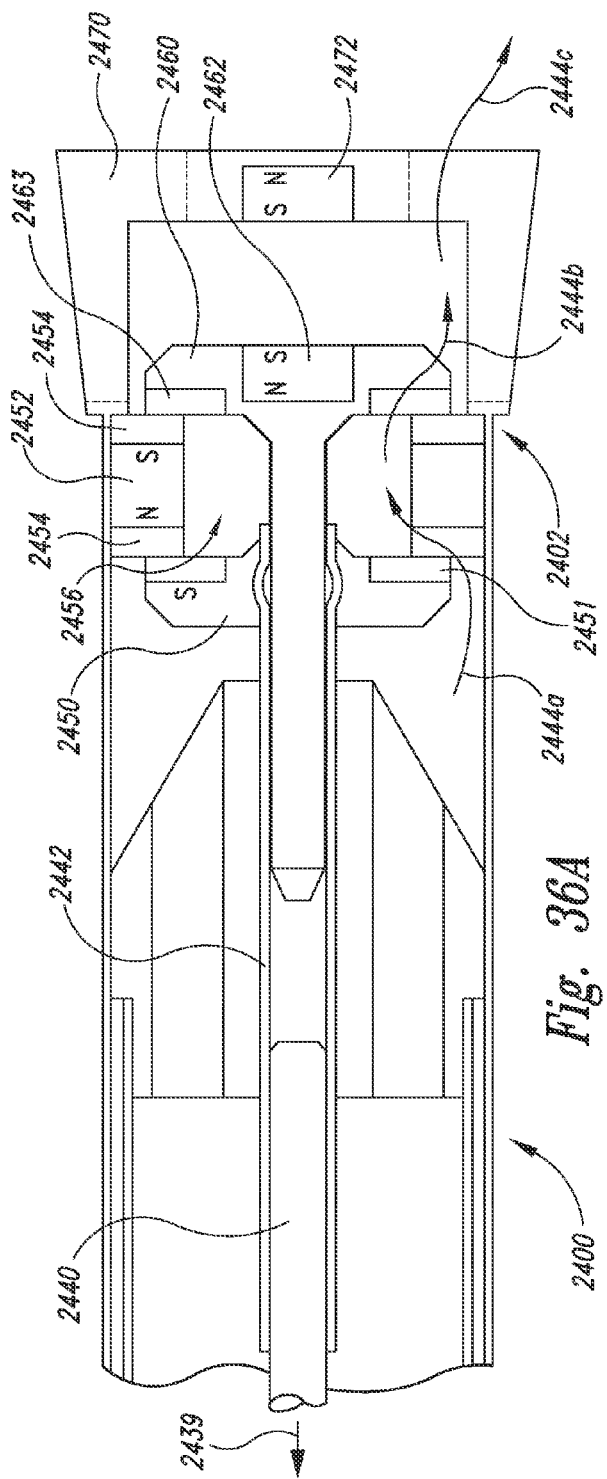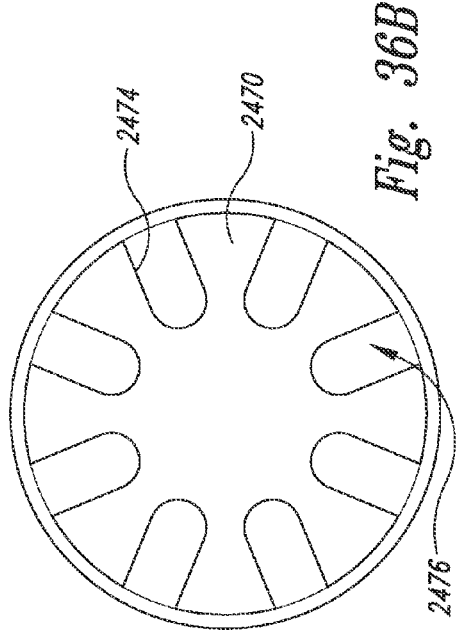
Fig. 36A
Fig. 36B

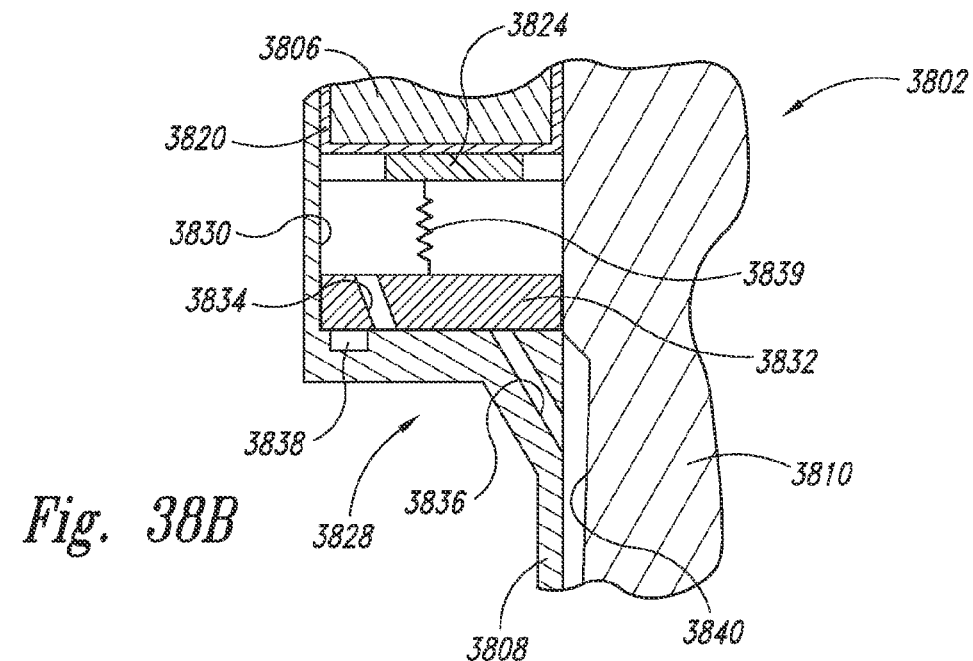
Fig. 38B
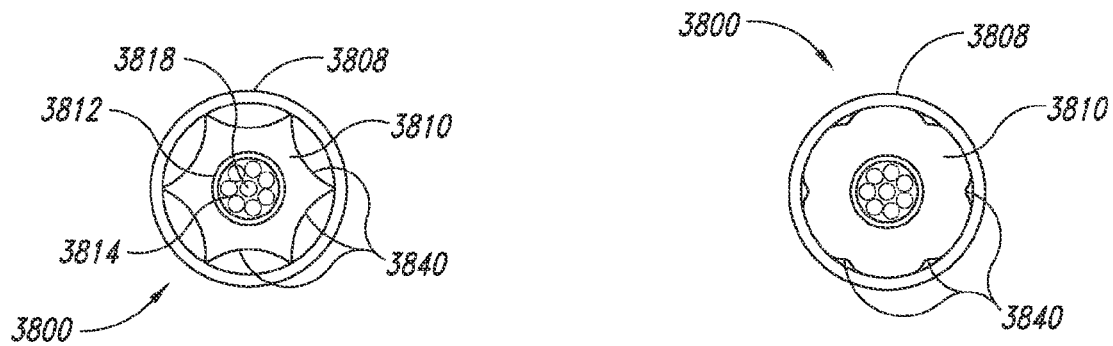
Fig. 38C
Fig. 38D
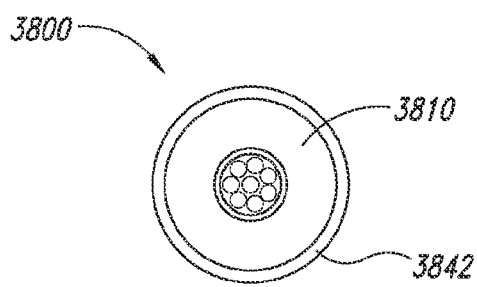
Fig. 38E
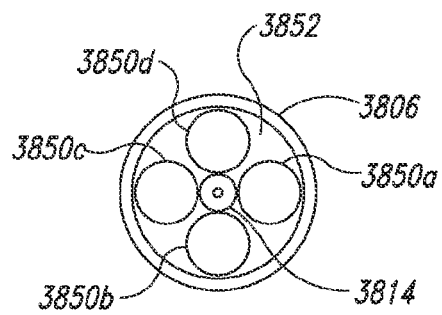
Fig. 38F

INTEGRATED FUEL INJECTORS AND IGNITERS AND ASSOCIATED METHODS OF USE AND MANUFACTURE

CROSS-REFERENCE TO RELATED APPLICATION(S)

The present application is a continuation of U.S. patent application Ser. No. 12/841,170 (now U.S. Pat. No. 8,555, 860), filed Jul. 21, 2010 and titled INTEGRATED FUEL INJECTORS AND IGNITERS AND ASSOCIATED METHODS OF USE AND MANUFACTURE, which claims priority to and the benefit of U.S. Provisional Application No. 61/237,425, filed Aug. 27, 2009 and titled OXYGENATED FUEL PRODUCTION; U.S. Provisional Application No. 61/237,466, filed Aug. 27, 2009 and titled MULTIFUEL MULTIBURST; U.S. Provisional Application No. 61/237, 479, filed Aug. 27, 2009 and titled FULL SPECTRUM ENERGY; PCT Application No. PCT/US09/67044, filed Dec. 7, 2009 and titled INTEGRATED FUEL INJECTORS AND IGNITERS AND ASSOCIATED METHODS OF USE AND MANUFACTURE; U.S. Provisional Application No. 61/304,403, filed Feb. 13, 2010 and titled FULL SPECTRUM ENERGY AND RESOURCE INDEPENDENCE; and U.S. Provisional Application No. 61/312,100, filed Mar. 9, 2010 and titled SYSTEM AND METHOD FOR PROVIDING HIGH VOLTAGE RF SHIELDING, FOR EXAMPLE, FOR USE WITH A FUEL INJECTOR. The present application is a continuation-in-part of U.S. patent application Ser. No. 12/653,085 (now U.S. Pat. No. 8,635,985), filed Dec. 7, 2009 and titled INTEGRATED FUEL INJECTORS AND IGNITERS AND ASSOCIATED METHODS OF USE AND MANUFACTURE; which is a continuation-in-part of U.S. patent application Ser. No. 12/006,774 (now U.S. Pat. No. 7,628,137), filed Jan. 7, 2008 and titled MULTIFUEL STORAGE, METERING, AND IGNITION SYSTEM; and which claims priority to and the benefit of U.S. Provisional Application No. 61/237,466, filed Aug. 27, 2009 and titled MULTIFUEL MULTIBURST. The present application is a continuation-in-part of U.S. patent application Ser. No. 12/581, 825 (now U.S. Pat. No. 8,297,254), filed Oct. 19, 2009 and titled MULTIFUEL STORAGE, METERING, AND IGNITION SYSTEM; which is a divisional of U.S. patent application Ser. No. 12/006,774 (now U.S. Pat. No. 7,628,137), filed Jan. 7, 2008 and titled MULTIFUEL STORAGE, METERING, AND IGNITION SYSTEM. Each of these applications is incorporated herein by reference in its entirety.

TECHNICAL FIELD

The following disclosure relates generally to integrated fuel injectors and igniters and associate components for storing, injecting, and igniting various fuels.

BACKGROUND

Renewable resources are intermittent for producing needed replacement energy in various forms such as electricity, hydrogen, fuel alcohols, and methane. Solar energy is a daytime event, and the daytime concentration varies seasonally and with weather conditions. In most areas, wind energy is intermittent and highly variable in magnitude. Falling water resources vary seasonally and are subject to extended draughts. In most of the earth's landmass, biomass is seasonally variant and subject to draughts. Throughout the world, considerable energy that could be delivered by hydroelectric plants, wind farms, biomass conversion, and solar collectors is wasted because of the lack of practical ways to save kinetic energy, fuel, and/or electricity until it is needed.

The world population and demand for energy has grown to the point of requiring more oil than can be produced. Future rates of production will decline while demands of increasing population and increasing dependence upon energy-intensive goods and services accelerate. This will continue to hasten the rate of fossil depletion. Cities suffer from smog caused by the use of fossil fuels. Utilization of natural gas including natural gas liquids such as ethane, propane, and butane for non-fuel purposes has increased exponentially in applications such as packaging, fabrics, carpeting, paint, and appliances that are made largely from thermoplastic and thermoset polymers.

Coal has relatively low hydrogen to carbon ratio. Oil has higher hydrogen to carbon ratio and natural gas has the highest hydrogen to carbon ratio of fossil hydrocarbons. Using oil as the representative medium, the global burn rate of fossil hydrocarbons now exceeds the equivalent of 200 million barrels of oil per day.

Global oil production has steadily increased to meet growing demand but the rate of oil discovery has failed to keep up with production. Peak production of oil has occurred and the rates of oil production in almost all known reserves are steadily decreasing. After peak production, the global economy experiences inflation of every energy-intensive and petrochemical-based product. Conflict over remaining fossil fuel resources and the utilization of oil to fuel and lubricate machines of destruction spurred World War I, World War II, and every war since then. Replacing the fossil fuel equivalent of 200 million barrels of oil each day requires development of virtually every practical approach to renewable energy production, distribution, storage, and utilization.

Air and water pollution caused by fossil fuel production and combustion now degrade every metropolitan area along with fisheries, farms, and forests. Mercury and other heavy metal poisoning of fisheries and farm soils are increasingly traced to coal combustion. Global climate changes including more powerful hurricanes and tornados, torrential rainstorms, and increased incidents of fire losses due to lightning strikes in forests and metropolitan areas are closely correlated to atmospheric buildup of greenhouse gases released by combustion of fossil fuels. With increased greenhouse gas collection of solar energy in the atmosphere, greater work is done by the global atmospheric engine including more evaporation of ocean waters, melting of glaciers and polar ice caps, and subsequent extreme weather events that cause great losses of improved properties and natural resources.

Previous attempts to utilize multifuel selections including hydrogen, producer gas, and higher hydrogen-to-carbon ratio fuels such as methane, fuel alcohols, and various other alternative fuels along with or in place of gasoline and diesel fuels have variously encountered and failed to solve difficult problems, and these attempts are expensive, produce unreliable results, and frequently cause engine degradation or damage including:

(1) Greater curb weight to increase engine compression ratio and corresponding requirements for more expensive, stronger, and heavier pistons, connecting rods, crankshafts, bearings, flywheels, engine blocks, and support structure for acceptable power production and therefore heavier suspension springs, shock absorbers, starters, batteries, etc.

(2) Requirements for more expensive valves, hardened valve seats, and machine shop installation to prevent valve wear and seat recession.

(3) Requirements to supercharge to recover power losses and drivability due to reduced fuel energy per volume and to overcome compromised volumetric and thermal efficiencies.

(4) Multistage gaseous fuel pressure regulation with extremely fine filtration and very little tolerance for fuel quality variations including vapor pressure and octane and cetane ratings.

(5) Engine coolant heat exchangers for prevention of gaseous fuel pressure regulator freeze-ups.

(6) Expensive and bulky solenoid operated tank shutoff valve (TSOV) and pressure relief valve (PRD) systems.

(7) Remarkably larger flow metering systems.

(8) After dribble delivery of fuel at wasteful times and at times that produce back-torque.

(9) After dribble delivery of fuel at harmful times such as the exhaust stroke to reduce fuel economy and cause engine or exhaust system damage.

(10) Engine degradation or failure due to pre-detonation and combustion knock.

(11) Engine hesitation or damage due to failures to closely control fuel viscosity, vapor pressure, octane or cetane rating, and burn velocity,

(12) Engine degradation or failure due to fuel washing, vaporization and burn-off of lubricative films on cylinder walls and ring or rotor seals.

(13) Failure to prevent formation of oxides of nitrogen during combustion.

(14) Failure to prevent formation of particulates due to incomplete combustion.

(15) Failure to prevent pollution due to aerosol formation of lubricants in upper cylinder areas.

(16) Failure to prevent overheating of pistons, cylinder walls, and valves consequent friction increases, and degradation.

(17) Failure to overcome damaging backfiring in intake manifold and air cleaner components.

(18) Failure to overcome damaging combustion and/or explosions in the exhaust system.

(19) Failure to overcome overheating of exhaust system components.

(20) Failure to overcome fuel vapor lock and resulting engine hesitation or failure.

Further, special fuel storage tanks are required for low energy density fuels. Storage tanks designed for gasoline, propane, natural gas, and hydrogen are discrete to meet the widely varying chemical and physical properties of each fuel. A separate fuel tank is required for each fuel type that a vehicle may utilize. This dedicated tank approach for each fuel selection takes up considerable space, adds weight, requires additional spring and shock absorber capacity, changes the center of gravity and center of thrust, and is very expensive.

In conventional approaches, metering alternative fuel choices such as gasoline, methanol, ethanol, propane, ethane, butane hydrogen, or methane into an engine may be accomplished by one or more gaseous carburetors, throttle body fuel injectors, or timed port fuel injectors. Power loss sustained by each conventional approach varies because of the large percentage of intake air volume that the expanding gaseous fuel molecules occupy. Thus, with reduced intake air entry, less fuel can be burned, and less power is developed.

At standard temperature and pressure (STP) gaseous hydrogen occupies 2,800 times as much volume as liquid gasoline for delivery of equal combustion energy. Gaseous methane requires about 900 times as much volume as liquid gasoline to deliver equal combustion energy.

Arranging for such large volumes of gaseous hydrogen or methane to flow through the vacuum of the intake manifold, through the intake valve(s), and into the vacuum of a cylinder on the intake cycle and to do so along with enough air to support complete combustion to release the heat needed to match gasoline performance is a monumental challenge that has not been adequately met. Some degree of power restoration may be available by resorting to larger displacement engines. Another approach requires expensive, heavier, more complicated, and less reliable components for much higher compression ratios and/or supercharging the intake system. However, these approaches cause shortened engine life and much higher original and/or maintenance costs unless the basic engine design provides adequate structural sections for stiffness and strength.

Engines designed for gasoline operation are notoriously inefficient. To a large extent this is because gasoline is mixed with air to form a homogeneous mixture that enters the combustion chamber during the throttled conditions of the intake cycle. This homogeneous charge is then compressed to near top dead center (TDC) conditions and spark ignited. Homogeneous charge combustion causes immediate heat transfer from 4,500° F. to 5,500° F. (2,482° C. to 3,037° C.) combustion gases to the cylinder head, cylinder walls, and piston or corresponding components of rotary engines. Protective films of lubricant are burned or evaporated, causing pollutive emissions, and the cylinder and piston rings suffer wear due to lack of lubrication. Homogeneous charge combustion also forces energy loss as heat is transferred to cooler combustion chamber surfaces, which are maintained at relatively low temperatures of 160° F. to 240° F. (71° C. to 115° C.) by liquid and/or air-cooling systems.

Utilization of hydrogen or methane as homogeneous charge fuels in place of gasoline presents an expensive challenge to provide sufficient fuel storage to accommodate the substantial energy waste that is typical of gasoline engines. Substitution of such cleaner burning and potentially more plentiful gaseous fuels in place of diesel fuel is even more difficult. Diesel fuel has a greater energy value per volume than gasoline. Additional difficulties arise because gaseous fuels such as hydrogen, producer gas, methane, propane, butane, and fuel alcohols such as ethanol or methanol lack the proper cetane ratings and do not ignite in rapidly compressed air as required for efficient diesel-engine operation. Diesel fuel injectors are designed to operate with a protective film of lubrication that is provided by the diesel oil. Further, diesel fuel injectors only cyclically pass a relatively minuscule volume of fuel, which is about 3,000 times smaller (at STP) than the volume of hydrogen required to deliver equivalent heating value.

Most modern engines are designed for minimum curb weight and operation at substantially excess oxygen equivalence ratios in efforts with homogeneous charge mixtures of air and fuel to reduce the formation of oxides of nitrogen by limiting the peak combustion temperature. In order to achieve minimum curb weight, smaller cylinders and higher piston speeds are utilized. Higher engine speeds are reduced to required shaft speeds for propulsion through higher-ratio transmission and/or differential gearing.

Operation at excess oxygen equivalence ratios requires greater air entry, and combustion chamber heads often have two or three intake valves and two or three exhaust valves. This leaves very little room in the head area for a direct cylinder fuel injector or a spark plug. Operation of higher speed valves by overhead camshafts further complicates and reduces the space available for direct cylinder fuel injectors and spark plugs. Designers have used virtually all of the space available over the pistons for valves and valve operators and have barely left room to squeeze in spark plugs for gasoline ignition or diesel injectors for compression-ignition engines.

Therefore, it is extremely difficult to deliver by any conduit greater in cross-section than the gasoline engine spark plug or the diesel engine fuel injector equal energy by alternative fuels such as hydrogen, methane, propane, butane, ethanol, or methanol, all of which have lower heating values per volume than gasoline or diesel fuel. The problem of minimal available area for spark plugs or diesel fuel injectors is exacerbated by larger heat loads in the head due to the greater heat gain from the three to six valves that transfer heat from the combustion chamber to the head and related components. Further exacerbation of the space and heat load problems is due to greater heat generation in the cramped head region by cam friction, valve springs, and valve lifters in high-speed operations.

In many ways, piston engines have been the change agents and have provided essential energy conversion throughout the industrial revolution. Today compression ignition internal combustion piston engines using cetane-rated diesel fuel power most of the equipment for farming, mining, rail and marine heavy hauling, and stationary power systems, along with new efforts in smaller engines with higher piston speeds to improve fuel efficiency of passenger and light truck vehicles. Lower compression internal combustion piston engines with spark ignition are less expensive to manufacture and utilize octane-rated fuels to power a larger portion of the growing population of 900 million passenger and light truck vehicles.

Octane and cetane-rated hydrocarbon fuel applications in conventional internal combustion engines produce unacceptable levels of pollutive emissions such as unburned hydrocarbons, particulates, oxides of nitrogen, carbon monoxide, and carbon dioxide.

Conventional spark ignition consists of a high voltage but low energy ionization of a mixture of air and fuel. Conventional spark energy magnitudes of about 0.05 to 0.15 joule are typical for normally aspirated engines equipped with spark plugs that operate with compression ratios of 12:1 or less. Adequate voltage to produce such ionization must be increased with higher ambient pressure in the spark gap. Factors requiring higher voltage include leaner air-fuel ratios and a wider spark gap as may be necessary for ignition, increases in the effective compression ratio, supercharging, and reduction of the amount of impedance to air entry into a combustion chamber. Conventional spark ignition systems fail to provide adequate voltage generation to dependably provide spark ignition in engines such as diesel engines with compression ratios of 16:1 to 22:1 and often fail to provide adequate voltage for unthrottled engines that are supercharged for purposes of increased power production and improved fuel economy.

Failure to provide adequate voltage at the spark gap is most often due to inadequate dielectric strength of ignition system components such as the spark plug porcelain and spark plug cables.

High voltage applied to a conventional spark plug, which essentially is at the wall of the combustion chamber, causes heat loss of combusting homogeneous air-fuel mixtures that are at and near all surfaces of the combustion chamber including the piston, cylinder wall, cylinder head, and valves. Such heat loss reduces the efficiency of the engine and may degrade the combustion chamber components that are susceptible to oxidation, corrosion, thermal fatigue, increased friction due to thermal expansion, distortion, warpage, and wear due to loss of viability of overheated or oxidized lubricating films.

Even if a spark at the surface of the combustion chamber causes a sustained combustion of the homogeneous air-fuel mixture, the rate of flame travel sets the limit for completion of combustion. The greater the amount of heat that is lost to the combustion chamber surfaces, the greater the degree of failure to complete the combustion process. This undesirable situation is coupled with the problem of increased concentrations of unburned fuel such as hydrocarbons vapors, hydrocarbon particulates, and carbon monoxide in the exhaust.

Efforts to control air-fuel ratios and provide leaner burn conditions for higher fuel efficiency and to reduce peak combustion temperature and hopefully reduce production of oxides of nitrogen cause numerous additional problems. For example, leaner air-fuel ratios burn slower than stoichiometric or fuel-rich mixtures. Moreover, slower combustion requires greater time to complete the two- or four-stroke operation of an engine, thus reducing the specific power potential of the engine design. With adoption of natural gas as a replacement for gasoline or diesel fuel must come recognition of the fact that natural gas combusts much slower than gasoline and that natural gas will not facilitate compression ignition if it is substituted for diesel fuel.

In addition, modern engines provide far too little space for accessing the combustion chamber with previous electrical insulation components having sufficient dielectric strength and durability for protecting components that must withstand cyclic applications of high voltage, corona discharges, and superimposed degradation due to shock, vibration, and rapid thermal cycling to high and low temperatures. Furthermore, previous approaches to homogeneous and stratified charge combustion fail to overcome limitations related to octane or cetane dependence and fail to provide control of fuel dribbling at harmful times or adequate combustion speed to enable higher thermal efficiencies, and they fail to prevent combustion-sourced oxides of nitrogen.

In order to meet desires for multifuel utilization along with lower curb weight and greater air entry it is ultimately important to allow unthrottled air entry into the combustion chambers, to directly inject gaseous, cleaner-burning, and less-expensive fuels, and to provide stratified-charge combustion as a substitute for gasoline and diesel (petrol) fuels. However, this desire encounters the extremely difficult problems of providing dependable metering of such widely variant fuel densities, vapor pressures, and viscosities to then assure subsequent precision timing of ignition and completion of combustion events. In order to achieve positive ignition, it is necessary to provide a spark-ignitable air-fuel mixture in the relatively small gap between spark electrodes.

If fuel is delivered by a separate fuel injector to each combustion chamber in an effort to produce a stratified charge, elaborate provisions such as momentum swirling, ricocheting, or rebounding the fuel from combustion chamber surfaces into the spark gap must be arranged, but these approaches always cause compromising heat losses to combustion chamber surfaces as the stratified charge concept is sacrificed. If fuel is controlled by a metering valve at some distance from the combustion chamber, "after dribble" of fuel at wasteful or damaging times, including times that produce torque opposing the intended output torque, will occur. Either approach inevitably causes much of the fuel to "wash" or impinge upon cooled cylinder walls in order for some small amount of fuel to be delivered in a spark-ignitable air-fuel mixture in the spark gap at the precise time of desired ignition. This results in heat losses, loss of cylinder-wall lubrication, friction-producing heat deformation of cylinders and pistons, and loss of thermal efficiency due to heat losses from work production by expanding gases to non-expansive components of the engine.

Efforts to produce swirl of air entering the combustion chamber and to place lower density fuel within the swirling air suffer two harmful characteristics. The inducement of swirl causes impedance to the flow of air into the combustion chamber and thus reduces the amount of air that enters the combustion chamber to cause reduced volumetric efficiency. After ignition, products of combustion are rapidly carried by the swirl momentum to the combustion chamber surfaces and adverse heat loss is accelerated.

Past attempts to provide internal combustion engines with multifuel capabilities, such as the ability to change between fuel selections such as gasoline, natural gas, propane, fuel alcohols, producer gas and hydrogen, have proven to be extremely complicated and highly compromising. Past approaches induced the compromise of detuning all fuels and canceling optimization techniques for specific fuel characteristics. Such attempts have proven to be prone to malfunction and require very expensive components and controls. These difficulties are exacerbated by the vastly differing specific energy values of such fuels, wide range of vapor pressures and viscosities, and other physical property differences between gaseous fuels and liquid fuels. Further, instantaneous redevelopment of ignition timing is required because methane is the slowest burning of the fuels cited, while hydrogen burns about 7 to 10 times faster than any of the other desired fuel selections.

Additional problems are encountered between cryogenic liquid or slush and compressed-gas fuel storage of the same fuel substance. Illustratively, liquid hydrogen is stored at −420° F. (−252° C.) at atmospheric pressure and causes unprotected delivery lines, pressure regulators, and injectors to condense and freeze atmospheric water vapor and to become ice damaged as a result of exposure to atmospheric humidity. Cryogenic methane encounters similar problems of ice formation and damage. Similarly, these super cold fluids also cause ordinary metering orifices, particularly small orifices, to malfunction and clog.

The very difficult problem that remains and must be solved is how can a vehicle be refueled quickly with dense liquid fuel at a cryogenic (hydrogen or methane) or ambient temperature (propane or butane), and at idle or low power levels use vapors of such fuels, and at high power levels use liquid delivery of such fuels in order to meet energy production requirements?

At atmospheric pressure, injection of cryogenic liquid hydrogen or methane requires precise metering of a very small volume of dense liquid compared to a very large volume delivery of gaseous hydrogen or methane. Further, it is imperative to precisely produce, ignite, and combust stratified charge mixtures of fuel and air regardless of the particular multifuel selection that is delivered to the combustion chamber.

Accomplishment of essential goals including highest thermal efficiency, highest mechanical efficiency, highest volumetric efficiency, and longest engine life with each fuel selection requires precise control of the fuel delivery timing, combustion chamber penetration, and pattern of distribution by the entering fuel, and precision ignition timing, for optimizing air utilization, and maintenance of surplus air to insulate the combustion process with work-producing expansive medium.

In order to sustainably meet the energy demands of the global economy, it is necessary to improve production, transportation, and storage of methane and hydrogen by virtually every known means. A gallon of cryogenic liquid methane at −256° C. provides an energy density of 89,000 BTU/gal, about 28% less than a gallon of gasoline. Liquid hydrogen at −252° C. provides only about 29,700 BTU/gal, or 76% less than gasoline.

It has long been desired to interchangeably use methane, hydrogen or mixtures of methane and hydrogen as cryogenic liquids or compressed gases in place of gasoline in spark-ignited engines. But this goal has not been satisfactorily achieved, and as a result, the vast majority of motor vehicles remain dedicated to petrol even though the costs of methane and many forms of renewable hydrogen are far less than gasoline. Similarly it has long been a goal to interchangeably use methane, hydrogen or mixtures of methane and hydrogen as cryogenic liquids and/or compressed gases in place of diesel fuel in compression-ignited engines but this goal has proven even more elusive, and most diesel engines remain dedicated to pollutive and more expensive diesel fuel.

BRIEF DESCRIPTION OF THE DRAWINGS

FIG. 16 is a cross-sectional side partial view of an injector configured in accordance with an embodiment of the disclosure.

FIG. 17A is a side view of an insulator or dielectric body configured in accordance with one embodiment of the disclosure, and FIG. 17B is a cross-sectional side view taken substantially along the lines 17B-17B of FIG. 17A.

FIG. 22A is a side view of a truss tube alignment assembly configured in accordance with an embodiment of the disclosure for aligning an actuator, and FIG. 22B is a cross-sectional front view taken substantially along the lines 22B-22B of FIG. 22A.

FIG. 22C is a side view of an alignment truss assembly configured in accordance with another embodiment of the disclosure for aligning an actuator, and FIG. 22D is a cross-sectional front view taken substantially along the lines 22D-22D of FIG. 22C.

FIG. 22E is a cross-sectional side partial view of an injector configured in accordance with yet another embodiment of the disclosure.

FIG. 23 is a cross-sectional side view of a driver configured in accordance with an embodiment of the disclosure.

FIG. 26A is a cross-sectional side view of an injector configured in accordance with yet another embodiment of the disclosure, and FIG. 26B is a front view of the injector of FIG. 26A illustrating an ignition and flow adjusting device.

FIGS. 28-30A are cross-sectional side views of injectors configured in accordance with other embodiments of the disclosure.

FIGS. 30B and 30C are front views of ignition and flow adjusting devices configured in accordance with embodiments of the disclosure.

FIG. 33A is a cross-sectional side view and FIG. 33B is a rear view of a check valve configured in accordance with an embodiment of the disclosure.

FIG. 34A is a cross-sectional side view, FIG. 34B is a rear view, and FIG. 34C is a front view of a valve seat configured in accordance with an embodiment of the disclosure.

FIG. 35A is a cross-sectional side view of an injector configured in accordance with another embodiment of the disclosure.

FIG. 35B is a front view of the injector of FIG. 35A illustrating an ignition and flow adjusting device configured in accordance with an embodiment of the disclosure.

FIG. 36A is a cross-sectional partial side view of an injector configured in accordance with yet another embodiment of the disclosure.

FIG. 36B is a front view of the injector of FIG. 36A illustrating an ignition and flow adjusting device configured in accordance with an embodiment of the disclosure.

FIG. 38B is an enlarged detail view of a valve assembly of the injector of FIG. 38A.

FIG. 38C is a cross-sectional side view taken substantially along lines 38C-38C of FIG. 38A; FIG. 38D is a cross-sectional side view taken substantially along lines 38D-38D of FIG. 38A; and FIG. 38E is a cross-sectional side view taken substantially along lines 38E-38E of FIG. 38A.

FIG. 38F is a cross-sectional side view of an embodiment of a force generator taken substantially along lines 38F-38F in FIG. 38A.

DETAILED DESCRIPTION

Figure 1:
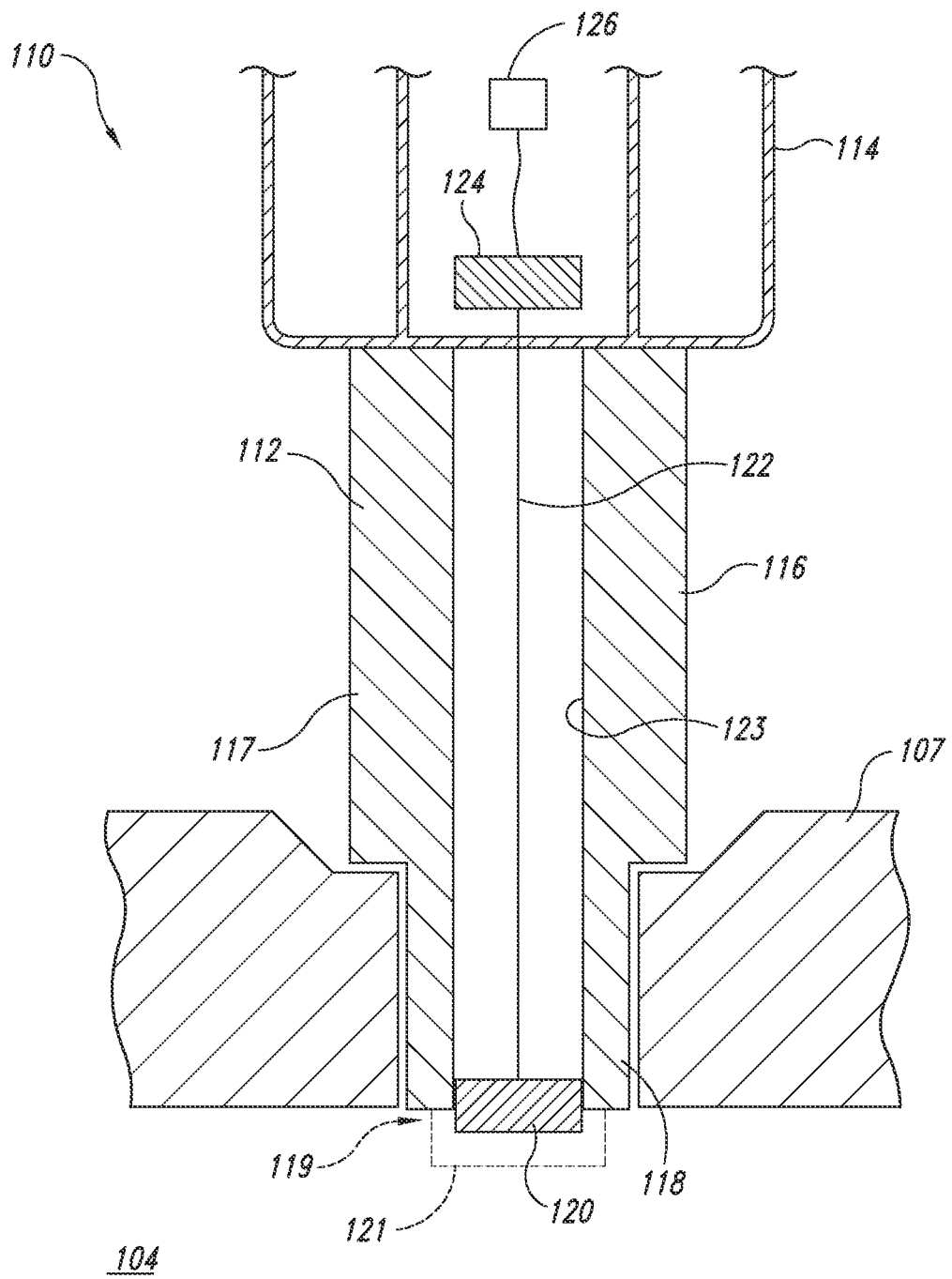
FIG. 1 is a schematic cross-sectional side view of an integrated injector/igniter configured in accordance with an embodiment of the disclosure.

The present application incorporates by reference in their entirety the subject matter of each of the following U.S. Patent Applications, filed concurrently herewith on Jul. 21, 2010 and titled: FUEL INJECTOR ACTUATOR ASSEMBLIES AND ASSOCIATED METHODS OF USE AND MANUFACTURE, U.S. patent application Ser. No. 12/804,510, now U.S. Pat. No. 8,074,625; INTEGRATED FUEL INJECTOR IGNITERS WITH CONDUCTIVE CABLE ASSEMBLIES, U.S. patent application Ser. No. 12/841,146, now U.S. Pat. No. 8,413,634; SHAPING A FUEL CHARGE IN A COMBUSTION CHAMBER WITH MULTIPLE DRIVERS AND/OR IONIZATION CONTROL, U.S. patent application Ser. No. 12/841,149, now U.S. Pat. No. 8,365,700; CERAMIC INSULATOR AND METHODS OF USE AND MANUFACTURE THEREOF, U.S. patent application Ser. No. 12/841,135, now U.S. Pat. No. 8,192,852; METHOD AND SYSTEM OF THERMOCHEMICAL REGENERATION TO PROVIDE OXYGENATED FUEL, FOR EXAMPLE, WITH FUEL-COOLED FUEL INJECTORS, U.S. patent application Ser. No. 12/804,509, now U.S. Pat. No. 8,561,598; and METHODS AND SYSTEMS FOR REDUCING THE FORMATION OF OXIDES OF NITROGEN DURING COMBUSTION IN ENGINES, U.S. patent application Ser. No. 12/804,508, now U.S. Pat. No. 8,387,599.

A. Overview

The present disclosure describes devices, systems, and methods for providing a fuel injector configured to be used with multiple fuels and to include an integrated igniter. The disclosure further describes integrated fuel injection and ignition devices for use with internal combustion engines, as well as associated systems, assemblies, components, and methods regarding the same. For example, several of the embodiments described below are directed generally to adaptable fuel injectors/igniters that can optimize the injection and combustion of various fuels based on combustion chamber conditions. Certain details are set forth in the following description and in FIGS. 1-42 to provide a thorough understanding of various embodiments of the disclosure. However, other details describing well-known structures and systems often associated with internal combustion engines, injectors, igniters, and/or other aspects of combustion systems are not set forth below to avoid unnecessarily obscuring the description of various embodiments of the disclosure. Thus, it will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the disclosure.

Many of the details, dimensions, angles, shapes, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the claimed disclosure.

Integrated Injectors/Igniters

FIG. 1 is a schematic cross-sectional side view of an integrated injector/igniter 110 ("injector 110") configured in accordance with an embodiment of the disclosure. The injector 110 illustrated in FIG. 1 is configured to inject different fuels into a combustion chamber 104 and to adaptively adjust the pattern and/or frequency of the fuel injections or bursts based on combustion properties and conditions in the combustion chamber 104. As explained in detail below, the injector 110 can optimize the injected fuel for rapid ignition and complete combustion. In addition to injecting the fuel, the injector 110 includes one or more integrated ignition features that are configured to ignite the injected fuel. As such, the injector 110 can be utilized to convert conventional internal combustion engines to be able to operate on multiple different fuels. Although several of the features of the illustrated injector 110 are shown schematically for purposes of illustration, several of these schematically illustrated features are described in detail below with reference to various features of embodiments of the disclosure. Accordingly, the position, size, orientation, etc. of the schematically illustrated components of the injector in FIG. 1 are not intended to limit the present disclosure.

In the illustrated embodiment, the injector 110 includes a body 112 having a middle portion 116 extending between a base portion 114 and a nozzle portion 118. The nozzle portion 118 extends at least partially through a port in an engine head 107 to position an end portion 119 of the nozzle portion 118 at the interface with the combustion chamber 104. The injector 110 further includes a passage or channel 123 extending through the body 112 from the base portion 114 to the nozzle portion 118. The channel 123 is configured to allow fuel to flow through the body 112. The channel 123 is also configured to allow other components, such as an actuator 122, to pass through the body 112, as well as instrumentation components and/or energy source components of the injector 110. In certain embodiments, the actuator 122 can be a cable or rod that has a first end portion that is operatively coupled to a flow control device or valve 120 carried by the end portion 119 of the nozzle portion 118. As such, the flow valve 120 is positioned proximate to the interface with the combustion chamber 104. Although not shown in FIG. 1, in certain embodiments the injector 110 can include more than one flow valve, as well as one or more check valves positioned proximate to the combustion chamber 104, as well as at other locations on the body 112.

According to another feature of the illustrated embodiment, the actuator 122 also includes a second end portion operatively coupled to a driver 124. The second end portion can further be coupled to a controller or processor 126. As explained in detail below with reference to various embodiments of the disclosure, the controller 126 and/or the driver 124 are configured to rapidly and precisely actuate the actuator 122 to inject fuel into the combustion chamber 104 via the flow valve 120. For example, in certain embodiments, the flow valve 120 can move outwardly (e.g., toward the combustion chamber 104) and in other embodiments the flow valve 120 can move inwardly (e.g., away from the combustion chamber 104) to meter and control injection of the fuel. Moreover, in certain embodiments, the driver 124 can tension the actuator 122 to retain the flow valve 120 in a closed or seated position, and the driver 124 can relax the actuator 122 to allow the flow valve 120 to inject fuel, and vice versa. The driver 124 can be responsive to the controller as well as other force inducing components (e.g., acoustic, electromagnetic and/or piezoelectric components) to achieve the desired frequency and pattern of the injected fuel bursts.

In certain embodiments, the actuator 122 can include one or more integrated sensing and/or transmitting components to detect combustion chamber properties and conditions. For example, the actuator 122 can be formed from fiber optic cables, insulated transducers integrated within a rod or cable, or can include other sensors to detect and communicate combustion chamber data. Although not shown in FIG. 1, in other embodiments, and as described in detail below, the injector 110 can include other sensors or monitoring instrumentation located at various positions on the injector 110. For example, the body 112 can include optical fibers integrated into the material of the body 112, or the material of the body 112 itself can be used to communicate combustion data to one or more controllers. In addition, the flow valve 120 can be configured to sense or carry sensors in order to transmit combustion data to one or more controllers associated with the injector 110. This data can be transmitted via wireless, wired, optical or other transmission mediums. Such feedback enables extremely rapid and adaptive adjustments for optimization of fuel injection factors and characteristics including, for example, fuel delivery pressure, fuel injection initiation timing, fuel injection durations for production of multiple layered or stratified charges, the timing of one, multiple or continuous plasma ignitions or capacitive discharges, etc.

Such feedback and adaptive adjustment by the controller 126, driver 124, and/or actuator 126 also allows optimization of outcomes such as power production, fuel economy, and minimization or elimination of pollutive emissions including oxides of nitrogen. U.S. Patent Application Publication No. 2006/0238068, which is incorporated herein by reference in its entirety, describes suitable drivers for actuating ultrasonic transducers in the injector 110 and other injectors described herein.

The injector 110 can also optionally include an ignition and flow adjusting device or cover 121 (shown in broken lines in FIG. 1) carried by the end portion 119 adjacent to the engine head 107. The cover 121 at least partially encloses or surrounds the flow valve 120. The cover 121 may also be configured to protect certain components of the injector 110, such as sensors or other monitoring components. The cover 121 can also act as a catalyst, catalyst carrier and/or first electrode for ignition of the injected fuels. Moreover, the cover 121 can be configured to affect the shape, pattern, and/or phase of the injected fuel. The flow valve 120 can also be configured to affect these properties of the injected fuel. For example, in certain embodiments the cover 121 and/or the flow valve 120 can be configured to create sudden gasification of the fuel flowing past these components. More specifically, the cover 121 and/or the flow valve 120 can include surfaces having sharp edges, catalysts, or other features that produce gas or vapor from the rapidly entering liquid fuel or mixture of liquid and solid fuel. The acceleration and/or frequency of the flow valve 120 actuation can also suddenly gasify the injected fuel. In operation, this sudden gasification causes the vapor or gas emitted from the nozzle portion 118 to more rapidly and completely combust. Moreover, this sudden gasification may be used in various combinations with super heating liquid fuels and plasma or acoustical impetus of projected fuel bursts. In still further embodiments, the frequency of the flow valve 120 actuation can induce plasma projection to beneficially affect the shape and/or pattern of the injected fuel. U.S. Patent Application Publication No. 672,636, (U.S. Pat. No. 4,122,816), which is incorporated herein by reference in its entirety, describes suitable drivers for actuating plasma projection by injector 110 and other injectors described herein.

According to another aspect of the illustrated embodiment, and as described in detail below, at least a portion of the body 112 is made from one or more dielectric materials 117 suitable to enable the high energy ignition to combust different fuels, including unrefined fuels or low energy density fuels. These dielectric materials 117 can provide sufficient electrical insulation of the high voltage for the production, isolation, and/or delivery of spark or plasma for ignition. In certain embodiments, the body 112 can be made from a single dielectric material 117. In other embodiments, however, the body 112 can include two or more dielectric materials. For example, at least a segment of the middle portion 116 can be made from a first dielectric material having a first dielectric strength, and at least a segment of the nozzle portion 118 can be made from a dielectric material having a second dielectric strength that is greater than the first dielectric strength. With a relatively strong second dielectric strength, the second dielectric can protect the injector 110 from thermal and mechanical shock, fouling, voltage tracking, etc. Examples of suitable dielectric materials, as well as the locations of these materials on the body 112, are described in detail below.

In addition to the dielectric materials, the injector 110 can also be coupled to a power or high voltage source to generate the ignition event to combust the injected fuels. The first electrode can be coupled to the power source (e.g., a voltage generation source such as a capacitance discharge, induction, or piezoelectric system) via one or more conductors extending through the injector 110. Regions of the nozzle portion 118, the flow valve 120, and/or the cover 121 can operate as a first electrode to generate an ignition event (e.g., spark, plasma, compression ignition operations, high energy capacitance discharge, extended induction sourced spark, and/or direct current or high frequency plasma, in conjunction with the application of ultrasound to quickly induce, impel, and complete combustion) with a corresponding second electrode of the engine head 107. As explained in detail below, the first electrode can be configured for durability and long service life. In still further embodiments of the disclosure, the injector 110 can be configured to provide energy conversion from combustion chamber sources and/or to recover waste heat or energy via thermochemical regeneration to drive one or more components of the injector 110 from the energy sourced by the combustion events.

Injection/Ignition Systems

Figure 2:
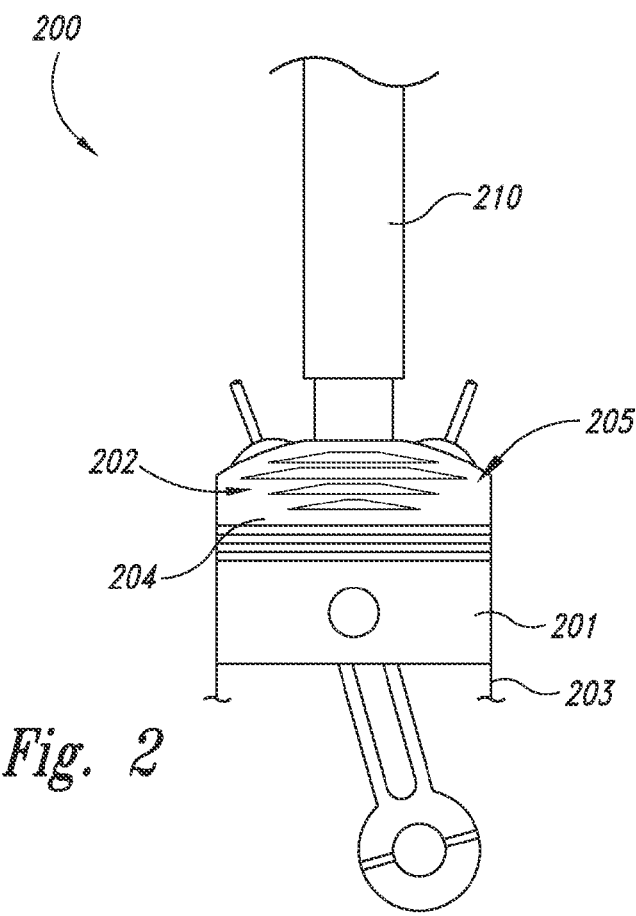
FIG. 2 is a side view of a system configured in accordance with an embodiment of the disclosure.
Figure 3A:
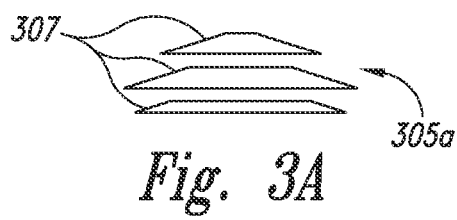
FIGS. 3A-3D illustrate several representative layered burst patterns of fuel that can be injected by the injectors configured in accordance with embodiments of the disclosure.
Figure 3B:
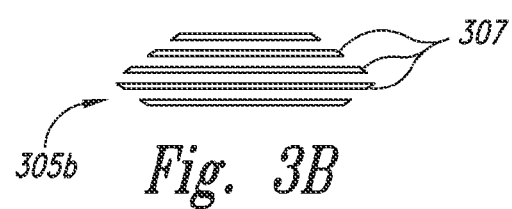
Figure 3C:
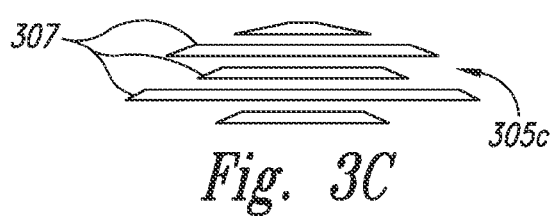
Figure 3D:
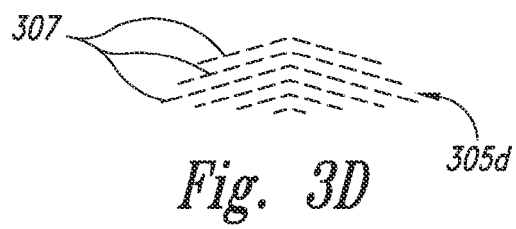

FIG. 2 is a side view illustrating the environment of a portion of an internal combustion system 200 having a fuel injector 210 configured in accordance with an embodiment of the disclosure. In the illustrated embodiment, the schematically illustrated injector 210 is merely illustrative of one type of injector that is configured to inject and ignite different fuels in a combustion chamber 202 of an internal combustion engine 204. As shown in FIG. 2, the combustion chamber 202 is formed between a head portion containing injector 210 and valves, movable piston 201 and the inner surface of a cylinder 203. In other embodiments, however, the injector 210 can be used in other environments with other types of combustion chambers and/or energy transferring devices including various vanes, axial, and radial piston expanders along with numerous types of rotary combustion engines. As described in greater detail below, the injector 210 includes several features that not only allow the injection and ignition of different fuels in the combustion chamber 202, but that also enable the injector 210 to adaptively inject and ignite these different fuels according to different combustion conditions or requirements. For example, the injector 210 includes one or more insulative materials that are configured to enable high energy ignition to combust different fuel types, including unrefined fuels or low energy density fuels. These insulative materials are also configured to withstand the harsh conditions required to combust different fuel types, including, for example, high voltage, fatigue, impact, oxidation, and corrosion degradation.

According to another aspect of the illustrated embodiment, the injector 210 can further include instrumentation for sensing various properties of the combustion in the combustion chamber 202 (e.g., properties of the combustion process, the combustion chamber 202, the engine 204, etc.). In response to these sensed conditions, the injector 210 can adaptively optimize the fuel injection and ignition characteristics to achieve increased fuel efficiency and power production, as well as to decrease noise, engine knock, heat losses and/or vibration to extend the engine and/or vehicle life. Moreover, the injector 210 also includes actuating components to inject the fuel into the combustion chamber 202 to achieve specific flow or spray patterns 205, as well as the phase, of the injected fuel. For example, the injector 210 can include one or more valves positioned proximate to the interface of the combustion chamber 202. The actuating components of the injector 210 provide for precise, high frequency operation of the valve to control at least the following features: the timing of fuel injection initiation and completion; the frequency and duration of repeated fuel injections; and/or the timing and selection of ignition events.

FIGS. 3A-3D illustrate several fuel burst patterns 305 (identified individually as first-fourth patterns 305a-305d) that can be injected by an injector configured in accordance with embodiments of the disclosure. As those of ordinary skill in the art will appreciate, the illustrated patterns 305 are merely representative of some embodiments of the present disclosure. Accordingly, the present disclosure is not limited to the patterns 305 shown in FIGS. 3A-3D, and in other embodiments injectors can dispense burst patterns that differ from the illustrated patterns 305. Although the patterns 305 illustrated in FIGS. 3A-3D have different shapes and configurations, these patterns 305 share the feature of having sequential fuel layers 307. The individual layers 307 of the corresponding patterns 305 provide the benefit of a relatively large surface to volume ratios of the injected fuel. These large surface to volume ratios provide higher combustion rates of the fuel charges, as well as assist in insulating and accelerating complete combustion the fuel charges. Such fast and complete combustion provides several advantages over slower burning fuel charges. For example, slower burning fuel charges require earlier ignition, cause significant heat losses to combustion chamber surfaces, and produce more back work or output torque loss to overcome early pressure rise from the earlier ignition. Such previous combustion operations are also plagued by pollutive emissions (e.g., carbon-rich hydrocarbon particulates, oxides of nitrogen, carbon monoxide, carbon dioxide, quenched and unburned hydrocarbons, etc.) as well as harmful heating and wear of pistons, rings, cylinder walls, valves, and other components of the combustion chamber.

Thus, systems and injectors according to the present disclosure provide the ability to replace conventional injectors, glow plugs, or spark plugs (e.g., diesel fuel injectors, spark plugs for gasoline, etc.) and develop full rated power with a wide variety of renewable fuels, such as hydrogen, methane, and various inexpensive fuel alcohols produced from widely available sewage, garbage, and crop and animal wastes. Although these renewable fuels may have approximately 3,000 times less energy density compared to refined fossil fuels, the systems and injectors of the present disclosure are capable of injecting and igniting these renewable fuels for efficient energy production.

System for Providing Multifuel Injection

Figures 4, 5:
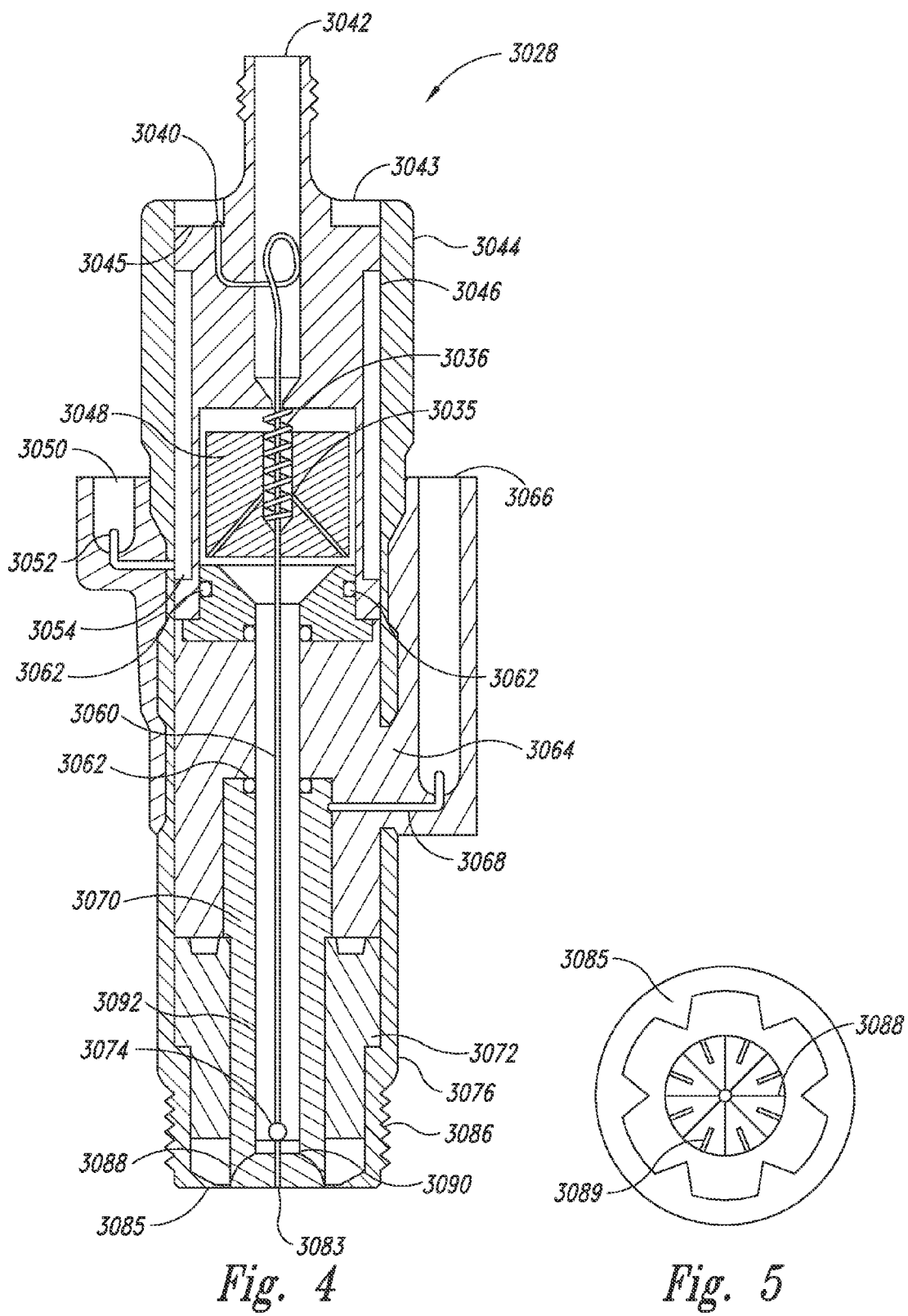
FIG. 4 is a longitudinal section of a component assembly of an embodiment that is operated in accordance with an embodiment of the disclosure.
FIG. 5 is an end view of the component assembly of FIG. 4 configured in accordance with an embodiment of the disclosure.

FIG. 4 is a longitudinal section of a component assembly of an embodiment that is operated in accordance with an embodiment of the disclosure. FIG. 5 is an end view of the component assembly of FIG. 4 configured in accordance with an embodiment of the disclosure. According to aspects of the illustrative embodiment shown in FIG. 4, an injector 3028 enables interchangeable utilization of original fuel substances or hydrogen-characterized fuel species that result from the processes described. This includes petrol liquids, propane, ethane, butane, fuel alcohols, cryogenic slush, liquid, vaporous, or gaseous forms of the same fuel or new fuel species produced by the thermochemical regeneration reactions of the present disclosure.

As shown in FIG. 4, the injector 3028 enables selection of optimal fuels through circuits provided, involving flow selections by various valves, shown in FIG. 4 as valves for utilization of fuel species and conditions including primary fuel from tank warmed primary fuel from heat exchangers 3036, vaporized primary fuel from heat exchangers 3036, newly produced fuel species from reactor 3036, warmed fuel from reactor 3036 combined with fuel from heat exchanger and selection of the pressure for delivery to injector 3028 by control of adjustable pressure regulator to optimize variables including fuel delivery rate and penetration into the combustion chamber, local and overall air-fuel mixtures at the time selected for ignition, fuel combustion rate, and many other combinations and permutations of these variables. The configuration of the fuel injector 3028 improves the capabilities for adaptive fuel injection, fuel penetration pattern, air utilization, ignition, and combustion control to achieve numerous alternative optimization goals of the disclosure.

FIG. 4 shows an exemplary embodiment 3028 of one of the solenoid actuated varieties of the fuel injection and positive ignition system shown in the system figures. According to aspects of the embodiment, injector 3028 provides precision volumetric injection and ignition of fuels that vary greatly in temperature, viscosity, and density, including slush hydrogen mixtures of solid and liquid hydrogen at $-254°$ C. ($-425°$ F.), hot hydrogen and carbon monoxide from reformed methanol at $150°$ C. $(302)°$ F. or higher temperatures, to diesel and gasoline liquids at ambient temperature. The enormous range of volumes that is required to provide partial or full rated power from such fuels by efficient operation of engine requires adaptive timing of delivery and positively timed ignition of precision volumes, at precise times, with rapid repetition per engine cycle, all without injector dribble before or after the intended optimum injection timing. Avoidance of such dribble is extremely difficult and important to avoid fuel loss during the exhaust cycle and/or back work and/or heat loss by inadvertent and problematic fuel deliveries during the exhaust, intake, or early compression periods.

In certain embodiments, fuel dribble reduction is accomplished by providing a separation distance between a flow control valve 3074 and valve actuator such as the solenoid valve operator, consisting of insulated winding 3046, soft magnet core 3045, armature 3048, and spring 3036 as shown. In order to meet extremely tight space limitations and do so in the "hot-well" conditions provided within engine valve groups and camshafts of modern engines, the lower portion of the injector 3028 is configured with the same thread, reach, and body diameter dimensions of an ordinary spark plug in the portions 3076 and 3086 below voltage insulation well 3066. Similarly, small injector sections are provided for replacement of diesel fuel injectors all while incorporating the essential capabilities of precision spark ignition and stratified charge presentation of fuels that vary in properties from low vapor pressure diesel fuel to hydrogen and/or hydrogen-characterized fuels.

In the embodiment shown in FIG. 4, the injector configuration enables a high voltage for spark ignition to be applied to conductor 3068 within well 3066 and thus development of ionizing voltage across conductive nozzle 3070 and charge accumulation features 3085 within the threaded portion 3086 at the interface to the combustion chamber as shown in FIGS. 4 and 5. In certain embodiments, the flow control valve 3074 is lifted by a high strength insulator cable or light conducting fiber cable 3060, which is moved by force of driver or armature 3048 of solenoid operator assembly as shown. According to aspects of one embodiment, cable 3060 is 0.04 mm (0.015 inch) in diameter and is formed of a bundle of high strength light-pipe fibers including selections of fibers that effectively transmit radiation in the IR, visible, and/or UV wavelengths.

According to one feature of the illustrated embodiment, this bundle is sheathed in a protective shrink tube or assembled in a thermoplastic or thermoset binder to form a very high strength, flexible, and extremely insulative actuator for flow control valve 3074 and data gathering component that continually reports combustion chamber pressure, temperature, and combustion pattern conditions in IR, visible, and/or UV light data. According to further embodiments, a protective lens or coating for the cable 3060 is provided at the combustion chamber interface 3083 to provide combustion pressure data by a fiber optic Fabry-Perot interferometer, or micro Fabry-Perot cavity-based sensor, or side-polished optical fiber. In operation, pressure data from the end of the cable 3060, positioned at or substantially adjacent to the combustion chamber interface, is transmitted by the light-pipe bundle shown, which can, for example, be protected from abrasion and thermal degradation. According to aspects of the disclosure, suitable lens protection materials include but are not limited to diamond, sapphire, quartz, magnesium oxide, silicon carbide, and/or other ceramics in addition to heat-resisting superalloys and/or Kanthols.

Figure 6:
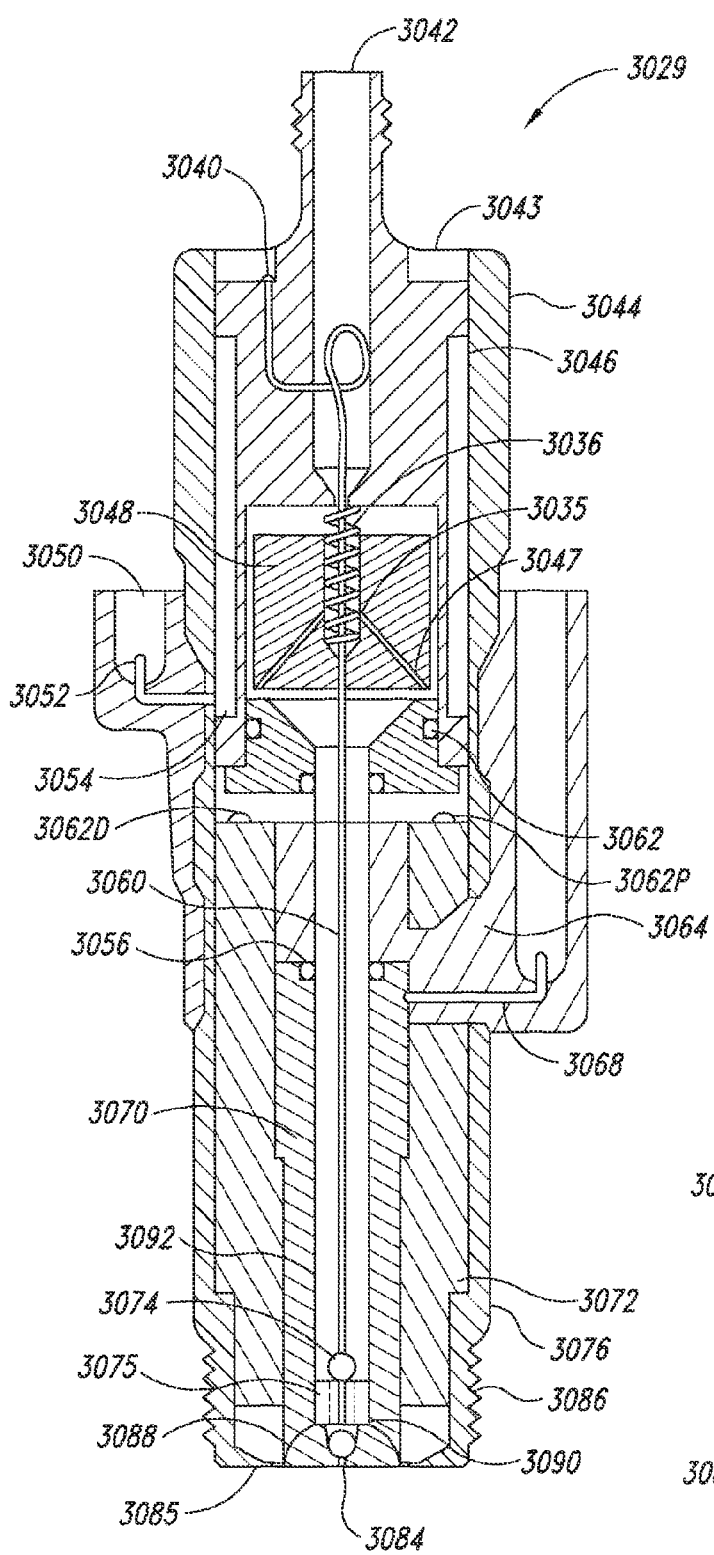
FIG. 6 is a longitudinal section of a component assembly of an embodiment that is operated in accordance with an embodiment of the disclosure.
Figure 7:
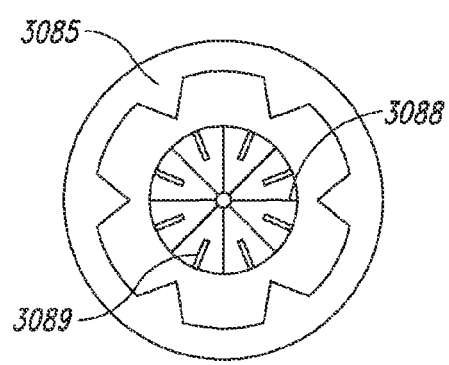
FIG. 7 is an end view of the component assembly of FIG. 6 configured in accordance with an embodiment of the disclosure.

FIG. 6 is a longitudinal section of a component assembly of an embodiment that is operated in accordance with an embodiment of the disclosure. FIG. 7 is an end view of the component assembly of FIG. 6 configured in accordance with an embodiment of the disclosure. Accordingly, as illustrated in the alternative embodiment of the injector shown in FIG. 6, injector 3029 includes a transparent dielectric insulator 3072. The insulator 3072 provides light-pipe transmission of radiation frequencies from the combustion chamber to optoelectronic sensor 3062P along with the varying strain signal to stress sensor 3062D corresponding to combustion chamber pressure conditions.

According to further embodiments, embedded controller 3062 preferably receives signals from sensors 3062D and 3062P for production of analog or digitized fuel-delivery and spark-ignition events as a further improvement in efficiency, power production, operational smoothness, fail-safe provisions, and longevity of engine components. In certain embodiments, the controller 3062 records sensor indications to determine the time between each cylinder's torque development to derive positive and negative engine acceleration as a function of adaptive fuel-injection and spark-ignition timing and flow data in order to determine adjustments needed for optimizing desired engine operation parameters. Accordingly, the controller 3062 serves as the master computer to control the system of FIG. 14 (discussed below) including various selections of operations by injectors such as injectors 3028, 3029 or 3029' as shown in FIGS. 4, 5, 6, 7, 9, 11 and 13.

Figure 12:
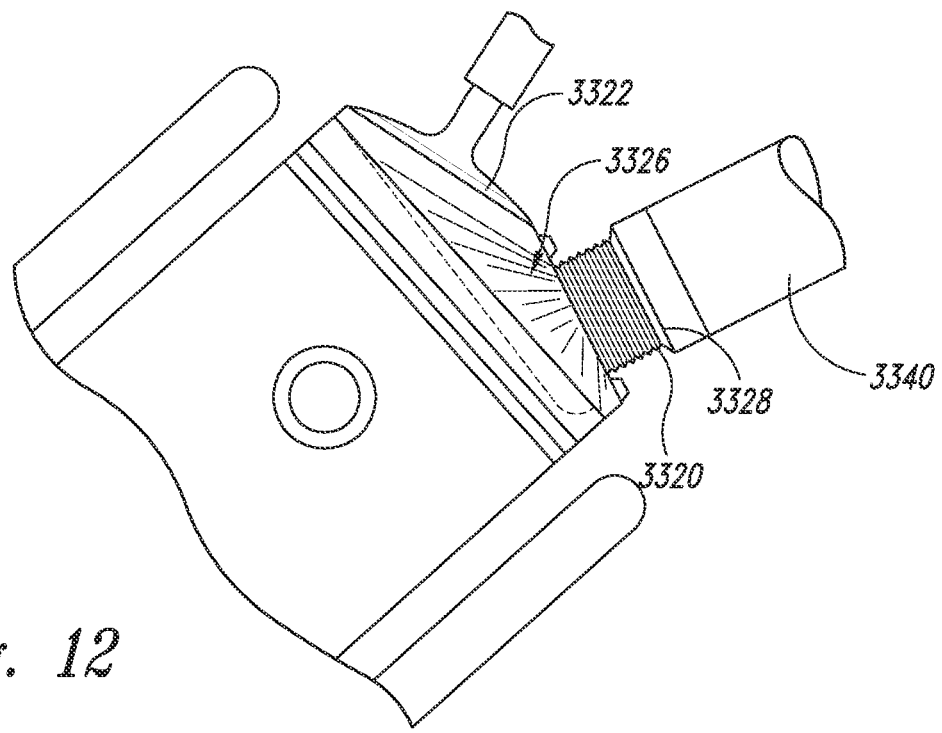
FIG. 12 is an illustration of an injector embodiment of the disclosure operated in accordance with the principles of the disclosure.
Figure 14:
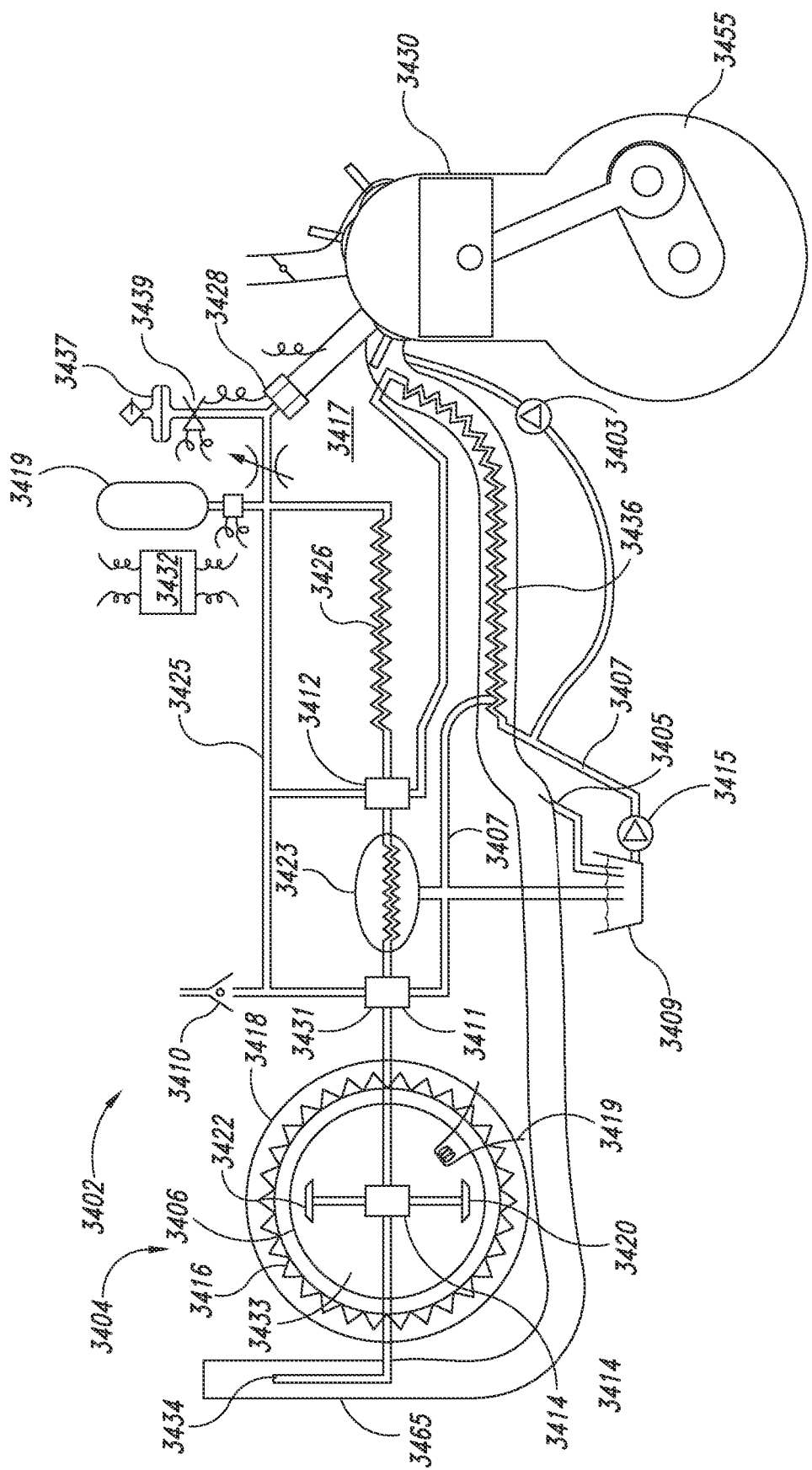
FIG. 14 is a schematic illustration including sectional views of certain components of a system operated in accordance with an embodiment of the disclosure.
Figure 15A:
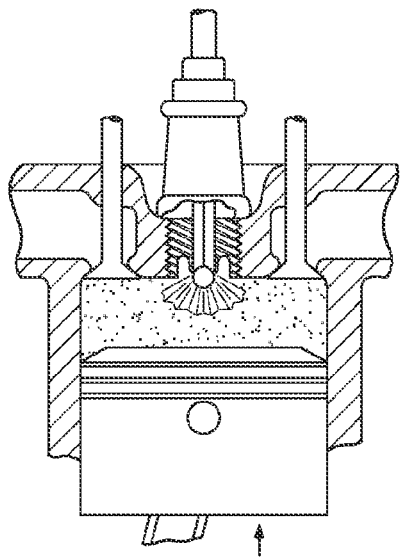
FIGS. 15A-15D illustrate the operation of the disclosure as provided in accordance with the principles of the disclosure.
Figure 15B:
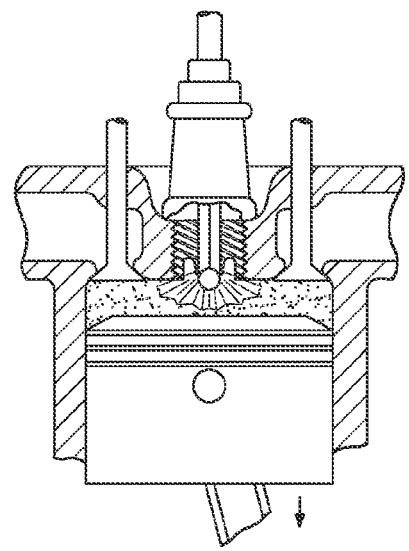
Figure 15C:
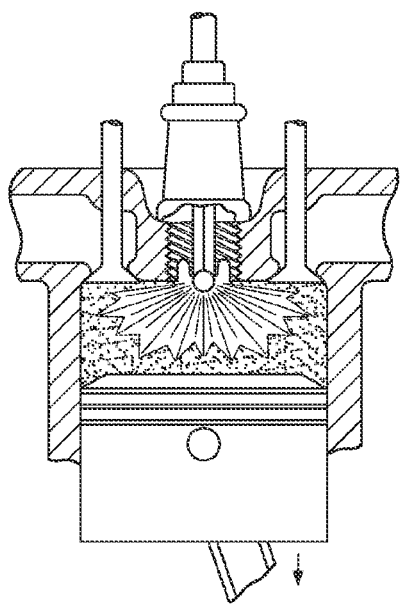
Figure 15D:
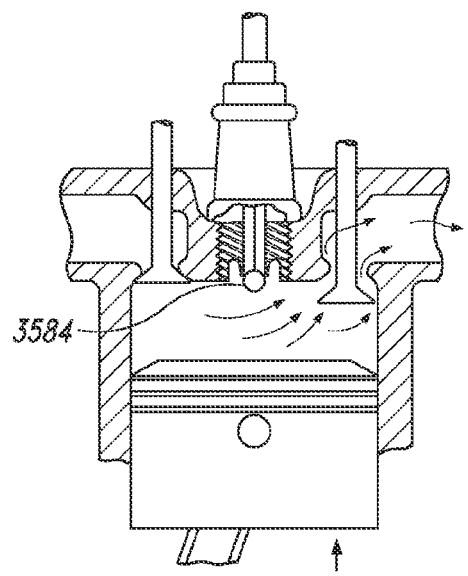

In certain embodiments, protection of fiber optic bundle or cable 3060 below the flow control valve 3074 is provided by substantially transparent check valve 3084 as shown in FIGS. 6 and 7. According to one embodiment, an exemplary fast-closing check valve is comprised of a ferromagnetic element encapsulated within a transparent body. This combination of functions may be provided by various geometries including a ferromagnetic disk within a transparent disk or a ferromagnetic ball within a transparent ball as shown. In operation, such geometries enable check valve 3084 to be magnetically forced to the normally closed position to be very close to flow control valve 3074 and the end of cable 3060 as shown. When flow control valve 3074 is lifted to provide fuel flow, check valve 3084 is forced to the open position within the well bore that cages it within the intersecting slots 3088 that allow fuel to flow through magnetic valve seat 3090 past check valve 3084 and through slots 3088 to present a very high surface to volume penetration of fuel into the air in the combustion chamber as shown in FIGS. 12 and 14 (discussed below). Accordingly, the cable 3060 continues to monitor combustion chamber events by receiving and transmitting radiation frequencies that pass through the check valve 3084. According to aspects of the disclosure, suitable materials for transparent portions of check valve 3084 include sapphire, quartz, high temperature polymers, and ceramics that are transparent to the monitoring frequencies of interest.

Generally, it is desired to produce the greatest torque with the least fuel consumption. In areas such as congested city streets where oxides of nitrogen emissions are objectionable, adaptive fuel injection and ignition timing provides maximum torque without allowing peak combustion temperatures to reach 2,200° C. (4,000° F.). One exemplary way to determine the peak combustion temperature is with a flame temperature detector that utilizes a small diameter fiber optic cable 3060 or a larger transparent insulator 3072. Insulator 3072 may be manufactured with heat and abrasion resisting coatings such as sapphire, or diamond-coating on the combustion chamber face of a high temperature polymer or from quartz, sapphire, or glass for combined functions within injector 3028 including light-pipe transmission of radiation produced by combustion to a sensor 3062D of controller 3062 as shown. Further, with reference to FIGS. 4 and 5, controllers 3062 and/or 3043 monitor the signal from sensor 3062D in each combustion chamber to adaptively adjust fuel-injection and/or spark-ignition timing to prevent formation of nitrogen monoxide.

Thus virtually any distance from the interface to the combustion chamber to a location above the tightly spaced valves and valve operators of a modern engine can be provided by fuel control forces transmitted to normally closed flow control valve 3074 by insulative cable 3060 along with integral spark ignition at the most optimum spark plug or diesel fuel injector location. The configuration of the fuel injector with integrated ignition of the present disclosure allows an injector to replace the spark plug or diesel fuel injector to provide precision fuel-injection timing and adaptive spark-ignition for high efficiency stratified charge combustion of a very wide variety of fuel selections, including less expensive fuels, regardless of octane, cetane, viscosity, temperature, or fuel energy density ratings. Engines that were previously limited in operation to fuels with specific octane or cetane ratings are transformed to more efficient longer lived operations by the present disclosure on fuels that cost less and are far more beneficial to the environment. In addition, it is possible to operate injector 3028, 3029, or 3029' as a pilot fuel delivery and ignition system or as a spark-only ignition system to return the engine to original operation on gasoline delivered by carburetion or intake manifold fuel injection systems. Similarly it is possible to configure injector 3028, 3029 or 3029' for operation with diesel fuel or alternative spark-ignited fuels according to these various fuel metering and ignition combinations.

Figure 11:
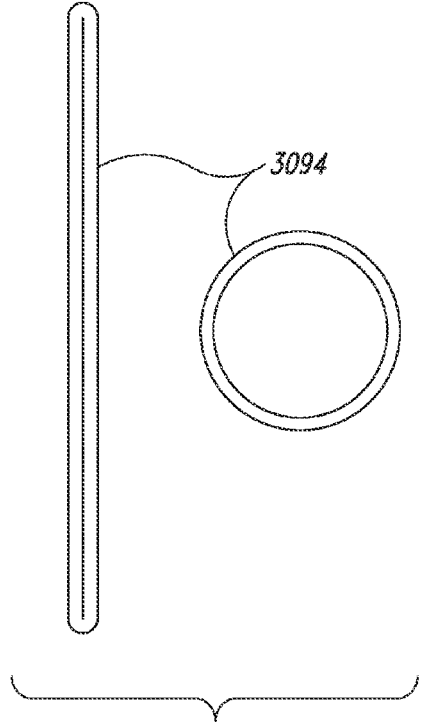
FIG. 11 is an end view of the component assembly of FIG. 10 configured in accordance with an embodiment of the disclosure.

According to further aspects of the disclosure, prevention of the formation of oxides of nitrogen is provided while adaptively controlling fuel-injection timing and spark-ignition timing for such purposes as maximizing fuel economy, specific power production, assuring lubricative film maintenance on combustion chamber cylinders, and/or minimization of noise. In certain embodiments it is preferred to extend cable 3060 fixedly through flow control valve 3074 to or near the combustion chamber face of fuel distribution nozzle to view combustion chamber events through the center of slots 3088 as shown in FIGS. 5, 7, and 11. In alternative embodiments, cable 3060 can form one or more free motion flexure extents such as loops above armature-stop ball 3035, which preferably enables armature 3048 to begin movement and develop momentum before starting to lift cable 3060 to thus suddenly lift flow control valve 3074, and fixedly passes through the soft magnet core 3045 to deliver radiation wavelengths from the combustion chamber to sensor 3040 as shown. According to embodiments of the disclosure, sensor 3040 may be separate or integrated into controller 3043 as shown. In one embodiment, an optoelectronic sensor system provides comprehensive monitoring of combustion chamber conditions including combustion, expansion, exhaust, intake, fuel injection and ignition events as a function of pressure and/or radiation detection in the combustion chamber of engine as shown. Thus with reference to FIGS. 4 and 6, the temperature and corresponding pressure signals from sensor 3040 and/or sensor 3062D and/or sensor 3062P to instantly correlate the temperature and time at temperature as fuel is combusted with the combustion chamber pressure, piston position, and with the chemical nature of the products of combustion.

Such correlation is readily accomplished by operating an engine with combined data collection of piston position, combustion chamber pressure by the technology disclosed in U.S. Pat. Nos. 6,015,065; 6,446,597; 6,503,584; 5,343,699; and 5,394,852; along with co-pending application 60/551,219 and combustion chamber radiation data as provided by fiber optic bundle/light-pipe assembly/cable 3060 to sensor 3040 as shown. Correlation functions that are produced thus enable the radiation signal delivered by cable 3060 to sensor 3040 and piston position data to indicate the combustion chamber pressure, temperature, and pattern of combustion conditions as needed to adaptively optimize various engine functions such as maximization of fuel economy, power production, avoidance of oxides of nitrogen, avoidance of heat losses, and the like. Thereafter the data provided by cable 3060 and sensor 3040 to controller 3043 can enable rapid and adaptive control of the engine functions with a very cost effective injector.

Thus, according to one embodiment, a more comprehensively adaptive injection system can incorporate both the sensor 3040 and cable 3060 along with one or more pressure sensors as is known in the art and/or as is disclosed in previously referenced patents and co-pending applications that are included herein by reference. In such instances it is preferred to monitor rotational acceleration of the engine for adaptive improvement of fuel economy and power production management. Engine acceleration accordingly may be monitored by numerous techniques including crankshaft or camshaft timing, distributor timing, gear tooth timing, or piston speed detection. Engine acceleration as a function of controlled variables including fuel species selection, fuel species temperature, fuel injection timing, injection pressure, injection repetition rate, ignition timing and combustion chamber temperature mapping enable remarkable improvements with conventional or less-expensive fuels in engine performance, fuel economy, emissions control, and engine life.

In accordance with aspects of the disclosure, development of spark plasma ignition with adaptive timing to optimize combustion of widely varying fuel viscosities, heating values, and vapor pressures is provided by this new combination of remote valve operator 3048 and the flow control valve 3074 positioned at or substantially adjacent to the combustion chamber interface. This configuration virtually eliminates harmful before or after dribble because there is little or no clearance volume between flow control valve 3074 and the combustion chamber. Fuel flow impedance, ordinarily caused by channels that circuitously deliver fuel, is avoided by locating the flow control valve 3074 at the combustion chamber interface. In certain embodiments, flow control valve 3074 can be urged to the normally closed condition by a suitable mechanical spring or by compressive force on cable or rod 3060 as a function of force applied by spring 3036 or by magnetic spring attraction to valve seat 3090 including combinations of such closing actions.

According to aspects of the disclosure, pressure-tolerant performance is achieved by providing free acceleration of the armature driver 3048 followed by impact on ball 3035, which is fixed on cable 3060 at a location and is designed to suddenly lift or displace ball 3035. In certain embodiments, the driver 3048 moves relatively freely toward the electromagnetic pole piece and past stationery cable 3060 as shown. After considerable momentum has been gained, driver 3048 strikes ball 3035 within the spring well shown. In the illustrated embodiment, the ball 3035 is attached to cable 3060 within spring 3036 as shown. Thus, in operation, sudden application of much larger force by this impact than could be developed by a direct acting solenoid valve causes the relatively smaller inertia, normally closed flow control valve 3074 to suddenly lift from the upper valve seat of the passageway in seat 3090.

This embodiment may utilize any suitable seat for flow control valve 3074; however, for applications with combustion chambers of small engines, it is preferred to incorporate a permanent magnet within or as seat 3090 to urge flow control valve 3074 to the normally closed condition as shown. Such sudden impact actuation of flow control valve 3074 by armature 3048 enables assured precision flow of fuel regardless of fuel temperature, viscosity, presence of slush crystals, or the applied pressure that may be necessary to assure desired fuel delivery rates. Permanent magnets such as SmCo and NdFeB readily provide the desired magnetic forces at operating temperatures up to 205° C. (401° F.) and assure that flow control valve 3074 is urged to the normally closed position on magnetic valve seat 3090 to thus virtually eliminate clearance volume and after dribble.

In illustrative comparison, if the flow control valve 3074 would be incorporated with armature 3048 for delivery within the bore of an insulator 3064 to conductive nozzle 3070, the after dribble of fuel that temporarily rested in the clearance volume shown could be as much in volume as the intended fuel delivery at the desired time in the engine cycle. Such flow of after dribble could be during the last stages of expansion or during the exhaust stroke and therefore would be mostly, if not completely, wasted while causing flame impingement loss of protective cylinder wall lubrication, needless piston heating, and increased friction due to differential expansion, and overheating of exhaust system components. This is an extremely important disclosure for enabling interchangeable utilization of conventional or lower-cost fuels to be utilized regardless of octane rating, vapor pressure, or specific fuel energy per volume.

Further, conventional valve operation systems would be limited to pressure drops of about 7 atmospheres compared to more than 700 atmospheres as provided by the sudden impact of driver 3048 on cable 3060 and thus on flow control valve 3074. Cryogenic slush fuels with prohibitively difficult textures and viscosities comparable to applesauce or cottage cheese are readily delivered through relatively large passageways to normally closed flow control valve 3074, which rests upon the large diameter orifice in seat 3090. Rapid acceleration then sudden impact of large inertia electromagnet armature 3048 transfers a very large lifting force through dielectric cable 3060 to suddenly and assuredly lift flow control valve 3074 off the large orifice in seat 3090 to open normally closed check valve 3084, if present, and jet the fuel slush mixture into the combustion chamber. The same assured delivery is provided without after dribble for fuels in any phase or mixtures of phases including hydrogen and other very low viscosity fuels at temperatures of 400° F. (204° C.) or higher as may be intermittently provided.

According to aspects of the disclosure, regardless of whether the fuel density is that of liquid gasoline or cryogenic hydrogen at cold engine startup and then becomes hundreds or thousands of times less dense as the engine warms up to provide heat for conversion of liquid fuels to gaseous fuels, precision metering and ignition of fuel entering the combustion chamber is provided without adverse after dribble. This allows a vehicle operator to select the most desirable and available fuel for refilling tank 3404 (shown in FIG. 14). Thereafter engine exhaust heat is recovered by heat exchanger(s) shown in FIG. 14 and injector provides the most desirable optimization of the fuel selected by utilization of engine waste heat to provide the advantages of hydrogen-characterized stratified charge combustion. In very cold climates and to minimize carbon dioxide emissions, it is preferred to transfer and store hydrogen or hydrogen-characterized gases in accumulator by transfer through solenoid valve at times when plentiful engine heat is available to reactor 3036. In operation, at the time of cold engine startup, valve is opened and hydrogen or hydrogen-characterized fuel flows through valve to pressure regulator and to injector(s) 3028 to provide an extremely fast, very high efficiency, and clean startup of engine.

Figure 8A:
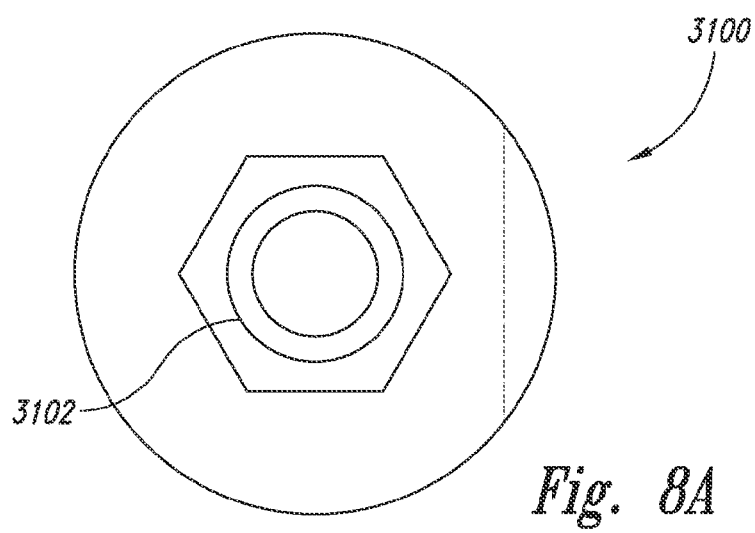
FIGS. 8A and 8B are unit valve assemblies configured in accordance with an embodiment of the disclosure.
Figure 8B:
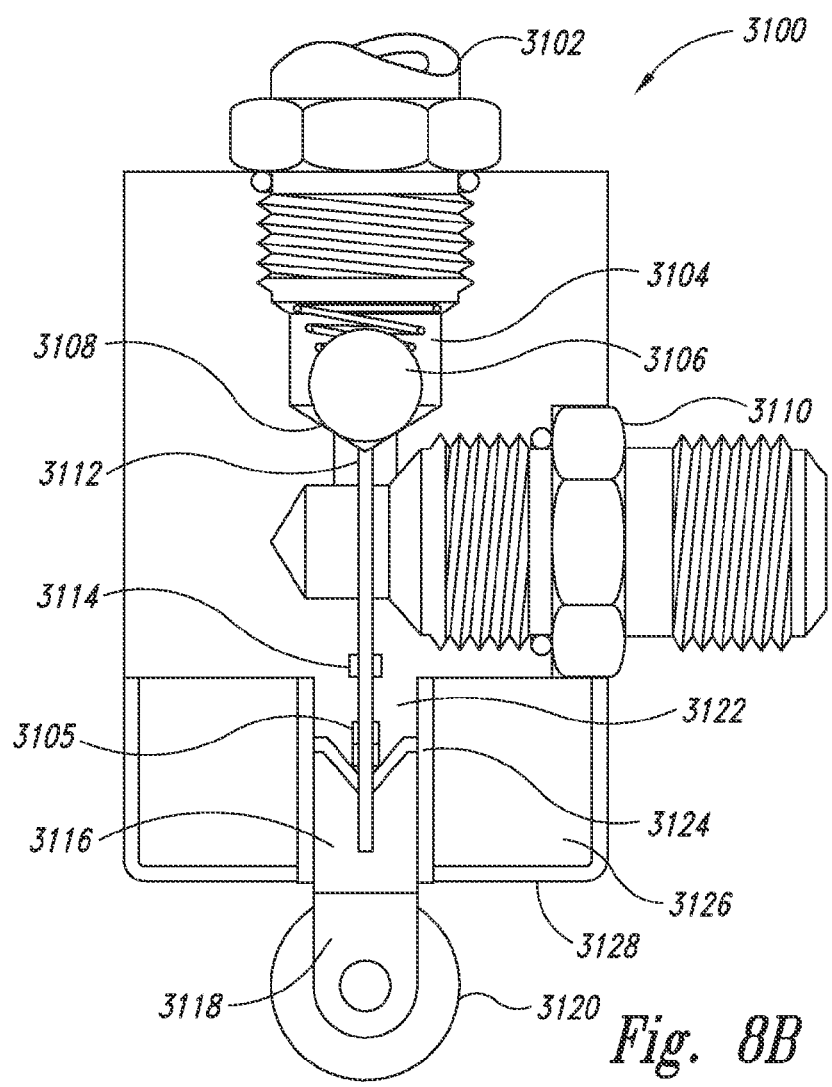

FIGS. 8A and 8B are unit valve assemblies configured in accordance with an embodiment of the disclosure. Providing the opportunity to utilize renewable fuels and improving the efficiency and longevity of large engines in marine, farming, mining, construction, and heavy hauling by rail and truck applications is essential, but it is extremely difficult to deliver sufficient gaseous fuel energy in large engines that were originally designed for diesel fuel. FIGS. 8A and 8B show a partial section of a unit valve 3100 for enabling controlled deliveries of pressurized supplies of large volumes of relatively low energy density fuels to each cylinder of an engine. According to aspects of this disclosure, unit valve 3100 is particularly beneficial for enabling very low energy density fuels to be utilized in large engines in conjunction with an injector as substantially stratified charge combustants at higher thermal efficiencies than conventional fuels. Unit valve 3100 also enables such fuels to be partially utilized to greatly improve the volumetric efficiency of converted engines by increasing the amount of air that is induced into the combustion chamber during each intake cycle.

In operation, pressurized fuel is supplied through inlet fitting 3102 to the valve chamber shown where spring 3104 urges a valve such as ball 3106 the closed position on seat 3108 as shown. In high-speed engine applications, or where spring 3104 is objectionable because solids in slush fuels tend to build up, it is preferred to provide seat 3108 as a pole of a permanent magnet to assist in rapid closure of ball 3106. When fuel delivery to a combustion chamber is desired, push rod 3112 forces the ball 3106 to lift off of the seat 3108 and fuel is permitted to flow around the ball 3106 and through the passageway shown to fitting 3110 for delivery to the combustion chamber. In certain embodiments, the push rod 3112 is sealed by closely fitting within the bore shown in 3122 or by an elastomeric seal such as a seal 3114. The actuation of push rod 3112 can be by any suitable method or combination of methods.

According to one embodiment, suitable control of fuel flow can be provided by solenoid action resulting from the passage of an electrical current through an annular winding 3126 within a steel cap 3128 in which solenoid plunger 3116 axially moves with connection to push rod 3112 as shown. In certain embodiments, the plunger 3116 is preferably a ferromagnetic material that is magnetically soft. The plunger 3116 is guided in linear motion by sleeve bearing 3124, which is preferably a self-lubricating or low friction alloy, such as a Nitronic alloy, or permanently lubricated powder-metallurgy oil-impregnated bearing that is threaded, interference fit, locked in place with a suitable adhesive, swaged, or braised to be permanently located on ferromagnetic pole piece 3122 of unit valve 3100 as shown.

In other embodiments, the valve ball 3106 may also be opened by impulse action in which the plunger 3116 is allowed to gain considerable momentum before providing considerably higher opening force after it is allowed to move freely prior to suddenly causing push rod 3112 to strike ball 3106. In this embodiment, it is preferred to provide sufficient "at rest" clearance between ball 3106 and the end of push rod 3112 when plunger 3116 is in the neutral position at the start of acceleration towards ball 3106 to allow considerable momentum to be developed before ball 3106 is suddenly impacted.

An alternative method for intermittent operation of push rod 3112 and thus ball 3106 is by rotary solenoid or mechanically driven cam displacement that operates at the same frequency that controls the air inlet valve(s) and/or the power stroke of the engine. Such mechanical actuation can be utilized as the sole source of displacement for ball 3106 or in conjunction with a push-pull or rotary solenoid. In operation, a clevis 3118 holds ball bearing assembly 3120 in which a roller or the outer race of an antifriction bearing assembly rotates over a suitable cam to cause linear motion of plunger 3116 and push rod 3112 toward ball 3106. After striking ball 3106 for development of fuel flow as desired, ball 3106 and plunger 3116 are returned to the neutral position by the magnetic seat and/or springs 3104 and 3105 as shown.

Figure 9:
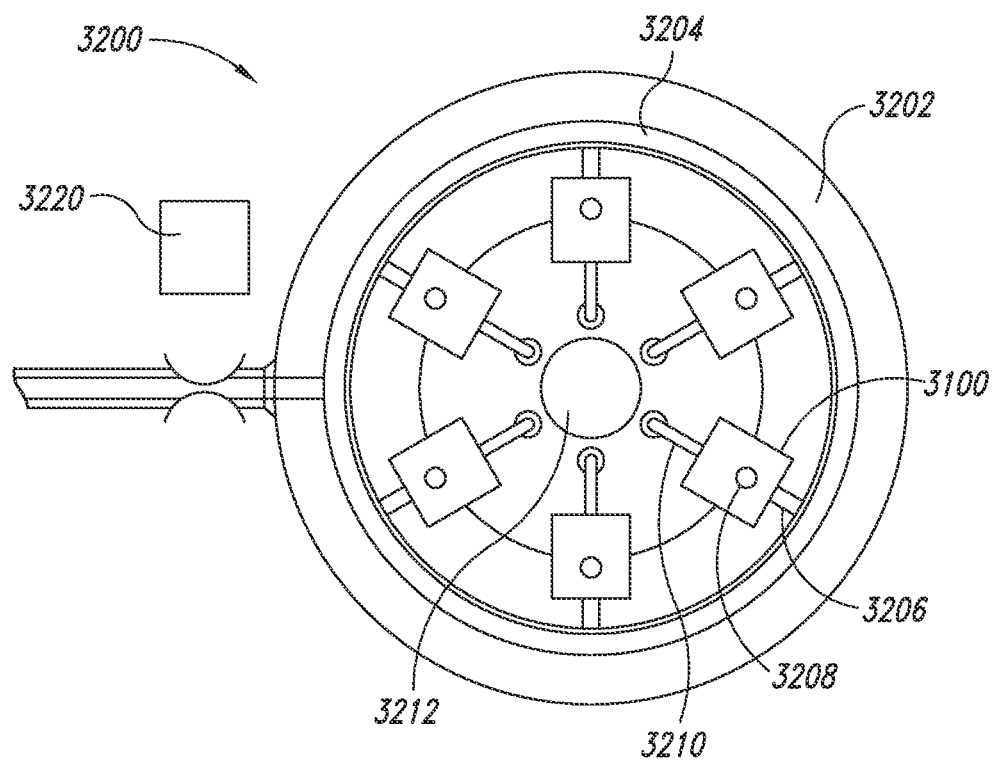
FIG. 9 is a schematic fuel control circuit layout of one embodiment of the disclosure.

It is similarly contemplated that suitable operation of unit valve 3100 may be by cam displacement of ball bearing assembly 3120 with "hold-open" functions by a piezoelectric operated brake (not shown) or by actuation of electromagnet 3126 that is applied to plunger 3116 to continue the fuel flow period after passage of the camshaft 3120 as shown in FIGS. 8A and 9. This provides fluid flow valve functions in which a moveable valve element such as ball 3106 is displaced by plunger 3112 that is forced by suitable mechanisms including a solenoid, a cam operator, and a combination of solenoid and cam operators in which the valve element 3106 is occasionally held in position for allowing fluid flow by such solenoid, a piezoelectric brake, and/or a combination of solenoid and piezoelectric mechanisms.

Fuel flow from unit valve 3100 may be delivered to the engine's intake valve port, to a suitable direct cylinder fuel injector, and/or delivered to an injector having selected combinations of the embodiments shown in greater detail in FIGS. 4, 5, 6, 7, 10 and 11. In some applications such as large displacement engines it is desirable to deliver fuel to all three entry points. In instances that pressurized fuel is delivered by timed injection to the inlet valve port of the combustion chamber during the time that the intake port or valve is open, increased air intake and volumetric efficiency is achieved by imparting fuel momentum to cause air-pumping for developing greater air density in the combustion chamber.

In such instances the fuel is delivered at a velocity that considerably exceeds the air velocity to thus induce acceleration of air into the combustion chamber. This advantage can be compounded by controlling the amount of fuel that enters the combustion chamber to be less than would initiate or sustain combustion by spark ignition. Such lean fuel-air mixtures, however, can readily be ignited by fuel injection and ignition by the injector embodiments of FIGS. 4, 5, 6, 7, 10 and 11, which provides for assured ignition and rapid penetration by combusting fuel into the lean fuel-air mixture developed by timed port fuel injection.

Additional power may be provided by direct cylinder injection through a separate direct fuel injector that adds fuel to the combustion initiated by the injector. Direct injection from one or more separate direct cylinder injectors into the combustion pattern initiated and controlled by the injector/igniter assures rapid and complete combustion within excess air and avoids the heat loss usually associated with separate direct injection and spark ignition components that require the fuel to swirl, ricocheting and/or rebounding from combustion chamber surfaces, and then to combust on or near surfaces around the spark ignition source.

In larger engine applications, for high-speed engine operation, and in instances that it is desired to minimize electrical current requirements and heat generation in annular winding 3126, it is particularly desirable to combine mechanical cam actuated motion with solenoid operation of plunger 3116 and ball 3112. This enables the primary motion of plunger 3116 to be provided by a cam shaft such as camshaft 3212 of FIG. 9. After the initial valve action of ball 3106 is established by cam action for fuel delivery adequate for idle operation of the engine, increased fuel delivery and power production is provided by increasing the "hold-on time" by continuing to hold plunger 3116 against stop 3122 as a result of creating a relatively small current flow in annular winding 3126. Thus, assured valve operation and precise control of increased power is provided by prolonging the hold-on time of plunger 3116 by solenoid action following quick opening of ball 3106 by cam action as shown in FIGS. 8A, 8B, 9 and 12.

Figure 10:
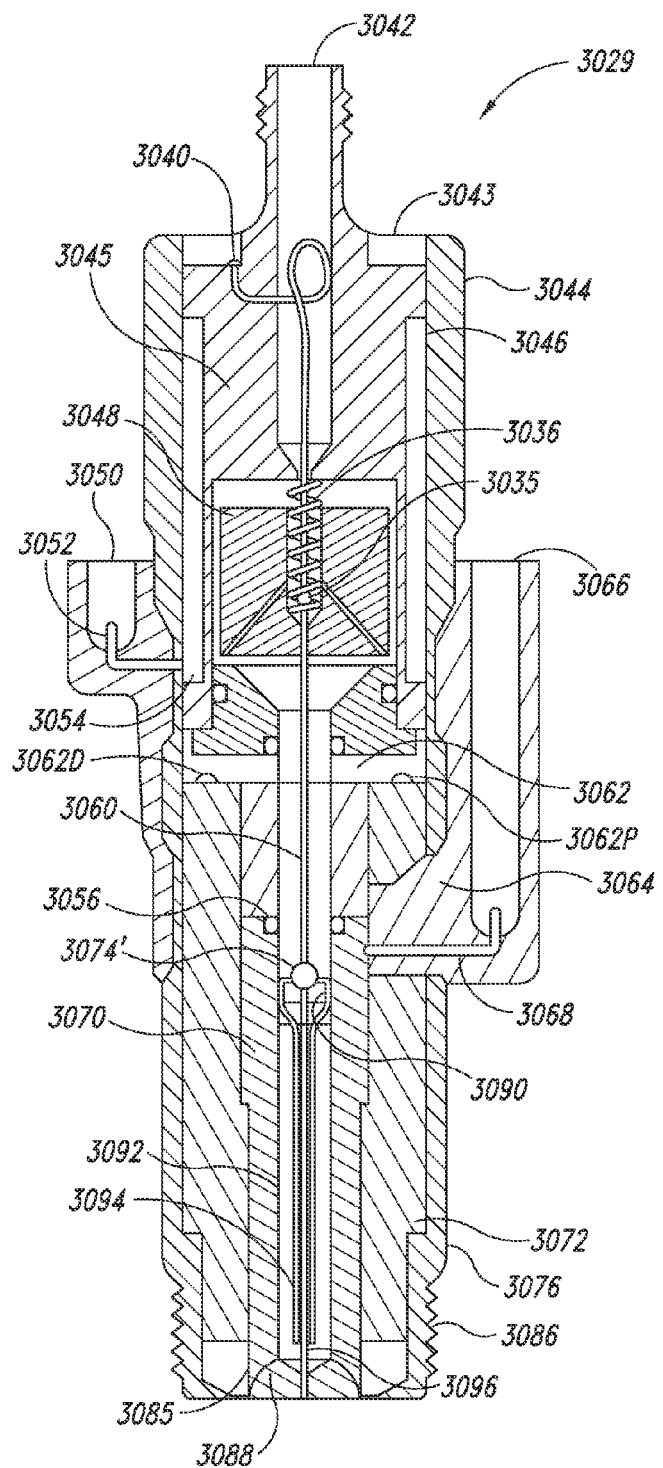
FIG. 10 is a longitudinal section of a component assembly of an embodiment that is operated in accordance with an embodiment of the disclosure.

According to aspects of the disclosure, engines with multiple combustion chambers are provided with precisely timed delivery of fuel by the arrangement unit valves of embodiment 3200 as shown in the schematic fuel control circuit layout of FIG. 9. In this illustrative instance, six unit valves (3100) are located at equal angular spacing within housing 3202. Housing 3202 provides pressurized fuel to each unit valve inlet 3206 through manifold 3204. The cam shown on camshaft 3212 intermittently actuates each push rod assembly 3210 to provide for precise flow of fuel from inlet 3206 to outlet 3208 corresponding to 3110 of FIG. 8B, which delivers the fuel to the desired intake valve port and/or combustion chamber directly or through the injector/igniter such as shown in FIGS. 6, 7, and 10. In certain embodiments, the housing 3202 is preferably adaptively adjusted with respect to angular position relative to camshaft 3212 to provide spark and injection advance in response to adaptive optimization algorithms provided by controller 3220 as shown.

In certain embodiments, the controller 3220 and associated components can preferably provide adaptive optimization of each combustion chamber's fuel-delivery and spark-ignition events as a further improvement in efficiency, power production, operational smoothness, fail-safe provisions, and longevity of engine components. Controller 3220 records sensor indications to determine the time between each cylinder's torque development to derive positive and negative engine acceleration as a function of adaptive fuel-injection and spark-ignition data in order to determine adjustments needed for optimizing desired engine operation outcomes.

Generally it is desired to produce the greatest torque with the least fuel consumption. However, in areas such as congested city streets where oxides of nitrogen emissions are objectionable, adaptive fuel injection and ignition timing provides maximum torque without allowing peak combustion temperatures to reach 2,200° C. (4,000° F.). This is achieved by the disclosure embodiments shown.

Determination of the peak combustion temperature is preferably provided by a flame temperature detector that utilizes a small diameter fiber optic cable or larger transparent insulator 3072 as shown in FIG. 10. In certain embodiments, insulator 3072 is manufactured with heat and abrasion resisting coatings such as sapphire, or diamond-coating on the combustion chamber face of a high temperature polymer or from quartz, sapphire, or glass for combined functions within the injector including light-pipe transmission of radiation produced by combustion to a sensor 3062D of controllers 3043, and/or 3432 as shown. Controller 3043, for example, monitors the wireless signal from sensor 3062D in each combustion chamber to adaptively adjust fuel-injection and/or spark-ignition timing to prevent formation of nitrogen monoxide or other oxides of nitrogen.

In certain embodiments, it is preferred to provide a cast or to injection mold polymer insulation through a hole 3064 provided through light pipe 3072 for high-voltage lead 3068 that protects and seals lead 3068, nozzle 3070, and controller 3062 adjacent to instrumentation 3062D and 3062P and forms insulating well 3066 as shown. In other embodiments, it is preferred to use this same insulator to form another insulator well 3066 similar to well 3050 in a location adjacent to, but below and rotated from, well 3050 for protecting electrical connections to controller 3062.

In certain high-speed engines embodiments and in single rotor or single cylinder applications it may be preferred to utilize solid-state controller 3062 as shown in FIG. 10 to provide optical monitoring of combustion chamber events. It is also preferred to incorporate one or more pressure sensor(s) 3062P in the face of controller 3062 in a position similar to or adjacent to sensor 3062D for generation of a signal proportional to the combustion chamber pressure. In certain embodiments, the pressure sensor 3062P monitors and compares intake, compression, power, and exhaust events in the combustion chamber and provides a comparative basis for adaptive control of fuel-injection and ignition timing as shown.

According to one embodiment, one option for providing fuel metering and ignition management is to provide the "time-on" duration by camshaft 3212 shown in FIG. 9 for idle operation of the engine. In certain embodiments, cam location can be remote from valve component 3106 through the utilization of a push rod such as 3112 and/or by a rocker arm for further adaptation as needed to meet retrofit applications along with the special geometries of new engine designs. Increased engine speed and power production is provided by increasing the "hold-on" time of plunger 3116, push rod 3112, and ball 3106 by passage of a low power current through annular winding 3126 for an increased fuel delivery time period after initial passage of rotating camshaft 3212. This provides a combined mechanical and electromechanical system to produce the full range of desired engine speed and power.

In accordance with the disclosure, ignition may be triggered by numerous initiators including Hall effect, piezoelectric crystal deformation, photo-optic, magnetic reluctance, or other proximity sensors that detect camshaft 3212 or other synchronous events such as counting gear teeth or by utilizing an optical, magnetic, capacitive, inductive, magneto-generator, or some other electrical signal change produced when plunger 3116 moves within bushing 3124 and annular winding 3126. After this plunger motion signal is produced it is preferred to utilize electronic computer 3072 or a separate engine computer such as 3220 or 3062 to provide adaptive fuel injection and spark timing to optimize one or more desired results selected from increased power production, increased fuel economy, reduced nitrogen monoxide formation, and to facilitate engine starting with least starter energy or to reverse the engine's direction of rotation to eliminate the need for a reverse gear in the transmission.

The present disclosure overcomes the problem of fuel waste that occurs when the valve that controls fuel metering is at some distance from the combustion chamber. This problem allows fuel to continue to flow after the control valve closes and results in the delivery of fuel when it cannot be burned at the optimum time interval to be most beneficial in the power stroke. It is particularly wasteful and causes engine and exhaust system degradation if such fuel continues to be dribbled wastefully during the exhaust stroke. In order to overcome this difficult problem of delivering sufficient volumes of gaseous fuel without dribble and after-flow at times when the fuel could not be optimally utilized, it is preferred to utilize injector 3028 or 3029 or 3029 as the final delivery point to convey fuel quickly and precisely into the combustion chambers of internal combustion engines that power the system of FIG. 14 and/or on-site engines or transportation applications that receive fuel delivered by the disclosure.

Fuel to be combusted is delivered to an injector as shown in FIG. 10 by suitable pressure fitting through inlet 3042. At times that it is desired to deliver fuel to the combustion chamber of a converted Diesel or spark-ignited engine, solenoid operator assembly 3043, 3044, 3046, 3048, and 3054 is used. Ferromagnetic driver 3048 moves in response to electromagnetic force developed when voltage applied on lead 3052 within insulator well 3050 causes electrical current in annular windings of insulated conductor 3046 and driver 3048 moves toward the solenoid core pole piece 3045 as shown.

Driver 3048 moves relatively freely toward the electromagnetic pole piece as shown past momentarily stationary dielectric fiber cable 3060. After considerable momentum has been gained, driver 3048 strikes ball 3035 within the spring well shown. Ball 3035 is attached to dielectric fiber cable 3060 within spring 3036 as shown. This sudden application of much larger force by momentum transfer than could be developed by a direct acting solenoid valve causes relatively smaller inertia normally closed valve component 3074 to suddenly lift from the upper valve seat of the passage way in seat 3090 as shown in FIG. 10.

Figure 13:
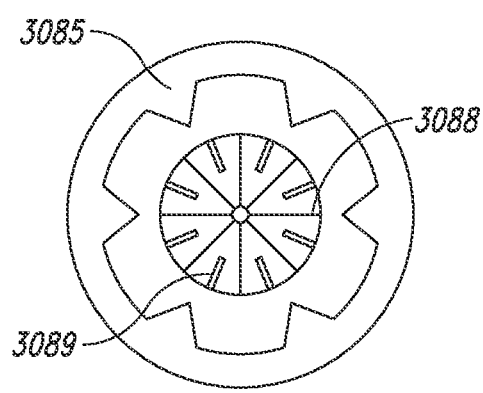
FIG. 13 is a magnified end view of the flattened tubing shown in FIG. 10.

FIG. 10 is a longitudinal section of a component assembly of an embodiment that is operated in accordance with an embodiment of the disclosure. FIG. 11 is an end view of 3094 in the component assembly of FIG. 10 configured in accordance with an embodiment of the disclosure. FIG. 12 is an illustration of an injector embodiment of the disclosure operated in accordance with the principles of the disclosure. FIG. 13 is a magnified end view of the flattened tubing shown in FIG. 10. In accordance with another embodiment of the multifuel injector 3029', a selected fuel is delivered at desired times for fuel injection to a flat spring tube 3094, which is normally flat and inflated by fuel that enters it to provide a rounded tube for very low impedance flow into the combustion chamber as shown in FIGS. 10 and 11. After completion of such forward fuel flow into the combustion chamber, flat spring tubing 3094 collapses to the essentially "zero clearance volume" closed position to serve effectively as a check valve against flow of pressurized gases from the combustion chamber. Fiber optic bundle 3060 is extended through flow control valve 3074' below magnetic seat 3090 to view the combustion chamber events by passing through the flat tube 3094 to the central convergence of slots 3088 as shown or in the alternative to extend as 3096 through a central hole of a family of holes provided at desired angles that would serve as well for distributing fuel to produce desired stratified charge combustion. (This alternative view is not specifically illustrated.)

FIG. 10 shows the flattened cross-section of flat spring tube 3094 that is flat between fuel injection events to effectively present a check valve against flow of combustion chamber gases between fuel injection events. FIG. 13 shows the magnified end views of flattened and fuel-inflated rounded tube cross-sections that alternately serve as a normally closed check valve and a free flow channel for delivery of fuel to the combustion chamber. Suitable elastomers that serve well as a material selection for the flat spring tube 3094 include PTFE, ETFE, PFA, PEEK, and FEP for a broad range of working temperatures from $-251°$ C. to $215°$ C. ($-420°$ F. to $+420°$ F.). It is intended that such flat/round tubes elastically inflate to more or less the limits of passage 3092 as fuel is transmitted and contract and conform to the space available for flattened material between fuel delivery intervals. Thus the flattened shape shown in FIG. 13 may assume crescent, twisted, curved and/or corrugated configurations to comply with the dimensions and geometry of passage 3092. Synergistic benefits include cooling of tube 3094 by fuel passage from heat exchanges as shown in FIG. 14 to assure long life of spring tube 3094.

In operation, as the flat spring tube 3094 collapses following fuel delivery bursts, combustion gases pass inward through slots 3088 and 3089 to fill the space left between bore 3092 of nozzle 3072 and the flattened tube as shown in the end view of FIG. 13. In adiabatic engine applications and very high performance engines this provides heat transfer to the flat tube and thus to the fuel that is cyclically passed through the flat tube. For such purposes it is particularly advantageous to warm deliveries of dense cool or super cold fuel. This unique arrangement also provides cooling of the upper regions of the injector assembly followed by heat transfer to the fuel for increasing the vapor pressure and/or energizing phase changes just prior to injection and ignition in the combustion chamber. Thus spring tube 3094 can further serve as a cyclic heat exchanger for beneficial operation with widely varying fuel selections and conditions as shown.

In instances that it is necessary to provide cold start and operation on low vapor pressure liquids such as methanol, ethanol, diesel fuel or gasoline injector 3028 or 3029 provides for very fast repeated open-and-close cycles of flow control valve 3074 to provide a new type of fuel delivery with exceptionally high surface to volume characteristics. By operating the flow control valve at duty cycles such as 0.0002 seconds open and 0.0001 seconds closed, which are achieved by the impact opening action of armature 3048 on very low inertia cable or rod 3060 and ball 3074, fuel is injected as a series of rarified and denser patterned waves as shown in FIG. 2, FIG. 3A, FIG. 3B, FIG. 3C and FIG. 3D from slots such as 3088 and 3089 as shown in FIGS. 4 and 5. This provides assured spark ignition followed by superior rates of combustion of the thin, high surface to volume fuel films that result during total overall injection periods of about 0.001 seconds at idle to about 0.012 seconds during acceleration of engine. Such patterned flat film waves of injected fuel from slots 3088 enable considerably later injection and assured ignition than possible with conventional approaches to produce homogeneous charge air-fuel mixtures or compromised stratified charge air-fuel mixtures by rebounds or ricochets from combustion chamber surfaces as necessitated by a separate fuel injector and spark plug combination.

Adaptive timing of spark ignition with each wave of injected fuel provides much greater control of peak combustion temperature. In operation, this enables initially fuel-rich combustion to kindle the fuel film followed by transition by the expanding flame front into excess air that surrounds the stratified charge combustion to produce far air-rich combustion to assure complete combustion without exceeding the peak combustion temperature of $2,204°$ C. ($4,000°$ F.) to thus avoid oxides of nitrogen formation.

The combination of embodiments disclosed provides a methodology and assured process for energy conversion comprising the steps of storing one or more fuel substances in a vessel, transferring such fuel and/or thermal, thermochemical, or electrochemical derivatives of such fuel to a device that substantially separates the valve operator such as 3048 from the flow control valve 3074 at the interface of a combustion chamber of an engine to control such fuel or derivatives of such fuel by an electrically insulating cable to substantially eliminate fuel dribble at unintended times into the engine's combustion chamber. This combination enables efficient utilization of virtually any gaseous, vaporous, liquid, or slush fuel regardless of fuel energy density, viscosity, or octane or cetane number. Development of sufficient voltage potential on or through valve 3074 at the combustion chamber provides plasma or spark ignition of entering fuel at adaptively precise times to optimize engine operations.

According to aspects of this disclosure, multifuel injection and ignition system for energy conversion is applicable to mobile and stationary engine operations. Hybrid vehicles and distributed energy applications are particularly worthy examples of such applications. In instances that maximum power from engine 3430 is desired, it is preferred to use hydrogen, if available from tank 3404, or hydrogen-characterized fuel produced by embodiment 236, which is then cooled by embodiment 3426 and/or by mixing with cooler feedstock from tank 3404, and to provide stratified charge injection during the compression stroke in engine 30 to cool the unthrottled air charge to reduce back work due to compression work followed by adaptive spark ignition timing to quickly combust the hydrogen or hydrogen-characterized fuel to maximize brake mean effective pressure (BMEP).

In instances that minimization of oxides of nitrogen are desired it is preferred to use hydrogen or hydrogen-characterized fuel and adaptively adjust injection timing and ignition timing to produce the highest BMEP without exceeding the peak combustion chamber temperature of 2,204° C. (4,000° F.). In instances that it is desired to produce the quietest operation it is preferred to monitor operational noise at one or more acoustic sensors such as 3417, near the exhaust manifold and near the exhaust pipe and to adaptively adjust fuel injection timing and ignition timing for minimum noise in the acoustical wavelengths heard by humans. In instances that it is desired to produce maximum engine life it is preferred to adaptively adjust fuel injection timing and ignition timing to produce the highest BMEP with the least amount of heat transfer to combustion chamber surfaces.

FIG. 12 shows partial views of characteristic engine block and head components and of injector 3328 that operates as disclosed regarding embodiments 3028, 3029, or 3029' with an appropriate fuel valve operator located in the upper insulated portion 3340 and that is electrically separated from the fuel flow control valve located very near the combustion chamber in which the stratified charge fuel injection pattern 3326 is asymmetric as shown to accommodate the combustion chamber geometry shown. Such asymmetric fuel penetration patterns are preferably created by making appropriately larger fuel delivery passageways such as wider gaps in portions of slots 3088 and 3089, shown in FIGS. 4, 5, 6, 7, and 10, to cause greater penetration of fuel entering the combustion chamber on appropriate fuel penetration rays of pattern 3326 as shown to provide for optimized air utilization as a combustant and an excess air insulator surrounding combustion to minimize heat losses to piston components of the head including intake or exhaust valve 3322, or the engine block including coolant in passages as shown.

In instances that it is desired to maximize production of oxides of nitrogen for medical, industrial, chemical synthesis, and agricultural applications, it is preferred to maximize stratified charge combustion temperatures and to operate at high piston speeds to quickly produce and quench oxides of nitrogen that are formed in the combustion chamber. This enables combined production of desired chemical species, while efficiently producing motive power for electrical generation, propulsion, and/or other shaft power applications. The system that combines operation as disclosed with respect to FIGS. 4, 6, 8, 9, 10, and 12 is particularly effective in providing these novel developments and benefits.

FIG. 14 is a schematic illustration including sectional views of certain components of system 3402 configured in accordance with an embodiment of the disclosure. More specifically, FIG. 14 shows a system 3402 by which fuel selections of greatly varying temperature, energy density, vapor pressure, combustion speed, and air utilization requirements are safely stored and interchangeably injected and ignited in a combustion chamber. The system 3402 can include a fuel storage tank 3404 having an impervious and chemically compatible fuel containment liner 3406 that is sufficiently over wrapped with fiber reinforcement to withstand test pressures of 7,000 atmospheres or more and cyclic operating pressures of 3,000 atmospheres or more as needed to store gases and/or vapors of liquids as densely as much colder vapors, liquids or solids.

As further shown in FIG. 14, a regulator 3412 can deliver fuel to a fuel cell 3437 through a control valve 3439. According to one embodiment, the fuel cell 3437 may be reversible to create hydrogen from a feedstock such as water and may be of any suitable type including low temperature and high temperature varieties and as characterized by electrolyte types. In accordance with this embodiment, fuels stored in tank 3404 can be converted to fuel species that are more appropriate for higher efficiency applications in fuel cell 3437 than could be provided by a system that provides such preferred fuel species by conventional reforming operations. Combination of such components and operations of the disclosure thus provide an extremely efficient hybridization and convenience in achieving greater operational efficiency and function.

According to one embodiment, the tank 3404 can be quick-filled by flowing fuel through various valves, for example, a fill port 3410, a first four-way valve 3411, and a second four-way valve 3414 as shown in FIG. 14. Reflective dielectric layers 3416 and sealing layer 3418 provide thermal insulation and support of pressure assembly 3406 and 3408, which are designed to provide support and protection of storage system 3406 and 3408 while minimizing heat transfer to or from storage in 3406 as shown. According to aspects of the embodiment, the dielectric layers 3416 and sealing layer 3418 can be coated with reflective metals. For example, these transparent films of glass or polymers can be very thinly coated on one side with reflective metals such as aluminum or silver to provide reflection of radiant energy and reduced rates of thermal conduction. In alternative embodiments, the dielectric materials themselves can provide for reflection because of index of refraction differences between materials selected for alternating layers.

According to further aspects, the length of time needed for substantial utilization of the coldest fuel stored in assembly 3406 and 3408 can be accounted for. For example, the effective length of the heat conduction path and number of reflective layers of insulation 3416 selected can provide for heat blocking sufficient to minimize or prevent humidity, condensation, and ice formation at the sealed surface of 3418. Accordingly, the tank 3404 can provide for acceptable development of pressure storage as cryogenic solids, liquids, and vapors become pressurized fluids with very large energy density capacities at ambient temperatures. Similarly fluids, for example, cool ethane and propane, can be filled in assembly 3404 without concern about pressure development that occurs when the tank is warmed to ambient conditions.

According to further aspects, tank 3404 can also provide safe storage of solids such as super cold hydrogen solids as a slush within cryogenic liquid hydrogen and super cold methane solids as a slush within cryogenic liquid hydrogen or methane. Melting of such solids and the formation of liquids and subsequent heating of such liquids to form vapors are well within the safe containment capabilities of assembly 3406 and 3408 while ice prevention on surface 3418 and damage to surface components is prevented by the insulation system 3416 and sealing layer 3418.

According to further aspects, suitable fluid fuels for transfer into and storage within the tank 3404 include cryogenic hydrogen and/or methane. In operation, it may be convenient to fill and store tank 3404 with ethane, propane, butane, methanol, or ethanol. Additionally, gasoline or clean diesel fuel could also be stored in tank 3404 after appropriate curing of the tank 3404 with at least two tanks of ethanol or methanol before refilling with cryogenic fuels. Accordingly, a convenient storage of the most desirable fuel to meet pollution avoidance, range, and fuel-cost goals is provided. According to aspects of the disclosure, utilization of hydrogen in urban areas to provide air-cleaning capabilities is contemplated while the interchangeable use of renewable producer gas mixtures of hydrogen and carbon monoxide, methanol, ethanol, ethane or propane is accommodated. This provides opportunities and facilitates competition by farmers and entrepreneurs to produce and distribute a variety of fuels and meet the needs of motorists and co-generators that desire storage for longer-range capabilities and/or lower-cost fuels.

As shown in FIG. 14, by opening/closing valve 3414, fuel delivery from tank 3404 may be from the bottom of the tank through strainer 3420 or from the top of the tank through strainer 3422 according to the desired flow path as shown. In instances that tank containment assemblies 3406 and 3408 are subjected to severe abuse, containment of the fuel selection within liner 3406 and integral reinforcement 3408 is maintained. According to aspects of the disclosure, the super jacket assembly of the dielectric layer 3416 and the sealing layer 3418 minimizes radiative, conductive, and convective heat transfer, increases the fire rating by reflecting radiation, insulates against all forms of heat gain, and dissipates heat for a much longer time than conventional tanks.

According to additional embodiments, in case of extended exposure to fire the temperature of assembly 3406 and 3408 or the storage pressure may eventually build to the point of requiring relief. At the point that the temperature and/or pressure builds to a suitable percentage of maximum allowable storage, an embedded pressure sensor 3431 and temperature sensor 3433 report information by wireless, fiber optic, or wire connection to "black-box" controller 3432 to signal four-way valve 3414 to first prioritize sending additional fuel to engine 3430 as shown. If engine 3430 is not operating at the time its status is interrogated by controller 3432 to determine if it is safe and desirable to run with or without a load. In operation, engine 3430 can be started and/or shifted to operation at sufficient fuel consumption rates to prevent over pressurization or over temperature conditions within tank assembly 3404.

As shown in FIG. 14, the system 3402 includes an injector device 3428 to facilitate very rapid automatic starting of engine 3430 and can, contrary to the preferred normal high efficiency mode of operation, provide for low fuel efficiency with injection and ignition timing to produce homogeneous charge combustion and considerable back work. According to aspects of this embodiment, fuel can be consumed much more rapidly than with higher efficiency stratified charge operation with adaptively adjusted fuel injection and ignition timing to optimize thermal efficiency. In accordance with the disclosure, the injector device 3428 also facilitates engine operation during an abnormal application of air restriction to engine 3430 ("throttled air entry") to produce an intake vacuum, and this enables the fuel delivery system to greatly reduce the pressure to allow boiling or to provide suction on tank 3404 to force evaporative fuel cooling in case it is necessary to remove very large heat gains due to prolonged fire impingement on tank 3404. Such modes of useful application of fuel from tank 3404 rather than dumping of fuel to the atmosphere to relieve pressure during exposure to fire is highly preferred because engine power can be delivered to water pumping applications to cool the tank and extinguish the fire or to provide propulsion to escape from the fire. This mode of safe management of resources to overcome hazards is applicable in stationary power plants and emergency response vehicles, especially forest and building fire-fighting equipment.

If such failsafe provisions are not sufficient to prevent over pressurization or over temperature conditions in tank 3404, additional fuel is dumped by pressure relief provisions within valve 3414 to the air through safe stack 3434 as shown. Safe stack 3434 is preferably to a safe zone 3465 designed for hot gas rejection such as to a chimney or an exhaust pipe of a vehicle and to thus prevent harm to any person or property.

As further shown with reference to FIG. 14, it is preferred to utilize hydrogen from an accumulator 3419 as provided by a regulator or a similar regulator to supply processed fuel as a cover gas for rotating equipment such electricity generators and a engine 3430 for the purpose of removing heat generated by the rotating equipment and for reducing windage and friction losses. It has been found that the purity of such hydrogen is not critical and significant amounts of methane, carbon monoxide, etc., may be present without harming the rotating equipment and that very substantial improvements in efficiency and energy conversion capacity are provided by such use. Thus virtually any primary fuel that contains hydrogen or reacts with a compound that contains hydrogen such as water to produce hydrogen can be converted by the embodiments of this disclosure for hydrogen cooling and reduction of windage losses of generators and improved efficiency and greater safety of internal combustion engines. Embodiments of FIG. 14 along with 3028, 3029, 3100, 3200, and 3029' enable the low energy density hydrogen to be utilized as superior heat transfer agent and as a preferred fuel for fuel cell 3437 and engine 3430.

A particularly important application is to utilize such hydrogen for reducing the operating temperature in the windings of rotating electricity generators to enable more efficient operation and greater energy conversion capacity. After being warmed by passage through such rotating equipment, hydrogen can then be routed to the crankcase of a piston engine and then to the injectors and/or valve assembly 3200 of such engines to be utilized as fuel in the engine. This improves the efficiency of co-generation applications and increases the capacity of the resulting system. Filling the crankcase 3455 of a piston engine with a hydrogen atmosphere improves operational safety by assuring that there cannot be a combustible mixture of air and hydrogen in the crankcase to support inadvertent ignition. This lower viscosity atmosphere synergistically reduces the windage and friction losses from the relative motion components of the engine. It also greatly improves the life of lubricating oil by elimination of adverse oxidizing reactions between oxygen and oil films and droplets that are produced in the crankcase. By maintenance of a dry hydrogen atmosphere in the crankcase above the vaporization temperature of water, the further benefit of water removal and avoidance of corrosion of bearings and ring seals, etc., due to the presence of electrolytic water is achieved.

Such moisturization of hydrogen in conjunction with crankcase-sourced water removal is highly advantageous for maintenance of the proton exchange membrane (PEM) in fuel cells such as 3437 particularly in hybridized applications. This enables extremely flexible and efficient operation of systems based on the embodiments of FIG. 14 that range in demand from a few kilowatts output by fuel cell 3437 to megawatts capacity by combining the engine-generator indicated with such fuel cell operation to meet changing demands due to daily variations, seasonal weather induced needs, or production requirements.

In normal operation, at cold engine start conditions with a cold fuel selection in tank 3404, fuel vapors are taken from the top of storage tank 3404 through the strainer 3422, the multiway valve 3414, and by an insulated conduit 3425 to the injector device 3428 for injection and ignition to form stratified charge combustion and sudden heating of surplus air in all combustion chambers of the engine 3430 that are on power stroke. If more power is needed than provided by the fuel rate sustainable by the vapor supply in the top of tank 3404, then liquid fuel is taken from the bottom of fuel tank 3404 through the strainer 3420 and delivered to the injector device 3428. According to aspects of the disclosure, after the engine has warmed up, exhaust heat can be used to pressurize and vaporize liquid fuel in heat exchanger 3436. According to still further aspects, heat exchanger 3436 may incorporate one or more suitable catalysts for generation of new fuel species from liquid, vapor or gaseous fuel constituents.

In accordance with the disclosure and depending upon the chemical nature of the fuel stored in tank 3404, the heat exchanger 3436 can produce a variety of hydrogen-characterized fuels for improving the operation of the engine 3430. For example, wet methanol can be vaporized and dissociated by the addition of heat to produce hydrogen and carbon monoxide as shown in Equation 1:

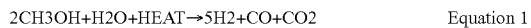

$$2CH_3OH + H_2O + HEAT \rightarrow 5H_2 + CO + CO_2 \quad \text{Equation 1}$$

As illustrated in Equation 2, endothermic reforming of inexpensive wet ethanol can be provided with heat and/or with the addition of an oxygen donor such as water:

$$C_2H_5OH + H_2O + HEAT \rightarrow 4H_2 + 2CO \quad \text{Equation 2}$$

Accordingly, the present embodiment enables utilization of biomass alcohols from much lower-cost production methods by allowing substantial water to remain mixed with the alcohol as it is produced by destructive distillation, synthesis of carbon monoxide and hydrogen and/or by fermentation and distillation. In operation, this enables more favorable energy economics as less energy and capital equipment is required to produce wet alcohol than dry alcohol. Without being bound by theory, the process and system disclosed herein further facilitates the utilization of waste heat from an engine to endothermically create hydrogen and carbon monoxide fuel derivatives and to release up to 25% more combustion energy than the feedstock of dry alcohol. Additional benefits are derived from the faster and cleaner burning characteristics provided by hydrogen. Accordingly, by utilization of the injector device 3428 to meter and ignite such hydrogen-characterized derivative fuel as a stratified charge in unthrottled air, overall fuel efficiency improvements of more than 40% compared to homogeneous charge combustion of dry alcohol(s) are achieved.

According to still further embodiments, water for the endothermic reactions shown in Equations 1 and 2 can be supplied by an auxiliary water storage tank 3409, and/or by collection of water from the exhaust stream and addition to the auxiliary tank 3409, or by pre-mixing water and, if needed, a solubility stabilizer with the fuel stored in the tank 3404 and/or by collection of water that condenses from the atmosphere in air flow channel 3423 upon surfaces of heat exchanger 3426. As shown in FIG. 14, the pump 3415 provides delivery of water through check valve 3407 to the heat exchange reactor 3436 at a rate proportional to the fuel rate through valve 3411 and check valve 3407 in order to meet stoichiometric reforming reactions.

Fuel alcohols such as ethanol, methanol, isopropanol, etc., are soluble in stoichiometric proportions with water and produce considerably more hydrogen on endothermic reforming as generally illustrated and summarized by Equations 1 and 2. This enables much lower cost fuel to be advantageously utilized for example, on farms and by other small businesses. Cost savings include but are not limited to the reduction in refinement energy to remove water and transportation from distant refineries.

Burning any hydrocarbon, hydrogen, or a hydrogen-characterized fuel in engine 3430 yields water in the exhaust of the engine. According to aspects of the disclosure, substantial portions of such exhaust stream water can be recovered, for example, at a liquid stripper 3405 after cooling the exhaust gases below the dew point. According to one embodiment, the countercurrent heat exchanger/reactor 3436 provides most if not all of the heat needed for endothermic reactions characterized by Equations 1 and 2 and doing so dramatically cools the exhaust. Depending upon the countercurrent flow rates and areas provided, the exhaust gases can be cooled to near the fuel storage temperature. This readily provides condensation of water and in numerous additional new embodiments, the disclosure applying this application is combined with processes for storing fuels and/or utilizing exhaust heat to power bottoming cycles and/or in combination with hybridized engines, electrolyzers, reversible fuel cells and/or to collect water as disclosed in U.S. Pat. Nos. 6,756,140; 6,155,212; 6,015,065; 6,446,597; 6,503,584, 5,343,699; and 5,394,852 and any nonprovisional patent application claiming priority to co-pending provisional patent application 60/551,219, herein incorporated in their entirety by reference.

In instances that sufficient heat is not available or the desired temperature for endothermic reforming reactions in reactor 3436 has not been achieved, a pump 3403 can provide oxygen-rich exhaust gases to reactor 3436 as shown in FIG. 14. The use of a pump in accordance with this embodiment facilitates a combination of exothermic reactions between oxygen and the fuel species present to produce carbon monoxide and/or carbon dioxide along with hydrogen along with endothermic reforming reactions that are bolstered by the additional heat release. In conventional use of the products of reactions within reactor 3436, this would provide objectionable byproducts such as nitrogen, however, the injector device 3428 is capable of injecting and quickly delivering large gaseous volumes into the combustion chamber at or near top dead center or during power stroke times and conditions that do not compromise the volumetric or thermal efficiencies of engine 3430.

Thus fuel containing hydrogen is stored by tank 3404 in a condition selected from the group including cryogenic slush, cryogenic liquid, pressurized cold vapor, adsorbed substance, ambient temperature supercritical fluid, and ambient temperature fluid and by heat addition from the exhaust of an engine and converted to an elevated temperature substance selected from the group including hot vapors, new chemical species, and mixtures of new chemical species and hot vapors and injected into the combustion chamber of an engine and ignited. Sufficient heat may be removed from engine 3430's exhaust gases to cause considerable condensation of water, which is preferably collected for the purpose of entering into endothermic reactions in higher temperature zones of reactor 3436 with the fuel containing hydrogen to produce hydrogen as shown. Equation 3 shows the production of heat and water by combustion of a hydrocarbon fuel such as methane:

$$CH4+3O2 \rightarrow CO2+2H2O \qquad \text{Equation 3}$$

Equation 4 shows the general process for reforming of hydrocarbons such as methane, ethane, propane, butane, octane, gasoline, diesel fuel, and other heavier fuel molecules with water to form mixtures of hydrogen and carbon monoxide:

$$CxHy+XH2O+HEAT \rightarrow (0.5Y+X)H2+XCO \qquad \text{Equation 4}$$

Equations 3, 5, and 6 illustrate that the amount of water produced by combustion of a hydrocarbon such as methane is two or three times as much water as needed to reform methane into more desirable hydrogen-characterized fuel:

$$CH4+H2O+HEAT \rightarrow 3H2+CO \qquad \text{Equation 5}$$

Equation 6 illustrates the advantage of reforming a hydrocarbon such as methane and burning the resultant fuel species of Equation 5 to produce more expansion gases in the power stroke of the combustion chamber along with producing more water for reforming reactions in reactor 3436.

$$3H2+CO+2O2 \rightarrow 3H2O+CO2 \qquad \text{Equation 6}$$

Accordingly, reforming methane with water to make and combust producer gas (hydrogen and carbon monoxide) provides more combustion energy and about three times as much product water as needed for the endothermic reformation of methane in reactor 3436. Thus along with water condensed in the heat exchanger 3426, ample water can be collected by a vehicle or stationery application of the present disclosure. Collection of water reduces curb weight because most of the weight of water used in reactor 3436 is gained by combustion oxygen from the air with hydrogen or hydrogen-characterized fuel in the engine 3430. Thus each gram of hydrogen combines with eight grams of atmospheric oxygen to provide nine grams of collectable water from the exhaust of the engine 3430.

According to still further embodiments, adequate purified water can be supplied for operation of one or more electrolysis processes at high or low temperatures available by heat exchanges from the engine 3430 or cool fuel from the tank 3404 to support regenerative operations in hybrid vehicles and/or load leveling operations along with the reactions, including catalytically supported reactions, in the heat exchanger 3436. This embodiment yields improved overall energy utilization efficiency, which is provided by the synergistic combinations described herein and is further noteworthy because such ample supplies of pure water do not require bulky and maintenance-prone reverse osmosis, distillation systems, or other expensive and energy-consuming equipment.

Numerous other advantages are provided by the hydrogen-characterized fuels that are produced including:

Hydrogen burns 7 to 10 times faster than methane and similar hydrocarbons and this enables ignition timing to be much later than with the original hydrocarbon species and avoids substantial back work and heat loss that would have accompanied ignition during earlier stages of compression.

Hydrogen and carbon monoxide produced by endothermic reforming reactions release up to 25% more heat during combustion than the original hydrocarbon. This is due to the thermodynamic investment of endothermic heat in the formation of hydrogen and carbon monoxide from the original hydrocarbon. This is a particularly beneficial way to use waste heat from an engine's water jacket or air-cooling system along with higher quality heat from the exhaust system as shown.

Hydrogen burns very cleanly and assures extremely rapid combustion propagation and assures complete combustion within excess air of any hydrocarbons that pass through the reforming reactions to become additional constituents of hydrogen-characterized fuel mixtures.

Rapid combustion of hydrogen and/or other fuel species in the presence of water vapors that are delivered by injector device 3428 rapidly heats such vapors for stratified charge insulated expansion and work production in the combustion chamber to provide much greater operating efficiency compared to homogenous charge methods of water vapor expansion.

Rapid heating of water vapors along with production of water vapors by combustion greatly reduces oxides of nitrogen by reducing the peak temperature of products of combustion and by synergistic reaction of such reactive water vapors with oxides of nitrogen to greatly reduce the net development and presence of oxides of nitrogen in the exhaust gases.

Rapid ignition and heating by rapid combustion of hydrogen characterized fuel oxidation as uniquely established by injector device 3428 provides more time in the combustion chamber for beneficial synergistic reactions that completely oxidize all fuel constituents and reduce oxides of nitrogen in the exhaust stream.

FIGS. 15A-15D sequentially illustrate the stratified charge combustion results by a valve actuation operator such as generally disclosed regarding piezoelectric or electromagnetic armature within the upper portion of injector device 3428 and which is electrically separated from but mechanically linked with the flow control valve 3584, which is located at the interface to the combustion chamber as shown. In this instance, flow control component 3584 serves as the moveable flow control valve that is displaced toward the combustion chamber to admit injected fuel and is moved upward to the normally closed position to serve as a check valve against combustion gas pressure. Ignition of injected fuel occurs as plasma discharge is developed by the voltage potential applied between the threaded ground to the engine head or block and the insulated flow control valve assembly of component 3584 as shown.

Dielectric Features of Integrated Injectors/Igniters

FIG. 16 is a cross-sectional side partial view of an injector 410 configured in accordance with an embodiment of the disclosure. The injector 410 shown in FIG. 16 illustrates several features of the dielectric materials that can be used according to several embodiments of the disclosure. The illustrated injector 410 includes several features that can be at least generally similar in structure and function to the corresponding features of the injectors described above with reference to FIGS. 1-3D. For example, the injector 410 includes a body 412 having a nozzle portion 418 extending from a middle portion 416. The nozzle portion 418 extends into an opening or entry port 409 in the engine head 407. Many engines, such as diesel engines, have entry ports 409 with very small diameters (e.g., approximately 7.09 mm or 0.279 inch in diameter). Such small spaces present the difficulty of providing adequate insulation for spark or plasma ignition of fuel species contemplated by the present disclosure (e.g., fuels that are approximately 3,000 times less energy dense than diesel fuel). However, and as described in detail below, injectors of the present disclosure have bodies 412 with dielectric or insulative materials that can provide for adequate electrical insulation for ignition wires to produce the required high voltage (e.g., 60,000 volts) for production, isolation, and/or delivery of ignition events (e.g., spark or plasma) in very small spaces. These dielectric or insulative materials are also configured for stability and protection against oxidation or other degradation due to cyclic exposure to high temperature and high pressure gases produced by combustion. Moreover, as explained in detail below, these dielectric materials can be configured to integrate optical or electrical communication pathways from the combustion chamber to a sensor, such as a transducer, instrumentation, filter, amplifier, controller, and/or computer. Furthermore, the insulative materials can be brazed or diffusion bonded at a seal location with a metal base portion 414 of the body 412.

Spiral Wound Dielectric Features

According to one embodiment of the body 412 of the injector 410 illustrated in FIG. 16, the dielectric materials comprising the middle portion 416 and/or nozzle portion 418 of the injector 410 are illustrated in FIGS. 17A and 17B. More specifically, FIG. 17A is a side view of an insulator or dielectric body 512, and FIG. 17B is a cross-sectional side view taken substantially along the lines 17B-17B of FIG. 17A. Although the body 512 illustrated in FIG. 17A has a generally cylindrical shape, in other embodiments the body 512 can include other shapes, including, for example, nozzle portions extending from the body 512 toward a combustion chamber interface 531. Referring to FIGS. 17A and 17B together, in the illustrated embodiment the dielectric body 512 is composed of a spiral or wound base layer 528. In certain embodiments, the base layer 528 can be artificial or natural mica (e.g., pinhole free mica paper). In other embodiments, however, the base layer 528 can be composed of other materials suitable for providing adequate dielectric strength associated with relatively thin materials. In the illustrated embodiment, one or both of the sides of the base layer 528 are covered with a relatively thin dielectric coating layer 530. The coating layer 530 can be made from a high temperature, high purity polymer, such as Teflon NXT, Dyneon TFM, Parylene HT, Polyethersulfone, and/or Polyetheretherketone. In other embodiments, however, the coating layer 530 can be made from other materials suitable for adequately sealing the base layer 528.

The base layer 528 and coating layer 530 can be tightly wound into a spiral shape forming a tube thereby providing successive layers of sheets of the combined base layer 528 and coating layer 530. In certain embodiments, these layers can be bonded in the wound configuration with a suitable adhesive (e.g., ceramic cement). In other embodiments, these layers can be impregnated with a polymer, glass, fumed silica, or other suitable materials to enable the body 512 to be wrapped in the tightly wound tube shape. Moreover, the sheets or layers of the body 512 can be separated by successive applications of dissimilar films. For example, separate films between layers of the body 512 can include Parylene N, upon Parylene C upon Parylene, HT film layers, and/or layers separated by applications of other material selections such as thin boron nitride, polyethersulfone, or a polyolefin such as polyethylene, or other suitable separating materials. Such film separation may also be accomplished by temperature or pressure instrumentation fibers including, for example, single-crystal sapphire fibers. Such fibers may be produced by laser-heated pedestal growth techniques, and may be subsequently coated with perfluorinated ethylene propylene (FEP) or other materials with similar index of refraction values to prevent leakage of energy from the fibers into potentially absorbing films that surround such fibers.

When the coating layer 530 is applied in relatively thin films (e.g., 0.1 to 0.3 mm), the coating layer 530 can provide approximately 2.0 to 4.0 KVolts/0.001" dielectric strength from −30° C. (e.g., −22° F.) up to about 230° C. (e.g., 450° F.). The inventor has found that coating layers 530 having a greater thickness may not provide sufficient insulation to provide the required voltage for ignition events. More specifically, as reflected in Table 1 below, coating layers with greater thickness have remarkably reduced dielectric strength. These reduced dielectric strengths may not adequately prevent arc-through and current leakage of the insulative body 512 at times that it is desired to produce the ignition event (e.g., spark or plasma) at the combustion chamber. For example, in many engines with high compression pressures, such as typical diesel or supercharged engines, the voltage required to initiate an ignition event (e.g., spark or plasma) is approximately 60,000 volts or more. A conventional dielectric body including a tubular insulator with only a 0.040 inch or greater effective wall thickness that is made of a convention insulator may only provide 500 Volts/0.001" and will fail to adequately contain such required voltage.

TABLE 1

Dielectric Strength Comparisons of Selected Formulations

| Substance | Dielectric Strength (KV/mil) (<0.06 mm or 0.002" films) | Dielectric Strength (KV/mil) (>1.0 mm or 0.040") |
|---|---|---|
| Teflon NXT | 2.2-4.0 KV/.001" | 0.4-0.5 KV/.001" |
| Polyimide (Kapton) | 7.4 KV/.001" | — |
| Parylene (N, C, D, HT) | 4.2-7.0 KV/.001" | — |
| Dyneon TFM | 2.5-3.0 KV/.001" | 0.4-0.5 KV/.001" |
| CYTOP perfluoropolymer | 2.3-2.8 KV/0.001" | — |
| Sapphire (Single-Crystal) | 1.3-1.4 KV/0.001" | 1.2 KV/0.001" |
| Mica | 2.0-4.5 KV/0.001" | 1.4-1.9 KV/0.001" |
| Boron Nitride | 1.6 KV/0.001" | 1.4 KV/0.001" |
| PEEK | 3.0-3.8 KV/0.001" | 0.3-0.5 KV/0.001" |
| Polyethersulfone | 4.0-4.2 KV/0.001" | 0.3-0.5 KV/0.001" |
| Silica Quartz | 1.1-1.4 KV/0.001" | 1.1-1.4 KV/0.001" |

The embodiment of the insulator body 512 illustrated in FIGS. 17A and 17B can provide a dielectric strength of approximately 3,000 Volts/0.001" at temperatures ranging from −30° C. (e.g., −22° F.) up to approximately 450° C. (e.g., 840° F.). Moreover, the coating layers 530 can also serve as a sealant to the base layer 528 to prevent combustion gases and/or other pollutants from entering the body 512. The coating layers 530 can also provide a sufficiently different index of refraction to improve the efficiency of light transmission through the body 512 for optical communicators extending through the body 512.

According to another feature of the illustrated embodiment, the body 512 includes multiple communicators 532 extending longitudinally through the body 512 between sheets or layers of the base layers 528. In certain embodiments, the communicators 532 can be conductors, such as high voltage spark ignition wires or cables. These ignition wires can be made from metallic wires that are insulated or coated with oxidized aluminum thereby providing alumina on the wires. Because the communicators 532 extend longitudinally through the body 512 between corresponding base layers 528, the communicators 532 do not participate in any charge extending radially outwardly through the body 512. Accordingly, the communicators 532 do not affect or otherwise degrade the dielectric properties of the body 512. In addition to delivering voltage for ignition, in certain embodiments the communicators 532 can also be operatively coupled to one or more actuators and/or controllers to drive a flow valve for the fuel injection.

In other embodiments, the communicators 532 can be configured to transmit combustion data from the combustion chamber to one or more transducers, amplifiers, controllers, filters, instrumentation computers, etc. For example, the communicators 532 can be optical fibers or other communicators formed from optical layers or fibers such as quartz, aluminum fluoride, ZBLAN fluoride, glass, and/or polymers, and/or other materials suitable for transmitting data through an injector. In other embodiments, the communicators 532 can be made from suitable transmission materials such as Zirconium, Barium, Lanthanum, Aluminum, and Sodium Fluoride (ZBLAN), as well as ceramic or glass tubes.

Grain Orientation of Dielectric Features

Figure 18A:
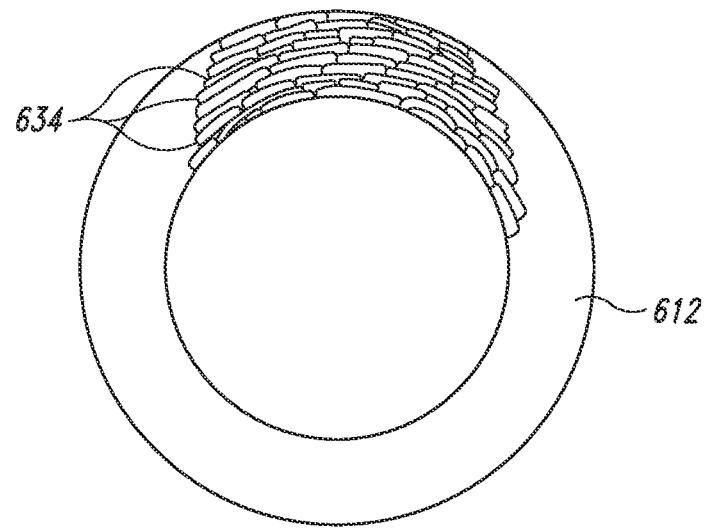
FIGS. 18A and 18B are cross-sectional side views taken substantially along the lines 18-18 of FIG. 16, illustrating an insulator or dielectric body configured in accordance with another embodiment of the disclosure.
Figure 18B:
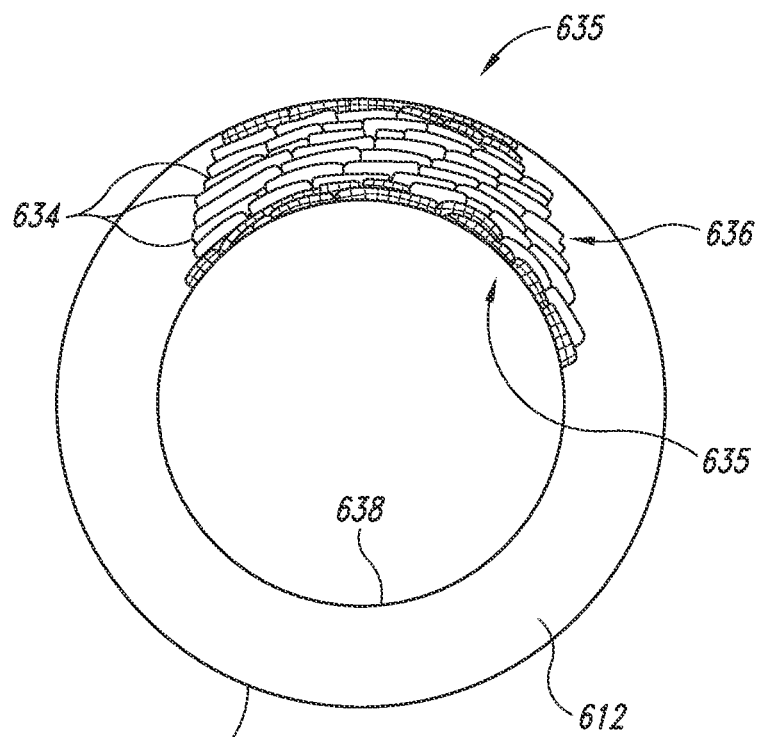

Referring again to FIG. 16, according to another embodiment of the injector 410 illustrated in FIG. 16 the dielectric materials of the body 412 (e.g., the middle portion 416 and/or the nozzle portion 418) may be configured to have specific grain orientations to achieve desired dielectric properties capable of withstanding the high voltages associated with the present disclosure. For example, the grain structure can include crystallized grains that are aligned circumferentially, as well as layered around the tubular body 412, thereby forming compressive forces at the exterior surface that are balanced by subsurface tension. More specifically, FIGS. 18A and 18B are cross-sectional side views of a dielectric body 612 configured in accordance with another embodiment of the disclosure and taken substantially along the lines 18-18 of FIG. 16. Referring first to FIG. 18A, the body 612 can be made of a ceramic material having a high dielectric strength, such as quartz, sapphire, glass matrix, and/or other suitable ceramics.

As shown in the illustrated embodiment, the body 612 includes crystalline grains 634 that are oriented in generally the same direction. For example, the grains 634 are oriented with each individual grain 634 having its longitudinal axis aligned in the direction extending generally circumferentially around the body 612. With the grains 634 layered in this orientation, the body 612 provides superior dielectric strength in virtually any thickness of the body 612. This is because the layered long, flat grains do not provide a good conductive path radially outwardly from the body 612.

FIG. 18B illustrates compressive forces in specific zones of the body 612. More specifically, according to the embodiment illustrated in FIG. 18B, the body 612 has been treated to at least partially arrange the grains 634 in one or more compressive zones 635 (i.e., zones including compressive forces according to the orientation of the grains 634) adjacent to an outer exterior surface 637 and an inner exterior surface 638 of the body 612. The body 612 also includes a non-compressive zone 636 of grains 634 between the compressive zones 635. The non-compressive zone 636 provides balancing tensile forces in a middle portion of the body 612. In certain embodiments, each of the compressive zones 635 can include more grains 634 per volume to achieve the compressive forces. In other embodiments, each of the compressive zones 635 can include grains 634 that have been influenced to retain locally amorphous structures, or that have been modified by the production of an amorphous structure or crystalline lattice that has less packing efficiency than the grains 634 of the non-compressive zone 636. In still further embodiments, the outer surface 637 and the inner surface 638 can be caused to be in compression as a result of ion implantation, sputtered surface layers, and/or diffusion of one or more substances into the surface such that the surface has a lower packing efficiency than the non-compressive zone 636 of the body 612. In the embodiment illustrated in FIG. 18B, the compressive zones 635 at the outside surface 637 and the inner surface 638 of the body 612 provide a higher anisotropic dielectric strength.

One benefit of the embodiment illustrated in FIG. 18B is that as a result of this difference in packing efficiency in the compressive zones 635 and the non-compressive zone 636, the surface in compression is caused to be in compression and becomes remarkably more durable and resistant to fracture or degradation. For example, such compressive force development at least partially prevents entry of substances (e.g., electrolytes such as water with dissolved substances, carbon rich materials, etc.) that could form conductive pathways in the body 612 thereby reducing the dielectric strength of the body 612. Such compressive force development also at least partially prevents degradation of the body 612 from thermal and/or mechanical shock from exposure to rapidly changing temperatures, pressures, chemical degradants, and impulse forces with each combustion event. For example, the embodiment illustrated in FIG. 18B is configured specifically for sustained voltage containment of the body 612, increased strength against fracture due to high loading forces including point loading, as well as low or high cycle fatigue forces.

Another benefit of the oriented crystalline grains 634 combined with the compressive zones 635, is that this configuration of the grains 634 provides maximum dielectric strength for containing voltage that is established across the body 612. For example, this configuration provides remarkable dielectric strength improvement of up to 2.4 KV/0.001 inch in sections that are greater than 1 mm or 0.040 inch thick. These are significantly higher values compared to the same ceramic composition without such new grain characterization with only approximately 1.0 to 1.3 KV/0.001 inch dielectric strength.

Several processes for producing insulators described above with compressive surface features are described in detail below. In one embodiment, for example, an insulator configured in accordance with an embodiment of the disclosure can be made from materials disclosed by U.S. Pat. No. 3,689,293, which is incorporated herein in its entirety by reference. For example, an insulator can be made from a material including the following ingredients by weight: 25-60% $SiO_2$, 15-35% $R_2O_3$ (where $R_2O_3$ is 3-15% $B_2O_3$ and 5-25% $Al_2O_3$), 4-25% $MgO+0-7\%$ $Li_2O$ (with the total of $MgO+Li_2O$ being between about 6-25%), 2-20% $R_2O$ (where $R_2O$ is 0-15% $Na_2O$, 0-15% $K_2O$, 0-15% $Rb_2O$), 0-15% $Rb_2O$, 0-20% $Cs_2O$, and with 4-20% F. More specifically, in one embodiment, an illustrative formula consists of 43.9% $SiO_2$, 13.8% MgO, 15.7% $Al_2O_3$, 10.7% $K_2O$, 8.1% $B_2O_3$, and 7.9% F. In other embodiments, however, insulators configured in accordance with embodiments of the disclosure can be made from greater or lesser percentages of these constituent materials, as well as different materials.

According to one embodiment of the disclosure, the ingredients constituting the insulator are ball-milled and fused in a suitable closed crucible that has been made impervious and non-reactive to the formula of the constituent ingredients forming the insulator. The ingredients are held at approximately 1,400° C. (e.g., 2,550° F.) for a period that assures thorough mixing of the fused formula. The fused mass is then cooled and ball-milled again, along with additives that may be selected from the group including binders, lubricants, and firing aids. The ingredients are then extruded in various desired shapes including, for example, a tube, and heated to about 800° C. (1,470° F.) for a time above the transformation temperature. Heating above the transformation temperature stimulates fluoromica crystal nucleation. The extruded ingredients can then be further heated and pressure formed or extruded at about 850 to 1,100° C. (1,560-2,010° F.). This secondary heating causes crystals that are being formed to become shaped as generally described above for maximizing the dielectric strength in preferred directions of the resulting product.

Crystallization of such materials, including, for example, mica glasses including a composition of $K_2Mg_5Si_8O_{20}F_4$, produces an exothermic heat release as the volumetric packing efficiency of the grains increases and the corresponding density increases. Transformation activity, such as nucleation, exothermic heat release rate, characterization of the crystallization, and temperature of the crystallization, is a function of fluorine content and or $B_2O_3$ content of the insulator. Accordingly, processing the insulator with control of these variables enables improvements in the yield, tensile, fatigue strength, and/or dielectric strength, as well as increasing the chemical resistance of the insulator.

This provides an important new anisotropic result of maximum dielectric strength as may be designed and achieved by directed forming including extruding a precursor tube into a smaller diameter or thinner walled tubing to produce elongated and/or oriented crystal grains typical to the representational population shown in conjunction with 104B that are formed and layered to more or less surround a desired feature such as an internal diameter that is produced by conforming to a mandrel that is used for accomplishing such hot forming or extrusion.

According to another embodiment, a method of at least partially orienting and/or compressing the grains 634 according to the illustrated embodiment may be achieved by the addition of $B_2O_3$ and/or fluorine to surfaces that are desired to become compressively stressed against balancing tensile stresses in the substrate of formed and heat-treated products. Such addition of $B_2O_3$, fluorine, or similarly actuating agents may be accomplished in a manner similar to dopants that are added and diffused into desired locations in semiconductors. These actuating agents can also be applied as an enriched formula of the component formula that is applied by sputtering, vapor deposition, painting, and/or washing. Furthermore, these actuating agents may be produced by reactant presentation and condensation reactions.

Increased $B_2O_3$ and/or fluorine content of material at and near the surfaces that are desired to become compressively loaded causes more rapid nucleation of fluoromica crystals. This nucleation causes a greater number of smaller crystals to compete with diffusion-added material in comparison with non-compressive substrate zones of the formula. This process accordingly provides for a greater packing efficiency in the non-compressive substrate zones than in the compressive zones closer to the surfaces that have received enrichment with $B_2O_3$, fluorine, and/or other actuating agents that produce the additional nucleation of fluoromica crystals. As a result, the desirable surface compression preloading strengthens the component against ignition events and chemical agents.

Another method of producing or enhancing compressive forces that are balanced by tensile forces in corresponding substrates includes heating the target zone to be placed in compression. The target zone can be sufficiently heated to re-solution the crystals as an amorphous structure. The substrate can then be quenched to sufficiently retain substantial portions of the amorphous structure. Depending upon the type of components involved, such heating may be in a furnace. Such heating may also be by radiation from a resistance- or induction-heated source, as well as by an electron beam or laser. Another variation of this process is to provide for increased numbers of smaller crystals or grains by heat-treating and/or adding crystallization nucleation and growth stimulants (e.g., $B_2O_3$ and/or fluorine) to partially solutioned zones to rapidly provide recrystallization to develop the desired compressive stresses.

Figure 19A:
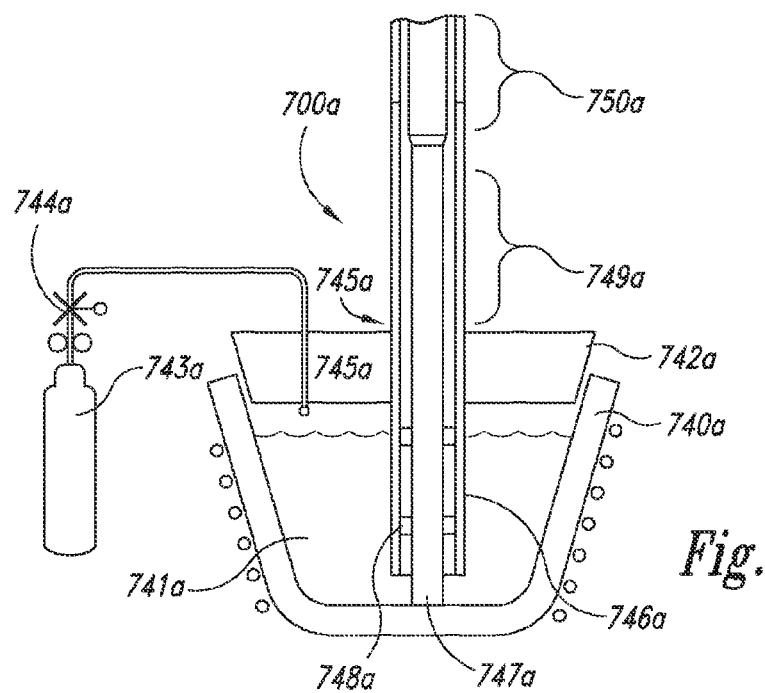
FIGS. 19A and 19B are schematic illustrations of systems for forming an insulator or dielectric body with compressive stresses in desired zones according to another embodiment of the disclosure.

FIG. 19A schematically illustrates a system 700a for implementing a process including fusion and extrusion for forming an insulator with compressive stresses in desired zones according to another embodiment of the disclosure. More specifically, in the illustrated embodiment the system 700a includes a crucible 740a that can be made from a refractory metal, ceramic, or pyrolytic graphite material. The crucible 740a can include a suitable conversion coating, or an impervious and non-reactive liner such as a thin selection of platinum or a platinum group barrier coating. The crucible 740a is loaded with a charge 741a of a recipe as generally described above (e.g., a charge containing approximately 25-60% $SiO_2$, 15-35% $R_2O_3$ (where $R_2O_3$ is 3-15% $B_2O_3$ and 5-25% $Al_2O_3$), 4-25% MgO+0-7% $Li_2O$ (where the total of MgO+$Li_2O$ is between about 6-25%), 2-20% $R_2O$ (where $R_2O$ is 0-15% $Na_2O$, 0-15% $K_2O$, 0-15% $Rb_2O$), 0-15% $Rb_2O$ and 0-20% $Cs_2O$, and 4-20% F), or suitable formulas for producing mica glass, such a material with an approximate composition of $K_2Mg_5Si_8O_{20}F_4$.

The crucible can heat and fuse the charge 741a in a protective atmosphere. For example, the crucible 740a can heat the charge 741a via any suitable heating process including, for example, resistance, electron beam, laser, inductive heating, and/or by radiation from sources that are heated by such energy conversion techniques. After suitable mixing and fusion to produce a substantially homogeneous charge 741a, a cover or cap 742a applies pressure to the charge 741a in the crucible 740a. A gas source 743a can also apply an inert gas and/or process gas into the crucible 740a sealed by the cap 742a. A pressure regulator 744a can regulate the pressure in the crucible 740a to cause the fused charge 741a to flow into a die assembly 745a. The die assembly 745a is configured to form a tube shaped dielectric body. The die assembly 745a includes a female sleeve 746a that receives a male mandrel 747a. The die assembly 745a also includes one or more rigidizing spider fins 748a. The formed tubing flows through the die assembly 745a into a first zone 749a where the formed tubing is cooled to solidify as amorphous material and begin nucleation of fluoromica crystals. The die assembly 745a then advances the tubing to a second zone 750a to undergo further refinement by reducing the wall thickness of the tubing to further facilitate crystallization of fluoromica crystals.

Figure 19B:
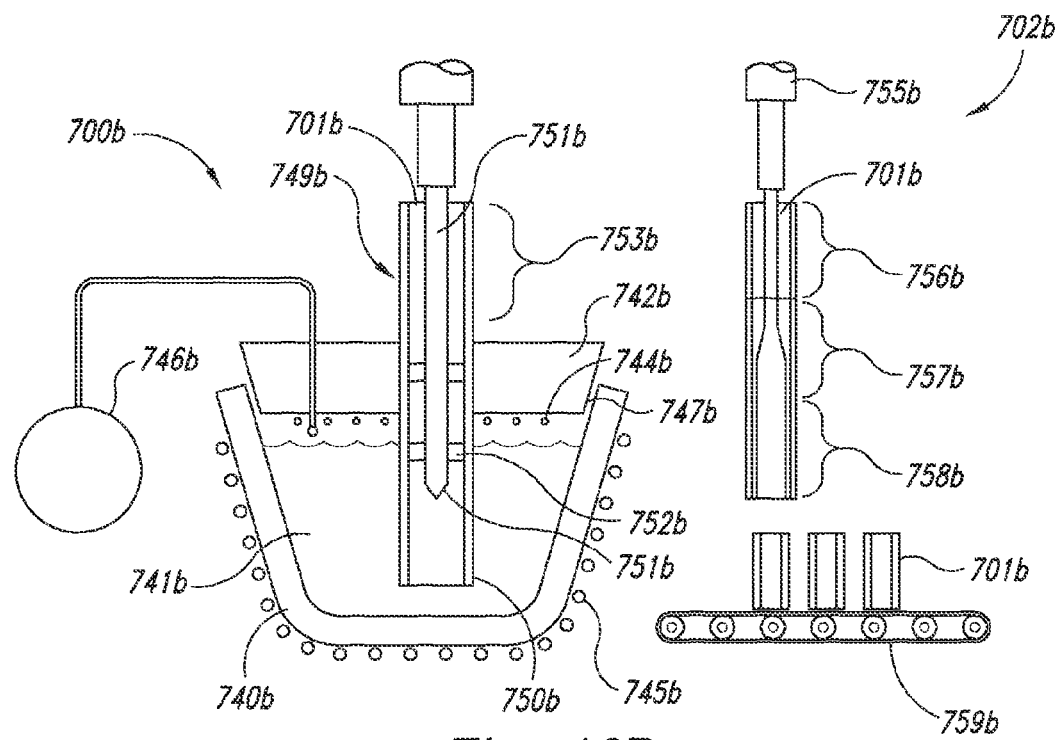

FIG. 19B schematically illustrates a system 700b for implementing a process also including fusion and extrusion for forming an insulator with compressive stresses in desired zones according to another embodiment of the disclosure. More specifically, in the illustrated embodiment the system 700b includes a crucible 740b that can be made from a refractory metal, ceramic, or pyrolytic graphite material. The crucible 740b can include a suitable conversion coating, or an impervious and non-reactive liner such as a thin selection of platinum or a platinum group barrier coating. The crucible 740b is loaded with a charge 741b of a recipe as generally described above (e.g., a charge containing approximately 25-60% $SiO_2$, 15-35% $R_2O_3$ (where $R_2O_3$ is 3-15% $B_2O_3$ and 5-25% $Al_2O_3$), 4-25% MgO+0-7% $Li_2O$ (where the total of MgO+$Li_2O$ is between about 6-25%), 2-20% $R_2O$ (where $R_2O$ is 0-15% $Na_2O$, 0-15% $K_2O$, 0-15% $Rb_2O$), 0-15% $Rb_2O$ and 0-20% $Cs_2O$, and 4-20% F), or suitable formulas for producing mica glass, such a material with an approximate composition of $K_2Mg_5Si_8O_{20}F_4$.

The system 700b also includes a cover or cap 742b including a reflective assembly and heaters 744b. The system 700b can heat and fuse the charge 741b in a protective atmosphere, such as in a vacuum or with an inert gas between the crucible 740b and the cover 742b. For example, the system 700b can heat the charge 741b via crucible heaters 745b, the cover heaters 744b, and/or via any suitable heating process including, for example, resistance, electron beam, laser, inductive heating and/or by radiation from sources that are heated by such energy conversion techniques. After suitable mixing and fusion to produce a substantially homogeneous charge 741b, the cover 742b applies pressure to the charge 741b in the crucible 740b. A gas source 746b can also apply an inert gas and/or process gas into the crucible 740b sealed by the cover 742b at a seal interface 747b. A pressure regulator can regulate the pressure in the crucible 740b to cause the fused charge 741b to flow into a die assembly 749b. The die assembly 749b is configured to form a tube shaped dielectric body. The die assembly 749b includes a female sleeve 750b that receives a male mandrel 751b. The die assembly 749b can also include one or more rigidizing spider fins 752b. The formed tubing 701b flows through the die assembly 749b into a first zone 753b where the formed tubing 701b is cooled to solidify as amorphous material and begin nucleation of fluoromica crystals.

At least a portion of the die assembly 749b, including the formed tubing 701b with nucleated fluoromica glass, is then rotated or otherwise moved to a position 702b aligned with a second die assembly. A cylinder 755b urges the formed tubing 701b from a first zone 756b to a second zone 757b. In the second zone 757b, the second die assembly can reheat the formed tubing 701b to accelerate crystal growth as it is further refined to continue production of preferably oriented grains described above. The formed tubing 701b is then advanced to a third zone 758b to undergo further grain refinement and orientation. Selected contact areas of the third zone 758b may be occasionally dusted or dressed with a grain nucleation accelerator, including, for example, $AlF_3$, $MgF_2$ and/or $B_2O_3$. In the third zone 758b, the formed tubing 701b is further refined by the reduction of the wall thickness of the formed tubing 701b to even further facilitate crystallization of fluoromica crystals and to thus generate the desired compressive forces in areas according to the grain structures described above, along with balancing tensile forces in areas described above. Subsequently, formed tubing 701b, which includes the exceptionally high physical and dielectric strength formed by the compressively stressed and impervious surfaces, can be deposited on a conveyer 759b for moving the formed tubing 701b.

Alternative systems and methods for producing insulative tubing with these improved dielectric properties may utilize a pressure gradient as disclosed in U.S. Pat. No. 5,863,326, which is incorporated herein by reference in its entirety, to develop the desired shape, powder compaction, and sintering processes. Further systems and methods can include the single crystal conversion process disclosed in U.S. Pat. No. 5,549,746, which is incorporated herein by reference in its entirety, as well as the forming process disclosed in U.S. Pat. No. 3,608,050, which is incorporated herein by reference in its entirety, to convert multicrystalline material into essentially single crystal material with much higher dielectric strength. According to embodiments of the disclosure, the conversion of multicrystalline materials (e.g., alumina) with only approximately 0.3 to 0.4 KV/0.001" dielectric strength, to single crystal materials can achieve dielectric strengths of at least approximately 1.2 to 1.4 KV/0.001". This improved dielectric strength allows injectors according to the present disclosure to be used in various applications, including for example, with high compression diesel engines with very small ports into the combustion chamber, as well as with high-boost supercharged and turbocharged engines.

According to yet another embodiment of the disclosure for forming insulators with high dielectric strength, insulators can be formed from any of the compositions illustrated in Table 2. More specifically, Table 2 provides illustrative formula selections of approximate weight-percentage compositions on an oxide basis, according to several embodiments of the disclosure.

TABLE 2

Illustrative Dielectric Compositions

| COMPOSITION D | COMPOSITION R |
|---|---|
| 44% SiO2 | 41% SiO2 |
| 16% Al2O3 | 21% MgO |
| 15% MgO | 16% Al2O3 |
| 9% K2O | 9% B2O3 |
| 8% B2O3 | 9% F |
| 8% F | 4% K2O |

Selected substance precursors that will provide the final oxide composition percentages, such as the materials illustrated in Table 2, can be ball-milled and melted in a covered crucible at approximately 1,300-1,400° C. for approximately 4 hours to provide a homogeneous solution. The melt may then be cast to form tubes that are then annealed at approximately 500-600° C. Tubes may then be further heat-treated at approximately 750° C. for approximately 4 hours and then dusted with a nucleation stimulant, such as $B_2O_3$. The tubes may then be reformed at approximately 1,100 to 1,250° C. to stimulate nucleation and produce the desired crystal orientation. These tubes may also be further heat-treated for approximately 4 hours to provide dielectric strength of at least approximately 2.0 to 2.7 KV/0.001".

In still further embodiments, the homogeneous solution may be ball-milled and provided with suitable binder and lubricant additives for ambient temperature extrusion to produce good tubing surfaces. The resulting tubing may then be coated with a film that contains a nucleation stimulant such as $B_2O_3$ and heat-treated to provide at least approximately 1.9 to 2.5 KV/0.001" dielectric strength and improved physical strength. Depending upon the ability to retain suitable dimensions of the tubing, including for example, the "roundness" of the extruded tubing or the profile of the tubing, higher heat treatment temperatures may be provided for shorter times to provide similar high dielectric and physical strength properties.

The embodiments of the systems and methods for producing the dielectric materials described above facilitate improved dielectric strengths of various combinations of materials thereby solving the very difficult problems of high voltage containment required for combusting low energy density fuels. For example, injectors with high dielectric strength materials can be extremely rugged and capable of operation with fuels that vary from cryogenic mixtures of solids, liquids, and vapors to superheated diesel fuel, as well as other types of fuel.

Fuel Injectors and Associated Components

Figure 20:
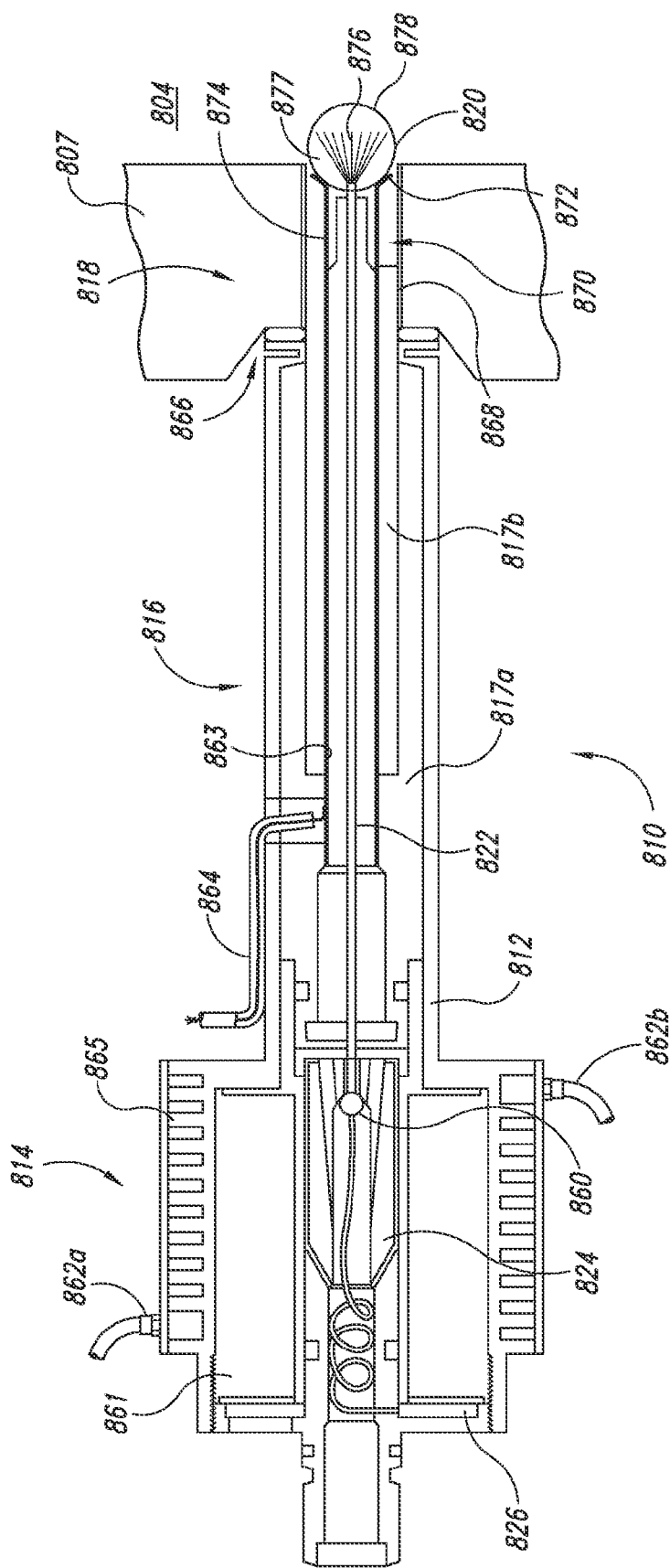
FIGS. 20 and 21 are cross-sectional side view of injectors configured in accordance with further embodiments of the disclosure.

Any of the injectors described herein can be configured to include any of the dielectric materials described above. For example, FIG. 20 is a cross-sectional side view of an injector 810 configured in accordance with another embodiment of the disclosure incorporating a dielectric insulator having the properties described above. The illustrated injector 810 includes several features that are generally similar in structure and function to the corresponding features of the injector 110 described above with reference to FIG. 1. For example, as shown in FIG. 20 the injector 810 includes a body 812 having a middle portion 816 extending between a base portion 814 and a nozzle portion 818. The nozzle portion 818 at least partially extends through an engine head 807 to position the end of the nozzle portion 818 at an interface with a combustion chamber 804. The body 812 further includes a channel 863 extending through a portion thereof to allow fuel to flow through the injector 810. Other components can also pass through the channel 863. For example, the injector 810 further includes an actuator 822 that is operatively coupled to a controller or processor 826. The actuator 822 is also coupled to a valve or clamp member 860. The actuator 822 extends through the channel 863 from a driver 824 in the base portion 814 to a flow valve 820 in the nozzle portion 818. In certain embodiments, the actuator 822 can be a cable or rod assembly including, for example, fiber optics, electrical signal fibers, and/or acoustic communication fibers along with wireless transducer nodes. As described in detail below, the actuator 822 is configured to actuate the flow valve 820 to rapidly introduce multiple fuel bursts into the combustion chamber 804. The actuator 822 can also detect and/or transmit combustion properties to the controller 826.

According to one feature of the illustrated embodiment, the actuator 822 retains the flow valve 820 in a closed position seated against a corresponding valve seat 872. More specifically, the base portion 814 includes one or more force generators 861 (shown schematically). The force generator 861 can be an electromagnetic force generation, a piezoelectric force generator, or other suitable types of force generators. The force generator 861 is configured to produce a force that moves the driver 824. The driver 824 contacts the clamp member 860 to move the clamp member 860 along with the actuator 822. For example, the force generator 861 can produce a force that acts on the driver 824 to pull the clamp member 860 and tension the actuator 822. The tensioned actuator 822 retains the flow valve 820 in the valve seat 872 in the closed position. When the force generator 861 does not produce a force that acts on the driver 824, the actuator 822 is relaxed thereby allowing the flow valve 820 to introduce fuel into the combustion chamber 804.

According to yet another feature of the illustrated embodiment, the nozzle portion 818 can include several attractive components that facilitate the actuation and positioning of the flow valve 820. For example, in one embodiment the flow valve 820 can be made from a first ferromagnetic material or otherwise incorporate a first ferromagnetic material (e.g., via plating a portion of the flow valve 820). The nozzle portion 818 can carry a corresponding second ferromagnetic material that is attracted to the first ferromagnetic material. For example, the valve seat 872 can incorporate the second ferromagnetic material. In this manner, these attractive components can help center the flow valve 820 in the valve seat 872, as well as facilitate the rapid actuation of the flow valve 820. In other embodiments, the actuator 822 can pass through one or more centerline bearings (not shown) to at least partially center the flow valve 820 in the valve seat 872.

Providing energy to actuate these attractive components of the injector 810 (e.g., the magnetic components associated with the flow valve 820) can expedite the closing of the flow valve 820, as well as provide an increased closing force acting on the flow valve 820. Accordingly, such a configuration can enable extremely rapid opening and closing cycle times of the flow valve 820. Another benefit of providing electrical conductivity to a portion of the flow valve 820 is that application of voltage for initial spark or plasma formation may ionize fuel passing near the surface of the valve seat 872. This can also ionize fuel and air adjacent to the combustion chamber 804 to further expedite complete ignition and combustion.

In the illustrated embodiment, the base portion 814 also includes heat transfer features 865, such as heat transfer fins (e.g., helical fins). The base portion 814 also includes a first fitting 862a for introducing a coolant that can flow around the heat transfer features 865, as well as a second fitting 862b to allow the coolant to exit the base portion 814. Such cooling of the injector can at least partially prevent condensation and/or ice from forming when cold fuels are used, such as fuels that rapidly cool upon expansion. When hot fuels are used, however, such heat exchange may be utilized to locally reduce or maintain the vapor pressure of fuel contained in the passageway to the combustion chamber and prevent dribbling at undesirable times.

According to another feature of the illustrated embodiment, the flow valve 820 can be configured to carry instrumentation 876 for monitoring combustion chamber 804 events. For example, the flow valve 820 can be a ball valve made from a generally transparent material, such as quartz or sapphire. In certain embodiments, the ball valve 820 can carry the instrumentation 876 (e.g., sensors, transducers, etc.) inside the ball valve 820. In one embodiment, for example, a cavity can be formed in the ball valve 820 by cutting the ball valve 820 in a plane generally parallel with the face of the engine head 807. In this manner, the ball valve 820 can be separated into a base portion 877 as well as a lens portion 878. A cavity, such as a conical cavity, can be formed in the base portion 877 to receive the instrumentation 876. The lens portion 878 can then be reattached (e.g., adhered) to the base portion 877 to retain the generally spherical shape of the ball valve 820. In this manner, the ball valve 820 positions the instrumentation 876 adjacent to the combustion chamber 804 interface. Accordingly, the instrumentation 876 can measure and communicate combustion data including, for example, pressure, temperature, motion, data. In other embodiments, the flow valve 820 can include a treated face that protects the instrumentation 876. For example, a face of the flow valve 820 may be protected by depositing a relatively inert substance, such as diamond like plating, sapphire, optically transparent hexagonal boron nitride, BN—AlN composite, aluminum oxynitride (AlON including $Al_{23}O_{27}N_5$ spinel), magnesium aliminate spinel, and/or other suitable protective materials.

As shown in FIG. 20, the body 812 includes conductive plating 874 extending from the middle portion 816 to the nozzle portion 818. The conductive plating 874 is coupled to an electrical conductor or cable 864. The cable 864 can also be coupled to a power generator, such as a suitable piezoelectric, inductive, capacitive or high voltage circuit for delivering energy to the injector 810. The conductive plating 874 is configured to deliver the energy to the nozzle portion 818. For example, the conductive plating 874 at the valve seat 872 can act as a first electrode that generates an ignition event (e.g., spark or plasma) with corresponding conductive portions of the engine head 807.

According to another feature of the illustrated embodiment, the nozzle portion 818 can include an exterior sleeve 868 comprised of material that is resistant to spark erosion. The sleeve 868 can also resist spark deposited material that is transferred to or from the conductive plating 874 (e.g., the electrode of the nozzle portion 818). Moreover the nozzle portion 818 can further include a reinforced heat dam or protective portion 866 that is configured to at least partially protect the injector 810 from heat and other degrading combustion chamber factors. The protective portion 866 can also include one or more transducers or sensors for measuring or monitoring combustion parameters, such as temperature, thermal and mechanical shock, and/or pressure events in the combustion chamber 804.

As also shown in FIG. 20, the middle portion 816 and the nozzle portion 818 include a dielectric insulator that can be configured according to the embodiments described above. More specifically, in the illustrated embodiment the middle portion 816 includes a first insulator 817a at least partially surrounding a second insulator 817b. The second insulator 817b extends from the middle portion 816 to the nozzle portion 818. Accordingly, at least a segment of the second insulator 817b is positioned adjacent to the combustion chamber 804. In one embodiment, the second insulator 817b can have a greater dielectric strength than the first insulator 817a. In this manner, the second insulator 817b can be configured to withstand the harsh combustion conditions proximate to the combustion chamber 804. In other embodiments, however, the injector 810 can include an insulator made from a single material.

According to yet another feature of the illustrated embodiment, at least a portion of the second insulator 817b in the nozzle portion 818 can be spaced apart from the combustion chamber 804. This forms a gap or volume of air space 870 between the engine head 807 (e.g., the second electrode) and the conductive plating 874 (e.g., the first electrode) of the nozzle portion 818. The injector 810 can form a plasma of ionized air in the space 870 before a fuel injection event. This plasma projection of ionized air can accelerate the combustion of fuel that enters the plasma. Moreover, this plasma projection can affect the shape of the rapidly combusting fuel according to predetermined combustion chamber characteristics. Similarly, the injector 810 can also ionize components of the fuel to produce high energy plasma, which can also affect or change the shape of the distribution pattern of the combusting fuel.

The injector 810 can further tailor the properties of the combustion and distribution of injected fuel by creating supercavitation or sudden gasification of the injected fuel. More specifically, and as described in detail below with reference to further embodiments of the disclosure, the flow valve 820 and/or the valve seat 872 can be formed in such a way as to create sudden gasification of the fuel flowing past these components. For example, the flow valve 820 may have one or more sharp-edged steps in a portion of the flow valve that contacts the valve seat 872. Moreover, the frequency of the opening and closing of the flow valve 820 can also induce sudden gasification of the injected fuel. This sudden gasification produces gas or vapor from the rapidly entering liquid fuel, or mixtures of liquid and solid fuel constituents. For example, this sudden gasification can produce a vapor as liquid fuel is routed around the surface of the flow valve 820 to enter the combustion chamber. The sudden gasification of the fuel enables the injected fuel to combust much more quickly and completely than non-gasified fuel. Moreover, the sudden gasification of the injected fuel can produce different fuel injection patterns or shapes including, for example, projected ellipsoids, which differ greatly from generally coniform patterns of conventional injected fuel patterns. In still further embodiments, the sudden gasification of the injected fuel may be utilized with various other fuel ignition and combustion enhancing techniques. For example, the sudden gasification can be combined with super heating of liquid fuels, plasma and/or acoustical impetus of projected fuel bursts. Ignition of these enhanced fuel bursts requires far less catalyst, as well as catalytic area, when compared with catalytic ignition of liquid fuel constituents.

Figure 21:
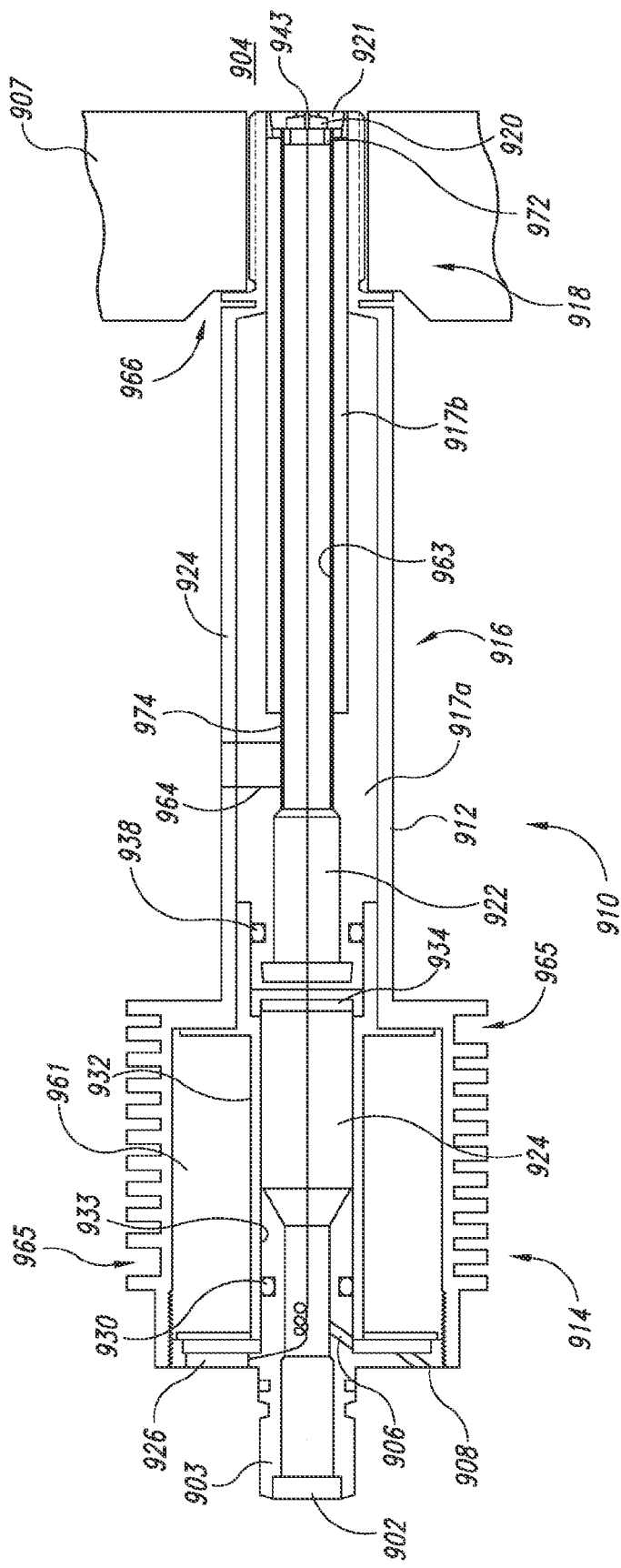

FIG. 21 is a cross-sectional side view of an injector 910 configured in accordance with another embodiment of the disclosure. The injector 910 includes several features that are generally similar in structure and function to the injectors described above. For example, the injector 910 includes one or more high voltage dielectric insulators 917 (identified individually as a first insulator 917a and a second insulator 917b) including the properties described above. The second insulator 917b at least partially surrounds a nozzle portion 918 adjacent to a combustion chamber 904. Accordingly, the second insulator 917b can have a greater dielectric strength than the first insulator 917b. The second insulator 917b can also have a greater mechanical strength (e.g., with a compressively stressed exteriors surface) to withstand the harsh operating conditions at the nozzle portion 918.

The injector 910 also includes a body 912 having a middle portion 916 extending between a base portion 914 and the nozzle portion 918. The nozzle portion 918 at least partially extends through an engine head 907 to position the end of the nozzle portion 918 at an interface with the combustion chamber 904. The body 912 further includes a channel 963 extending through a portion thereof to allow fuel to flow through the injector 910. Other components can also pass through the channel 963. For example, the injector 910 further includes an actuator 922 that is operatively coupled to a controller or processor 926. The actuator 922 is also operatively coupled to a driver 924 in the base portion 914. Further details regarding a suitable driver are described below with reference to FIG. 23. In the embodiment illustrated in FIG. 21, the actuator 922 extends through the channel 963 from the driver 924 to a flow valve 920 in the nozzle portion 918. In certain embodiments, the actuator 922 can be a cable or rod assembly including, for example, fiber optics, electrical signal fibers, and/or acoustic communication fibers along with wireless transducer nodes. The actuator 922 is configured to actuate the flow valve 920 to rapidly introduce multiple fuel bursts into the combustion chamber 904. The actuator 922 can also detect and/or transmit combustion properties to the controller 926. When the flow valve 920 is in a closed position, the flow valve 920 rests against a valve seat 972.

The base portion 914 includes a fuel inlet port 902 for introducing fuel into the injector 910. In certain embodiments, the inlet port 902 may include leak detection features configured to monitor whether the fuel is leaking as it enters the injector 910. For example, the inlet port 902, or other portions of the injector 910, can include "tattletale" fuel monitoring provisions as disclosed in co-pending U.S. patent application Ser. No. 10/236,820, filed Sep. 7, 2002, and Ser. No. 09/716,664, filed Nov. 20, 2000, now U.S. Pat. No. 6,446,597, each of which is incorporated herein by reference in its entirety.

The base portion 914 also includes a magnetic pole component 903 of a magnetic winding 961 around a concentric bobbin 932. The bobbin 932 includes an inner diameter surface 933 that can serve as a linear bearing for unidirectional motions of the driver 924. The pole component 903 can be sealed against the bobbin 932 to prevent fuel leakage therebetween. For example, the pole component 903 can include one or more grooves and corresponding o-rings 930. Moreover, the bobbin 932 can be sealed against the insulator 917 to also prevent fuel leakage therebetween. For example, the insulator 917 can include one or more grooves and corresponding o-rings 938.

The injector 910 further includes an energy port 964 for delivering energy (e.g., high voltage for timed development of spark, plasma, alternating current plasma, resistance heating, etc.) through metal alloy case 924 and insulator 917 for connection to conducting plating or sleeve 974. The conductive sleeve 974 conducts the energy to the nozzle portion 918 to produce an ignition event in the combustion chamber 904. More specifically, the conductive sleeve 974 conducts the energy to a first electrode or cover portion 921 carried by the nozzle portion 918. The cover portion 921 can be an ignition and fuel flow adjusting device that at least partially covers the flow valve 920. A portion of the engine head 907 can act as a second electrode corresponding with the cover 921 for the ignition event.

In other embodiments, energy for the ignition event can be provided via powering a piezoelectric or magnetostrictive driver 934 located on a downstream portion of the driver 924. Moreover, in applications with an extremely restrictive area to enter the combustion chamber 904, elevated voltage may be delivered to the conductive plating 974 and/or cover portion 921 of the nozzle portion 918 via a conductor in the insulator 917 (e.g., a spiral wound layered insulator as described above). In this embodiment, the conductor can extend from the insulator 917 through the base portion 914 to be coupled to a voltage generation source. More specifically, the conductor can exit the base portion 914 through a first port 906 and a second port 908 in the pole component 903. Suitable systems for providing electrical power and/or conditioning electrical power (e.g., spark or plasma generation) for operation of the solenoid assemblies of the disclosure are disclosed in U.S. Pat. Nos. 4,122,816 and 7,349,193, each of which is incorporated herein by reference in its entirety.

According to another embodiment of the disclosure, the nozzle portion 918 of the injector 910 includes a heat dam or protective portion 966 that is configured to limit heat transmission from the combustion chamber 904. Moreover, the base portion 914 can include heat transfer features 965 (e.g., heat transfer fins). The injector 910 can accommodate a heat transfer fluid that flows around the heat transfer features 965. The heat transfer fluid can be maintained at a relatively constant temperature, such as a suitable thermostat temperature of approximately 70 to 120° C. (160 to 250° F.). As such, the heat transfer fluid flowing around the heat transfer features 965 can maintain the operating temperature of the injector 910 to prevent frost or ice from forming from moisture in the atmosphere when cold fuels (e.g., cryogenic fuels) flow through the injector 910.

The injector 910 is configured to inject fuel into the combustion chamber 904 in response a suitable pneumatic, hydraulic, piezoelectric and/or electromechanical input. For example, considering electromechanical or electromagnetic operation, current applied to the magnetic winding 961 creates a magnetic pole in soft magnetic material facing the driver 924. This magnetic force induces travel of the driver 924 thereby tensioning the actuator 922 to retain the flow valve 920 against the valve seat 972 in a closed position. When the current is reversed or no longer applied, the driver 924 does not tension the actuator 922 thereby allowing fuel to flow past the flow valve 920.

In certain embodiments, the injector 910 is configured to eliminate undesired movement and/or residual motion of the actuator 922 when injecting the rapid bursts of fuel. The injector 910 can also be configured to assure centerline alignment of the actuator 922, which can include instrumentation such as fiber optic instrumentation. For example, the injector can include one or more components or assemblies positioned in the channel 963 of the body 912 for aligning the actuator 922. More specifically, FIG. 22A is a side view of an open truss tube assembly 1080 configured in accordance with an embodiment of the disclosure for aligning an actuator. FIG. 22B is a cross-sectional front view of the truss assembly 1080 taken substantially along the lines 22B-22B of FIG. 22A. Referring to FIGS. 22A and 22B together, in the illustrated embodiment the truss assembly 1080 includes multiple woven fibers 1082 surrounding the actuator 922. The fibers 1082 can include optical fibers, electrical fibers, instrumentation transducers, and/or strengthening fibers. These fibers 1082 can be woven or coiled around the actuator 922 such that the truss assembly 1080 aligns the actuator 922 in the injector. Materials suitable for the outside fibers of 1082 can include graphite, diamond-coated graphite, fiberglass, filament or fiber ceramics, polyetheretherkeytone, and various suitable fluoropolymers. These materials can be configured to provide the desired section modulus and low friction properties to allow the actuator 922 to move axially in the truss assembly 1080. For example, in certain embodiments, the inside diameter of tube truss assembly 1080 may be superfinished and/or coated with antifriction coatings including, for example, molybdenum sulfide, diamond-like carbon, boron nitride or various suitable polymers. These surface treatments may be utilized in various combinations to achieve friction reduction, corrosion protection, heat transfer, and other anti-wear purposes. In addition to aligning the actuator 922, the truss assembly 1080 also prevents resonant ringing, whipping, or axial springing of the actuator during operation.

FIG. 22C is a side view of a truss assembly 1081 configured in accordance with another embodiment of the disclosure for aligning the actuator 922 and preventing undesirable resonant ringing, whipping, or axial springing. FIG. 22D is a cross-sectional front view taken substantially along the lines 22D-22D of FIG. 22C. Referring to FIGS. 22C and 22D together, the truss assembly 1081 includes a plurality of helical springs or biasing members 1083 arranged consecutively and in a configuration around the actuator 922. Accordingly, in operation the frequency of the individual springs 1083 cancel one another out and thereby stabilize the actuator 922.

FIG. 22E is a cross-sectional side partial view of an injector 1010 configured in accordance with yet another embodiment of the disclosure that includes a guide member 1090 for aligning an actuator 1022. More specifically, the illustrated injector 1010 can have features generally similar in structure and function to the other injectors disclosed herein. For example, the injector 1010 illustrated in FIG. 22E includes the actuator 1022 that extends through a body 1012 between a driver 1024 and a flow valve 1020. In the illustrated embodiment, however, the guide member 1090 at least partially surrounds the actuator 1022 at a location downstream from the driver 1024. The guide member 1090 supports the actuator 1022 and prevents undesirable resonant ringing, whipping, and/or axial springing of the actuator 1022. In the illustrated embodiment, the guide member 1090 includes a first portion 1091 adjacent to the driver 1024, and a second portion 1092 adjacent to the flow valve 1020. The first portion 1091 has a first inner diameter surrounding the actuator 1022, and the second portion 1092 has a second inner diameter surrounding the actuator 1022. As shown in FIG. 22E, the second inner diameter is smaller than the first inner diameter, thereby more closely supporting the actuator 1029 adjacent to the flow valve 1020 in the nozzle portion of the injector. Moreover, in certain embodiments, the guide member 1090 can incorporate piezoelectric, acoustical, and/or magnetoelectric devices that can be used for generating impetus for fuel bursts. The guide member 1090 can also incorporate instrumentation, transducers, and/or sensors for detecting and communication combustion chamber conditions.

FIG. 23 is a cross-sectional side view of a driver 1124 configured in accordance with another embodiment of the disclosure. The driver 1124 includes features that are generally similar in structure and function to the drivers described above. In the illustrated embodiment, the driver is configured to be coupled to an actuator, as well as to allow fuel to flow therethrough. More specifically, the driver 1124 includes a body 1138 having a first end portion 1140 opposite a second end portion 1142. The body 1138 also includes a channel 1144 extending therethrough. The channel 1144 branches into multiple smaller channels or passages at the second end portion 1142 of the body 1138. For example, the second end portion 1142 includes fuel flow passages 1146 (identified individually as a first fuel flow passage 1146*a* and a second fuel flow passage 1146*b*) to allow fuel to flow through and exit the driver 1124. The second end portion 1142 also includes an actuator passage 1148 configured to receive an actuator.

In certain embodiments, the driver 1124 can be configured to provide a force to inject fuel from an injector. For example, the driver 1124 can provide acoustical forces to modify or enhance fuel injection bursts. In one embodiment, the driver 1124 can be made from a composited ferromagnetic material. In other embodiments, the driver 1124 can comprise a laminated magnetostrictive transducer material or a piezoelectric material to produce acoustical impetus. Suitable methods for providing such functions in the driver 1124 include lamination of desired materials, as described for example, in U.S. Pat. No. 5,980,251, which is incorporated herein by reference in its entirety. Moreover, suitable piezoelectric methods for creating such desired acoustical impetus are provided in the following educational materials provided by the Valpey Fisher Corporation: *Quartz Crystal Oscillator Training Seminar* presented by Jim Socki of Crystal Engineering, November 2000.

Referring again to FIG. 21, the injector 910 includes an ignition and flow adjusting device or cover 921 carried by the nozzle portion 918 that at least partially covers the flow valve 920. The cover 921 includes one or more conductive components such that the cover 921 can be a first electrode that generates an ignition event with a corresponding second electrode of an engine head. The cover 921 can be configured to protect components of the injector 910 that are configured to monitor and/or detect combustion properties. The cover 921 can also be configured to affect the shape, pattern, and/or phase of the injected fuel. For example, the cover 921 can be configured to induce sudden gasification of the injected fuel, as described above.

Figure 24A:
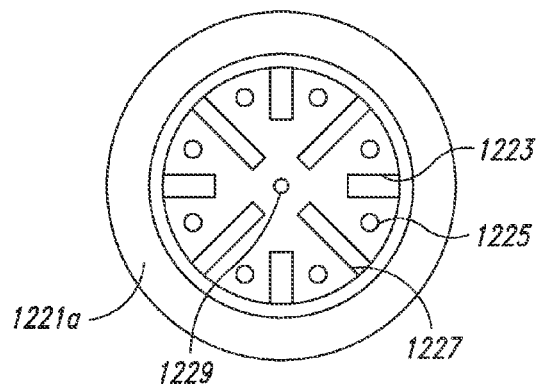
FIGS. 24A-24F illustrate several representative injector ignition and flow adjusting devices or covers configured in accordance with embodiments of the disclosure.

Further details of the cover 921 are described with reference to FIG. 24A. More specifically, FIG. 24A is a front view of a first cover 1221*a* configured in accordance with an embodiment of the disclosure. In the illustrated embodiment, the first cover 1221*a* includes a plurality of slots and holes to produce the desired fuel penetration and fuel flow rate through the first cover 1221*a* into a combustion chamber. The first cover 1221*a* also acts as an igniter for spark, plasma, catalytic, or hot surface ignition for combustion chambers. The holes and slots in the first cover 1221*a* provide partial exposure to the combustion chamber for monitoring combustion properties. More specifically, the first cover 1221*a* includes a plurality of radially extending first slots 1223 and second slots 1227. As shown in FIG. 24A, the first slots 1223 have a shorter length and greater thickness compared to the second slots 1227. The first cover 1221*a* also includes a plurality of first holes 1225 spaced circularly around the cover between the slots, and a second hole 1229 at a central portion of the cover. The slots and/or holes of the first cover 1221*a*, as well as in other covers described herein, can be set at orthogonal or non-orthogonal angles with reference to a combustion chamber face to achieve desired fuel flow and combustion rates.

Figure 24B:
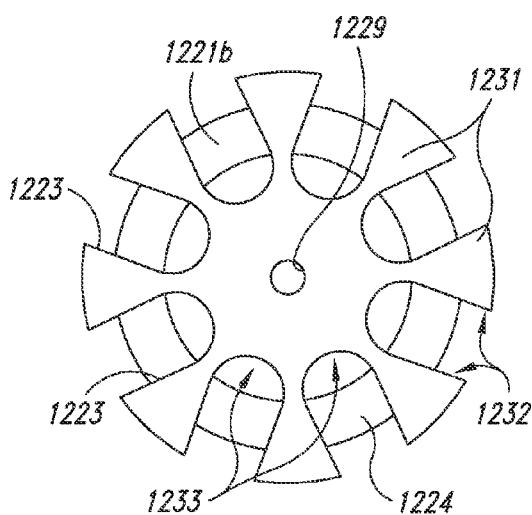
Figure 24C:
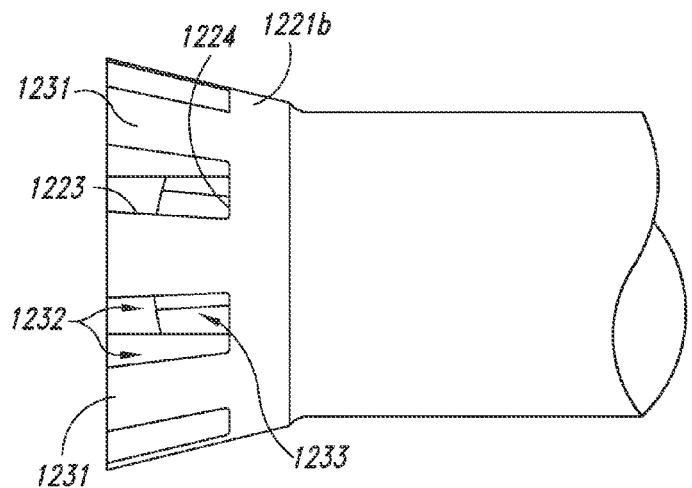

Although the first cover 1221*a* of FIG. 24A represents one illustrative pattern or slots and holes, other embodiments can include different patterns configured for desired injection and ignition properties. For example, FIG. 24B is a side view and FIG. 24C is a side view of a second ignition and flow adjusting device or cover 1221*b* configured in accordance with another embodiment of the disclosure including numerous sharp edges. Referring to FIGS. 24B and 24C together, the second cover 1221*b* includes a plurality of slots 1223 extending radially outwardly from a central portion of the second cover 1221*b*. The slots 1223 are formed between electrode portions 1231 extending from a base surface 1224. The electrode portions 1231 are configured to create an ignition even with a corresponding electrode portion of an engine head. The second cover 1221*b* also includes a hole 1229 at a central portion of the second cover 1221*b*. Accordingly, combustion properties can be monitored through the hole 1229, as well as through gaps 1233 between the electrode portions 1231 and the base surface 1224.

In some instances it may be desirable to combine spark, plasma, hot surface, and/or catalytic ignition for an ignition event. For catalyst ignition, for example, the electrode portions 1231 and/or ignition points 1232 can include a catalyst such as a platinum metal or platinum black. For hot surface ignition, the electrode portions 1231 and/or ignition points 1232 can include depositions including acicular structures that are deposited as a result of spark or plasma erosion and transport. Such deposits may be moved between the electrode portions 1231 by occasionally reversing the voltage polarity and/or utilizing alternating current for the development of the plasma that is produced adjacent to the ignition points 1232.

One benefit of the illustrated embodiment is that the second cover 1221*b* can provide protection for sensors or transducers that are used to monitor the combustion properties. Another benefit is that the slots 1223 extending between the electrode portions 1231 create multiple ignition generation points 1232 or act as hot surfaces to initiate ignition. Because the second cover 1221*b* has numerous ignition points 1232, the second cover 1221*b* is particularly suited for extended use. For example, even if one of the ignition points 1232 was fouled or otherwise degraded or rendered inoperable, the second cover 1221*b* still has numerous other ignition points 1232 to generate ignition.

Figure 24D:
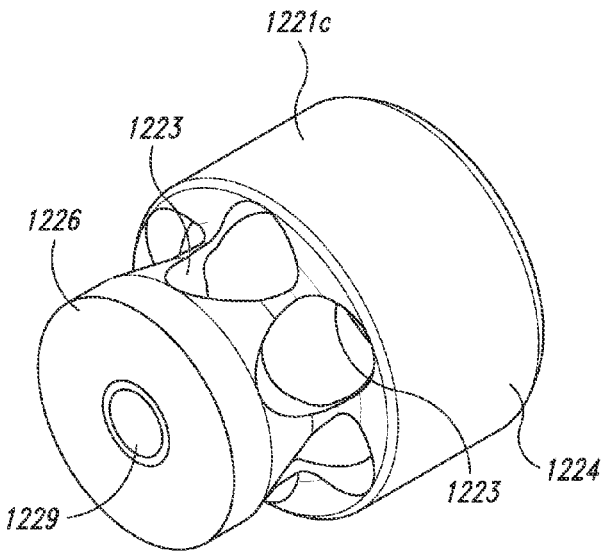
Figure 24E:
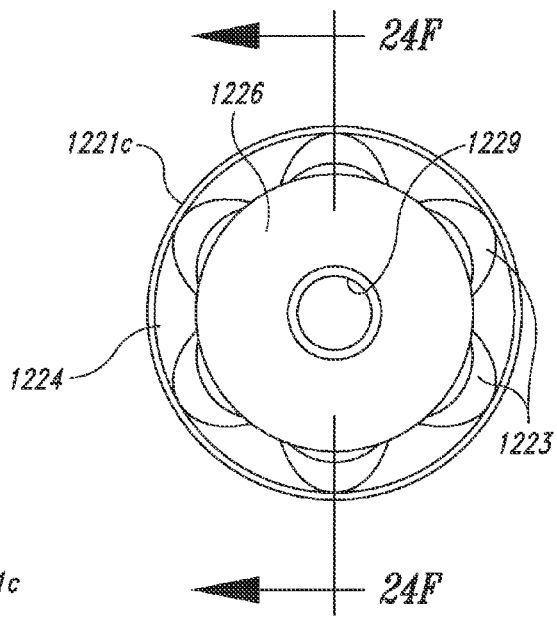
Figure 24F:
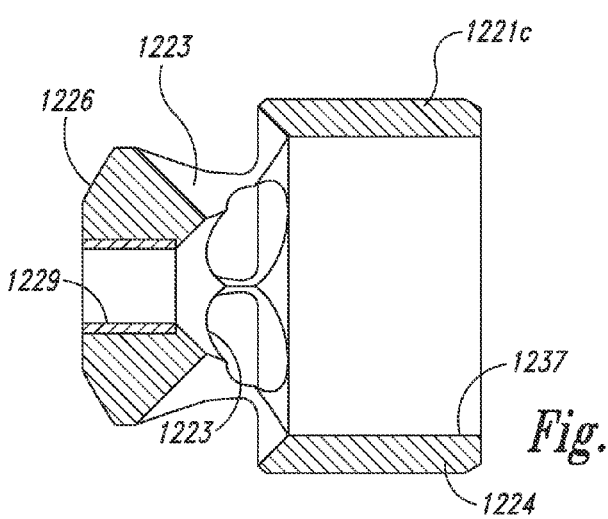

FIG. 24D is an isometric view, FIG. 24E is a front view, and FIG. 24F is a cross-sectional side view taken substantially along the lines 24F-24F of FIG. 24E, of a third cover 1221*c* configured in accordance with yet another embodiment of the disclosure. In the illustrated embodiment, the third cover 1221*c* includes a first surface 1226 spaced apart from a base portion 1224. A hole 1229 extends through a central portion of the first surface 1226, and a plurality of slots 1223 extend through the third cover 1221*c* between the first surface 1226 and the base portion 1224. Similar to the embodiments described above, the hole 1229 and the slots 1223 allow instrumentation carried by an injector to monitor combustion properties. In the illustrated embodiment, the slots 1223 extend through the third cover 1221*c* at an angle of approximately 45 degrees from the first surface 1226. In other embodiments, however, the slots 1223 can be formed in the third cover 1221*c* with a greater or lesser angle. The third cover 1221*c* further includes a passage 1237 extending through the base portion 1224 through which fuel flows through the third cover 1221c.

Figure 25A:
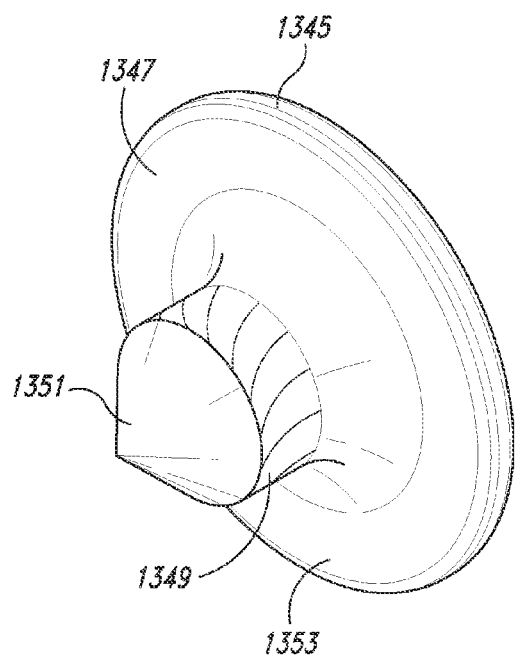
FIG. 25A is an isometric view.
Figure 25B:
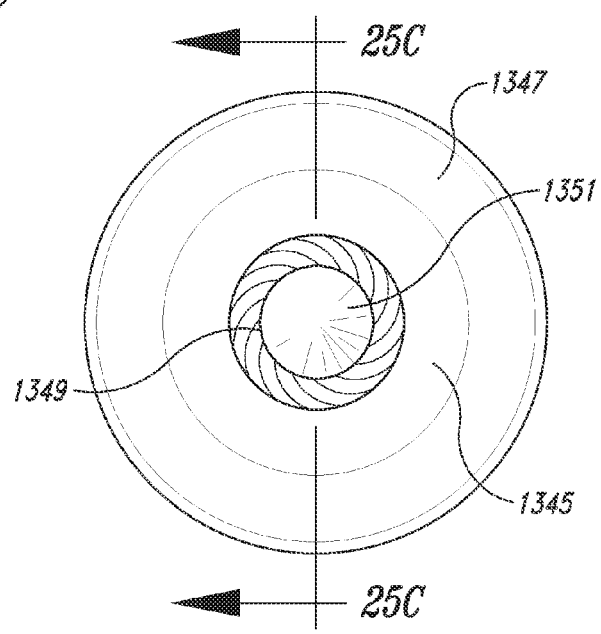
FIG. 25B is a rear view.
Figure 25C:
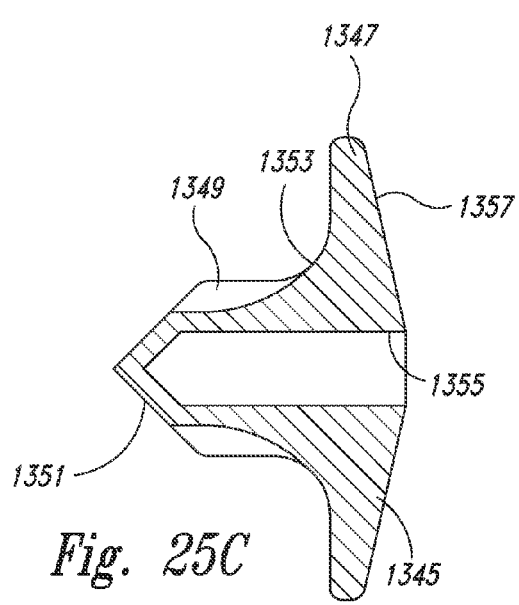
FIG. 25C is a cross-sectional side view taken substantially along the lines 25C-25C of FIG. 25B of a check valve configured in accordance with an embodiment of the disclosure.

Referring again to FIG. 21, in some applications it may be desirable to have a mechanical check valve at the nozzle portion 918 to prevent the combustion pressures developed in the combustion chamber 904 from entering the injector 910. Accordingly, in certain embodiments, the nozzle portion 918 can include a mechanical check valve that is aligned with a bearing guide 943 carried by the nozzle portion 918. FIGS. 25A-25C illustrated such a check valve 1345 configured in accordance with one embodiment of the disclosure. More specifically, FIG. 25A is an isometric view, FIG. 25B is a rear view, and FIG. 25C is a cross-sectional side view taken substantially along the lines 25C-25C of FIG. 25B of the check valve 1345. Referring to FIGS. 25A-25C together, in the illustrated embodiment the check valve 1345 includes a projection portion 1351 extending from a base portion 1347. The projection portion 1351 is configured to be at least partially received in the nozzle portion of a corresponding injector. The check valve 1345 includes a flow surface 1353 extending from the base portion 1347 to the projection portion 1351. At the projection portion 1351, the flow surface 1353 includes impeller fins or slots 1349. The check valve 1345 further includes a combustion surface 1357 that is configured to face a combustion chamber. An opening or slot 1355 extends into the check valve 1345 from the combustion surface 1357. The opening 1355 can at least partially receive the bearing guide 943 of FIG. 21.

In operation, the check valve 1345 may be urged toward a closed position by combustion chamber pressure, a mechanical spring and/or a magnetic force such as provided by an electromagnet or by a permanent magnet incorporated within a valve seat. The positive pressure of a flow of a given fuel through the corresponding valve seat opens the check valve 1345 to allow the fuel to flow thereby and be injected into the combustion chamber. This flow can create a Coanda effect to hold the check valve 1345 in the open position as the fuel flows into the combustion chamber. In certain embodiments, the flow velocity and pressure relationship (including, for example, the ratio between the fuel being delivered accordingly and the combustion chamber pressure) corresponding to the Coanda effect positioning of the check valve 1345 may be monitored. This information can be useful for fuels such as gasoline, diesel, ammonia, propane, fuel alcohols and various other fuels that may be delivered as a liquid, superheated liquid, or vapor, including numerous permutations thereof with or without additional permutations further including products of thermochemical regeneration such as hydrogen and carbon monoxide.

According to one feature of the illustrated embodiment, the check valve 1345 is configured to produce a dense flow of fuel in alternating zones to enhance the combustion of the fuel. For example, the helical impeller fins or slots 1349 serve the purpose of imparting an angular velocity to the check valve 1345, while also producing the denser fuel flow in alternating zones. This design feature may be utilized to facilitate more rapid combustion of fuel as a result of enhanced rates of mixing. This design feature may also be utilized to collide injected fuel according to counter flow paths, as well as producing shear mixing according to cross flow paths as fuel is propelled into air or another oxidant that has entered the combustion chamber with angular momentum or that has been induced to have swirl by the combustion chamber geometry. Accordingly, the check valve 1345 may be configured to provide angular momentum to the injected fuel for clockwise or counterclockwise motion to produce desirable acceleration of the heat release process along with minimization of heat transfer to combustion chamber surfaces.

Turning next to FIG. 26A, FIG. 26A is a cross-sectional side view of an injector 1410 configured in accordance with yet another embodiment of the disclosure. The injector 1410 includes several features that are generally similar in structure and function to the corresponding features of the injectors described above. For example, the injector 1410 is particularly suited to fit within the very small port of the engine head 1407 in a relatively small diesel engine. For example, the injector 1410 includes a middle portion 1416 extending between a base portion 1414 and a nozzle portion 1418. In the illustrated embodiment, the injector 1410 utilizes a ferromagnetic alloy case 1402 as part of an electromagnetic circuit with a driver armature 1424. The driver 1424 is normally rested against a first magnetic or mechanical biasing member or spring 1435 downstream of the driver 1424 in the middle portion 1416. The driver can also be normally rested against a second biasing member 1413 upstream of the driver 1424 in a counter bore 1433 of the middle portion 1416. Current applied to a solenoid winding moves the driver 1424 linearly along a longitudinal axis of the injector 1410. The case 1402 also houses and protects a high dielectric strength ceramic insulator 1417, which can include any of the insulators described in detail above. The insulator 1417 insulates conductive tubing or plating 1408 for the purpose of delivering ignition energy to the nozzle portion 1418. For example, a cable 1438 can supply the ignition energy to the plating 1408, which conducts the ignition energy to an ignition member or cover 1421 at the interface of the combustion chamber 1404.

FIG. 26B is a front view of the injector 1410 illustrating the ignition member 1421. Referring to FIGS. 26A and 26B together, the ignition member 1421 includes multiple radial ignition points 1412 for creating an ignition event such as spark, plasma, hot surface and/or catalytic stimulation. In addition to the ignition points 1412, the ignition member 1421 includes multiple apertures for fuel entry into the combustion chamber 1404, as described above. Additional features for minimizing the space required for use of the injector 1410 may be provided by a fuel delivery passage 1442 extending from the base portion 1414 to the nozzle portion 1418. For multicylinder engines the fuel delivery passage 1442 can be coupled to one or more flexible delivery conduits to a suitable fuel distributor manifold.

In operation, current applied to the electromagnetic winding attracts the driver 1424 toward the winding 1411 and a pole piece 1441 to draw pressurized fuel into the injector 1410. The driver 1424 impacts a stop clamp 1460, which may be part of a high physical and dielectric strength polymer sheath such as polyetheretherkeytone that protects and connectively clamps an actuator 1422. The actuator 1422 is coupled to a flow valve 1420 in the nozzle portion 1418. The flow valve 1420 is received in a valve seat 1425. In certain embodiments, the actuator 1422 can include a rod or cable incorporating a conduit or a group of various strands of fiber optics. Moreover, the flow valve 1420 and the valve seat can be ferromagnetic. The nozzle portion 1418 further includes a check valve 1458, which can also be ferromagnetic. The check valve 1458 extends through a hollow bearing tube 1426 and provides access for pressure measurements and comprehensive view for temperature and motion delineation at the combustion chamber 1404. This provides for monitoring of combustion chamber conditions and events including the piston motion for determination of piston speed and acceleration, combustion chamber pressure at intake, compression, injection, ignition, flame propagation, power and exhaust periods, and the temperature of combustion along with the temperature of combustion chamber components including the piston, cylinder walls, valves and head surfaces. Fiber optic filaments and other instrumentation communication components (including, for example, multiple layered insulation of electrically conductive instrumentation fibers) extend through the fuel delivery passageway 1432 of the pole piece 1441.

As shown in FIGS. 26A and 26B, to minimize the diameter of the injector 1410 at the port of the engine head 1407 providing access to the combustion chamber 1404, the overall diameter of the injector 1410, including the casing 1402 and the energy supply cable 1438, is minimized. Moreover, the actuator 1422 can be routed internally through the injector 1410. Communication fibers from the actuator 1422 can exit the base portion 1414 through an exit through a seal and be coupled to an external controller, processor, or memory. Similarly, an insulated cable 1440 may be routed through the base portion 1414 to deliver electrical power to drive one or more piezoelectric or magnetostrictive devices, including, for example, the driver 1424.

In some applications, the check valve 1458 can be configured to have impeller fins or slots generally similar to the check valve 1345 described above with reference to FIGS. 25A-25C. These impeller fins or slots can impart an angular velocity to the fuel to produce denser fuel flow in alternating zones, which can thereby enhance type of fuel burst or pattern emitted from the nozzle portion 1418. This design feature may be utilized to facilitate more rapid combustion of fuel as a result of enhanced rates of mixing, to collide according to counter flow paths, and/or produce shear mixing according to cross flow paths as fuel is propelled into air or another oxidant that has entered the combustion chamber with angular momentum, or that has been induced to have swirl by the combustion chamber geometry. Accordingly, the check valve 1458 may be configured to provide angular momentum for clockwise or counterclockwise motion of the fuel to produce desirable acceleration of the heat release process along, with minimization of heat transfer to combustion chamber surfaces.

Figure 27A:
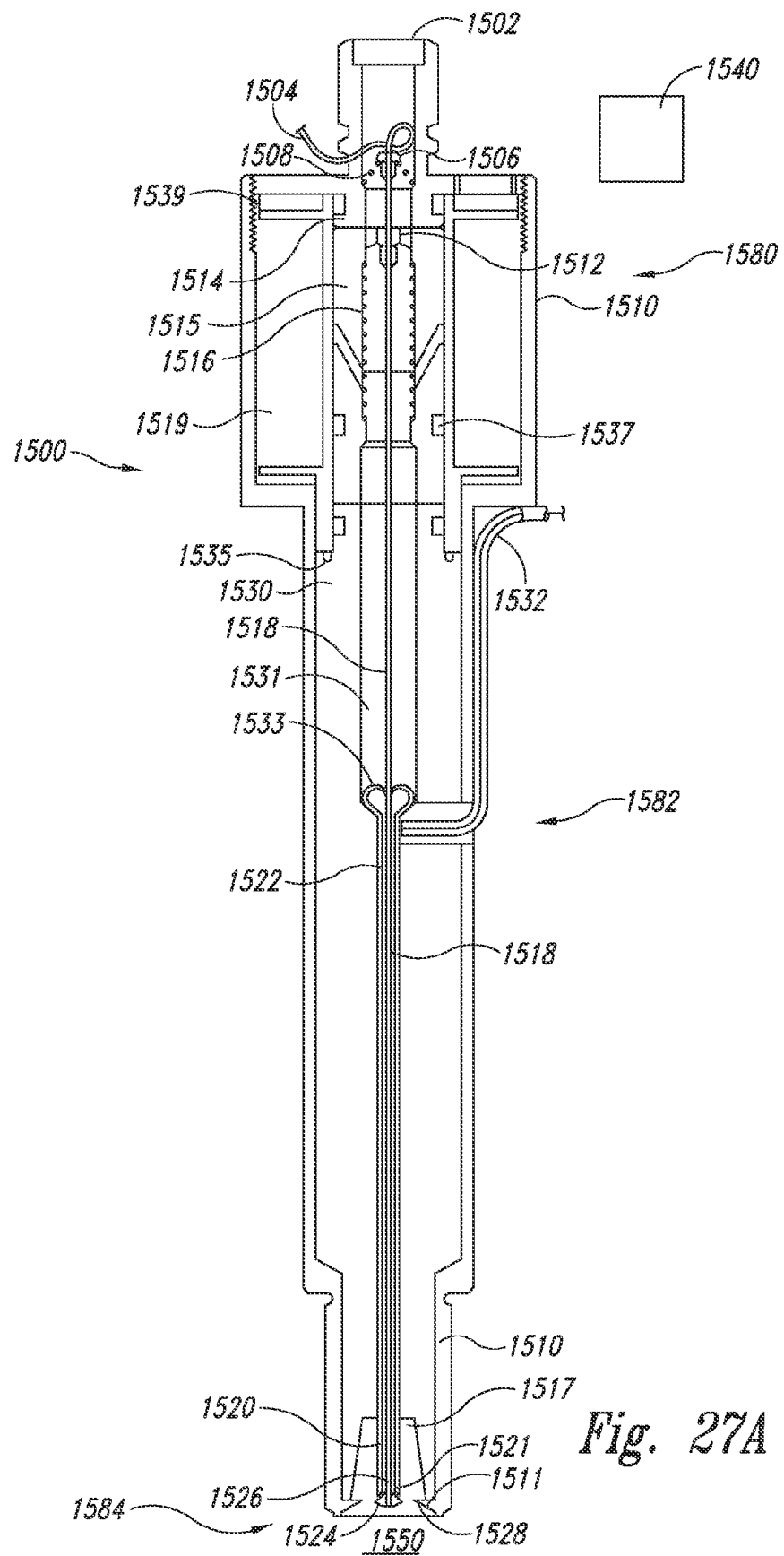
FIG. 27A is a cross-sectional side view of an injector configured in accordance with another embodiment of the disclosure.

Referring next to FIG. 27A, FIG. 27A is a cross-sectional side view of an injector 1500 configured in accordance with another embodiment of the disclosure. The illustrated injector 1500 is particularly suitable for use in engines with high or low compression ratio operation to provide much faster and more complete combustion of fuels. These fuels can contain virtually any combination of fuel characteristics including, for example, temperature, one or more mixed phases, viscosity, energy density, and octane and cetane ratings including octane and cetane ratings far below standards for conventional operation. In the illustrated embodiment the injector 1500 includes several features that are generally similar in structure and function to corresponding features of the injectors described above. For example, the injector 1500 includes a middle portion 1582 extending between a base portion 1580 and a nozzle portion 1584. The injector also includes an actuator 1518 extending from a driver 1515 to a fuel flow valve 1524.

In the illustrated embodiment, any fuel that is not combusted by spark ignition (such as diesel fuel made from energy crops, animal fat, and or other organic wastes) can be delivered to the injector 1500 through an inlet port 1502. The fuel can flow along a fuel flow path along several components of the injector 1500. For example, the fuel can flow in the base portion 1580 past a suitably reinforced instrumentation signal cable 1504, a spring retainer cap 1506, a compression spring 1508, an optional magnet 1514, the driver 1515, and an optional compression spring 1516. The fuel path continues in the middle portion through passageway 1531 of a high dielectric strength insulator 1530, and into the bore of a conductive plating or tube 1522 to be delivered to the nozzle portion 1584. In the illustrated embodiment, the nozzle portion 1584 includes a seat at the interface to the combustion chamber 1550 that is sealed by the normally closed flow valve 1524. In certain applications, the plating or tube 1522 may be coated or plated with a high dielectric strength material 1520 within a zone 1517 proximate to the combustion chamber for the purpose of assuring electrical conduction to or from the flow valve 1524. In other applications, the tube coating 1520 may be highly conductive or highly resistant to spark erosion, as may be needed for serving as a circuit component in spark and plasma ignition processes.

Thus depending upon the application, the plating or tube component 1522 may be a conductive plating on the bore of the dielectric insulator 1530 or a conductive metal, a ceramic, a polymer, or a composite that provides specialized valve sealing at the interface with the flow valve 1524. This plating or tube component 1522, along with the actuator 1518 and driver 1515, enables the injector 1500 to have a very small outer diameter. This configuration also allows the injector to be relatively long as needed to reach through zones with one or more overhead camshafts and valve operators.

References to biasing members or thrust producing members can include springs (including, for example, mechanical spring forms such as helical windings, conical windings, flat and curved leaf or laminated blades, elliptic, torsion, and various disks, formed disk springs), magnets, and/or piezoelectric components that can be configured to produce pull or thrust as needed. In many applications, combinations from such selections are effective to provide desired speed of operation, resonant tuning, and/or to damp undesirable characteristics.

In the illustrated embodiment, the normally closed flow valve 1524 is urged closed against the valve seat 1521 of the plating or tube 1522 by tension on the actuator 1518, as provided by the compression spring 1508 and spring cap 1506. These springs can be attached to the actuator 1518 to mechanically limit the unidirectional travel of the actuator 1518 for purposes of applying closure tension on the flow valve 1524. Moreover, the flow valve 1524 may be provided with a sharp annular feature, or it may have sharp ignition points circumferentially spaced apart from one another. A conductive case 1510 can serve as a portion of the magnetic circuit for a solenoid winding 1519 and the driver 1515. The case 1510 can also serve as a multifunctional component extends to the interface of the combustion chamber. At the interface with the combustion chamber, the case 1510 can also include internal ignition features 1528, such as radially inwardly directed sharp points, or an annular concentric feature. Moreover, at the base portion 1580, the injector can include one or more grooves and o-ring seals 1537, or adhesive compounds such as urethane or epoxy, to seal the fuel within the base portion 1580.

In operation, the injector 1500 can receive a pressurized fuel through the inlet port 1502. The fuel flows to the normally closed flow valve 1524 and is subsequently admitted to the combustion chamber by actuation of the flow valve 1524 by a suitable force generator, such as a piezoelectric or solenoid device for moving the driver 1515. The driver 1515 causes a counter force to the tension exerted by the spring 1508 and thus allows fuel to burst into the combustion chamber from the nozzle portion 1584. Any number of provisions may be provided for delivering high amperage pulses of current in the gap between the ignition features 1528 and the plating or tube 1522, and/or the gap between the flow valve 1524 and the ignition features 1528. For example, the insulated cable 1532 can deliver such current to moveable conductor cables 1533 that are attached to conductive plating or fibers over the actuator 1518 to thereby conduct the current to the flow valve 1524.

Such operation may be repeated at a high frequency including a resonant tuned frequency to produce a series of fuel entry bursts. These repeated bursts may be accompanied by exertion of acoustical impetus on each fuel burst from piezoelectric or magnetostrictive forces. These impetus forces may include forces produced by a multifunctional embodiment of the driver 1515. For example, ignition can be applied by one or more ionizations of the air in one or more annular gaps between the flow valve 1524 and the most proximate annular portion 1511 of the casing 1522. Such ionized air may continue to be delivered from annular zone 1517 to provide assured ignition of fuel bursting into the combustion chamber 1550 as fuel is injected by the outward opening of the flow valve 1524.

Spark development in the relatively small gap that initially exists between the flow valve 1524 and ignition features 1528 of the annular portion 1511 may trigger a capacitance discharge as disclosed U.S. Pat. No. 4,122,816, which is incorporated herein by reference in its entirety, to produce a plasma current that may subsequently surge to more than 500 amps to cause the emerging plasma that follows the motion of valve 1524 outward to be launched and accelerated into the combustion chamber at supersonic velocity and to impinge upon and impart impetus to stratified charge fuel bursts for extremely rapid completion of combustion processes. This projected ignition and accelerated combustion process may be adaptively repeated with each fuel injection burst or adaptively developed for projected rapid ignition of more than one successive fuel injection bursts.

In some applications, plasma production may be timed by triggering and formed from ionized fuel molecules that enter the gap between sharp or pointed surfaces or ignition features 1524 and 1528. As the flow valve 1524 continues to open outwardly, the plasma of ionized fuel molecules is thrust into the combustion chamber at supersonic velocity to assure extremely rapid completion of combustion for each fuel burst. This projected ignition process may be adaptively adjusted and repeated with each fuel injection burst or adaptively developed for projected rapid ignition of more than one successive bursts of injected fuel. The inventor has found that it is particularly surprising and noteworthy that at virtually every piston speed, much greater torque development per calorie of fuel value results from adaptive application of this rapid ignition and combustion process.

A corollary advantage of this plasma thrust is that because a far more rapid fuel injection, ignition, and completion of combustion processes occurs, fuel injection may begin at or after top dead center to reduce heat losses during the compression period. Accordingly, the engine runs much more smoothly, and friction due to heat losses that induce dimensional changes of relative-motion components, and friction due to degradation of lubricate films particularly on the cylinder walls and rings are reduced. As a result, cylinder and ring life is extended, heat losses are reduced, fuel efficiency is increased, and maintenance costs are reduced.

Figure 27B:
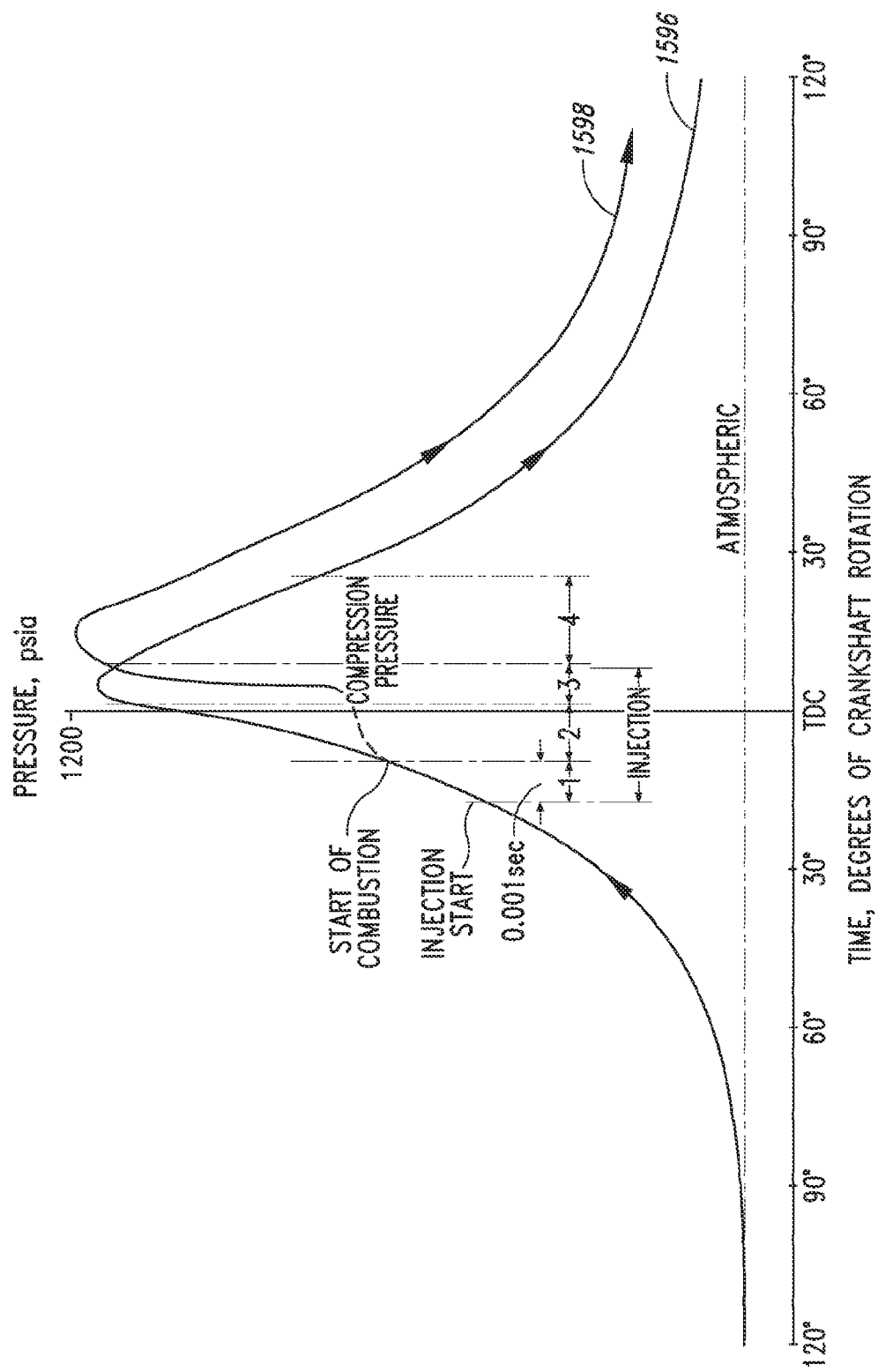
FIG. 27B is a schematic graphical representation of several combustion properties of the injector of FIG. 27A.

FIG. 27B is a schematic graphical representation of several combustion properties of the injector of FIG. 27A, as well as other injectors configured in accordance with embodiments of the disclosure. As shown in FIG. 27B, compression ignition of diesel fuel (which requires a specific cetane rating) necessitates initiation of high pressure fuel injection early in the compression stroke. High pressure is required to shear the diesel liquid into small droplets and to propel and penetrate the droplets sufficiently far into the compression heated air to gain sufficient heat to evaporate the liquid fuel and continue penetration into additional hot air to crack the large molecules of evaporated fuel into small molecules that can start the combustion process. If the air has not been sufficiently heated, and/or if the droplets are not small enough, and/or if the piston speed is too low or too high, diesel fuel will penetrate to quench zones and heat will be lost to combustion chamber surfaces such as the piston, cylinder walls and head components, and unburned particles and hydrocarbons will be emitted—a portion of which as visible black smoke and another portion as smaller particles that are particularly harmful to the lungs and cardiovascular systems of humans and animals.

The Diesel curve 1596 shows a portion of the pressure development before TDC. This portion (before TDC) of the pressure rise is "back work" and is larger for earlier initiation of injection and start of combustion events. The higher the piston speed, the earlier the initiation of injection and start of combustion must be in order to complete evaporation, cracking and combustion events. In each period of diesel fuel injection per combustion cycle the portion of fuel that is most insulated by hot surplus air quickly evaporates, cracks, and abruptly combusts to reach temperatures in excess of 2,200° C. (4,000° F.) which is the threshold for forming oxides of nitrogen.

In comparison, an operation according to integrated injectors/igniters configured in accordance with the present disclosure, as shown by the curve 1598, initiates and completes combustion much faster at all piston speeds and operating conditions and delivers much more work area under the pressure curve (mostly if not all on power stroke as torque×rpm) to improve fuel efficiency and horsepower compared to Diesel operation. Fuels can be rapidly injected through larger passageways (much later than with compression-ignition or after TDC) to complete combustion sooner: This is because upon any situational condition of inlet air temperature, barometric pressure, or fuel type (particularly including combustion characteristics) that adverse results such as oxides of nitrogen formation, over-pressurization of critical engine components, or loss of heat due to penetration of the insulating oxidant develop multiburst-multifuel operation can adaptively provide sufficient plasma energy and or gas-formation (supercavitation) to eliminate diesel-type high pressure injection through small shear orifices and the corresponding need for fuel to penetrate extensive distances through hot air to evaporate, and crack the fuel in order to combust the fuel. In addition, the injectors disclosed herein can cease multiple injections of fuel any instant that peak combustion temperatures approach 2,200° C. (4,000° F.) or that the zone of combustion exceeds the surplus air insulation envelope and approaches a quench region. After which, one or more additional fuel injections may be resumed to achieve the desired work production for each cycle of operation. Moreover, injectors disclosed herein can turn off multiple injections of fuel any instant that peak combustion pressure approaches a preset maximum to avoid damage to the piston, connecting rod, bearings, or crankshaft and or to avoid pressure-induced adverse formation of radicals or compounds such as various oxides of nitrogen.

The projected rapid ignition and combustion process facilitates smooth operation of throughout a much larger turn-down ratio including operation of as many cylinders of a multicylinder engine as needed to instantaneously meet load requirements. For example, the projected rapid ignition includes a much faster and more efficient response to operator demand (or cruise control demand) for torque or increased engine speed. This further extends the advantages of longer cylinder and ring life along with reductions of heat loss to provide dramatic improvements in fuel efficiency and reduction of pollutive emissions and reduced maintenance costs.

Pollutive emissions problems result from "stop and go" and "cold start" engine and catalytic reactor conditions in which the catalytic correction processes of hot engine steady state operation are not available. However, another advantage of the projected rapid ignition and combustion process is a much cleaner exhaust at all engine temperatures, including, for example at a cold engine or an engine in a "stop and go." Accordingly, in these problematic conditions, the duty cycle may be started with reduced or eliminated requirements for a starter motor or the expenditure of starting energy that conventional engines require. Administering the projected rapid ignition and combustion process to each cylinder that is in a power stroke provides startup without the conventional requirement for relatively large power expenditures to start the engine. Conventional operation requires cranking the engine to cause pistons to reciprocate through intake strokes to produce a vacuum in the intake system into which fuel is added with the hope of producing a homogeneous mixture, any portion of which must be spark ignited, and further cranking to turn the camshaft to provide intake valve opening and exhaust valve closing operations as the more or less homogeneous charge that has hopefully been produced in the intake system is transferred to the combustion chamber. Additional cranking to compress the more or less homogeneous mixture and more cranking against pressure that is developed if ignition of the homogeneous mixture is achieved to carry the back work process through top dead center conditions. Whatever energy may be left in the combustion gases is used to provide positive work production in the power stroke to sustain a startup of the engine.

Similarly a diesel compression-ignition engine that is converted according to the present disclosure to include projected rapid ignition and combustion processes in each cylinder that is in a power stroke provides startup without the conventional requirement for relatively large power expenditures to start the engine. Conventional diesel engine compression-ignition operation requires cranking the engine to cause pistons to reciprocate through intake strokes to transfer air into the intake system, further cranking to turn the camshaft to provide intake valve opening and exhaust valve closing operations as air from the intake system is transferred to the combustion chamber, and additional cranking to compress the air to a sufficient temperature to cause diesel fuel that is injected at a high pressure as a result of more cranking to be evaporated and cracked to hopefully develop ignition of the fuel undergoing the evaporation and cracking process as it mixes with more hot air and more cranking to carry the back work process through top dead center conditions and provide what energy may be left in the combustion gases to achieve enough positive work production in the power stroke to sustain startup of the engine.

Referring again to FIG. 27A, the instrumentation and signal cable 1504 may have extra reinforcement in a middle section 1518 between the spring cap 1506 and the attachment or mechanical stroke stop in the fuel valve 1524. Such reinforcement can include provisions for exertion of operational force by driver 1515 upon a mechanical stroke stop collar 1512 to provide adequate tensile, fatigue, and dielectric strengths to assure stable operation for very long service life. An instrumentation cable 1526 at the combustion chamber interface may have properties such as motion, temperature, and pressure at the combustion chamber interface of valve 1524. This instrumentation may also provide wireless communication to a microprocessor 1539 located within the injector 1500 and or to another microprocessor or computer 1540 located remotely or on the outside of the case 1510.

Thermal data from gaseous, plasma, and solid surfaces of the combustion chamber including infrared, visible, and ultraviolet frequencies may be processed along with pressure and acceleration data and transmitted by integration of wireless nodes, along with transmissive and/or conductive fibers within the actuator 1518. For example, the actuator 1518 can include suitable instrumentation such as transducers for communication to the microprocessor 1539, and/or by extension through an appropriate seal by the cable 1504 to the remote microprocessor or computer 1540.

A suitable energy conversion device or a combination of devices such as photovoltaic, thermoelectric, electromagnetic, electrical, and piezoelectric electricity generators may be utilized to power a sensor node that may operate at kilohertz to gigahertz frequencies. Such operations may be facilitated by systems such as the TinyOS, a free and open source component-based operating system and platform for wireless sensor networks developed at U.C. Berkeley. Such operations may be utilized to initiate and help facilitate operation of relays, system outputs and or alarms after specified events occur. This includes events that may be detected by the instrumentation in the nozzle portion 1584, or by a transducer and signal analyzer 1535 which may include pressure and optical data transmitted through functionally coupling or transparent insulator 1530, or by fibers or pathways through insulator 1530.

These combinations facilitate adequate mechanical and dielectric strength of assembled components to enable high energy plasma generation by components that have very small dimensions. It is particularly helpful to provide a multifunction valve that is moved to induce plasma projection and to prohibit fouling by ash and residue deposits from relatively unrefined and inexpensive fuels that may be used. Such benefits may also be provided by synergistic combination of the flow valves and check valves described herein that provide blocking of combustion-sourced pressure, as well as providing fuel control at the combustion chamber interface to eliminate fuel drip or dribble at undesired times.

Further advantages for facilitating instrumentation processing may be provided by adding agents to fuels that provide motion detection and combustion process delineation, as well as preferred thermal signatures for purposes of controlling combustion processes and/or the peak temperature of combustion. In operation such additives in relatively minute amounts are delivered as miscible agents or colloidal suspensions that emit photons at certain known frequencies upon being heated, ionized or de-ionized. Finely divided or otherwise activated transition metals that may be stored and combined with carbon monoxide that is provided by endothermic reactions according to fuel storage embodiments of the present disclosure, or to form carbonyls that may be utilized as another family of additives for serving as radiative indicators of ignition and combustion process events. In the alternative, one or more selected transition metal carbonyls such as manganese or iron may be prepared and stored for continuous or occasional additions to the fuel selection being utilized. Illustratively, one or more additives of such organic or inorganic substances that provide manganese, iron, nickel, boron, sodium, potassium, lithium, calcium, or silicon are typical agents with distinct emission signatures for such motion characterization and delineation of temperature or process rate purposes. Such additives may be continuously or occasionally provided from storage tanks to calibrate transducers that detect temperature along with ignition process motions of various reactants and products of the combustion process. Such properties are utilized by detection and analysis systems to determine temperature (including avoidance of temperatures in which oxides of nitrogen are formed), combustion process steps, and combustion process rates. These results may be utilized to create a comprehensive record of fuel efficiency improvements along with cumulative tallies of benefits such as reductions of carbon dioxide, oxides of nitrogen, and particulate emissions.

Figure 28:
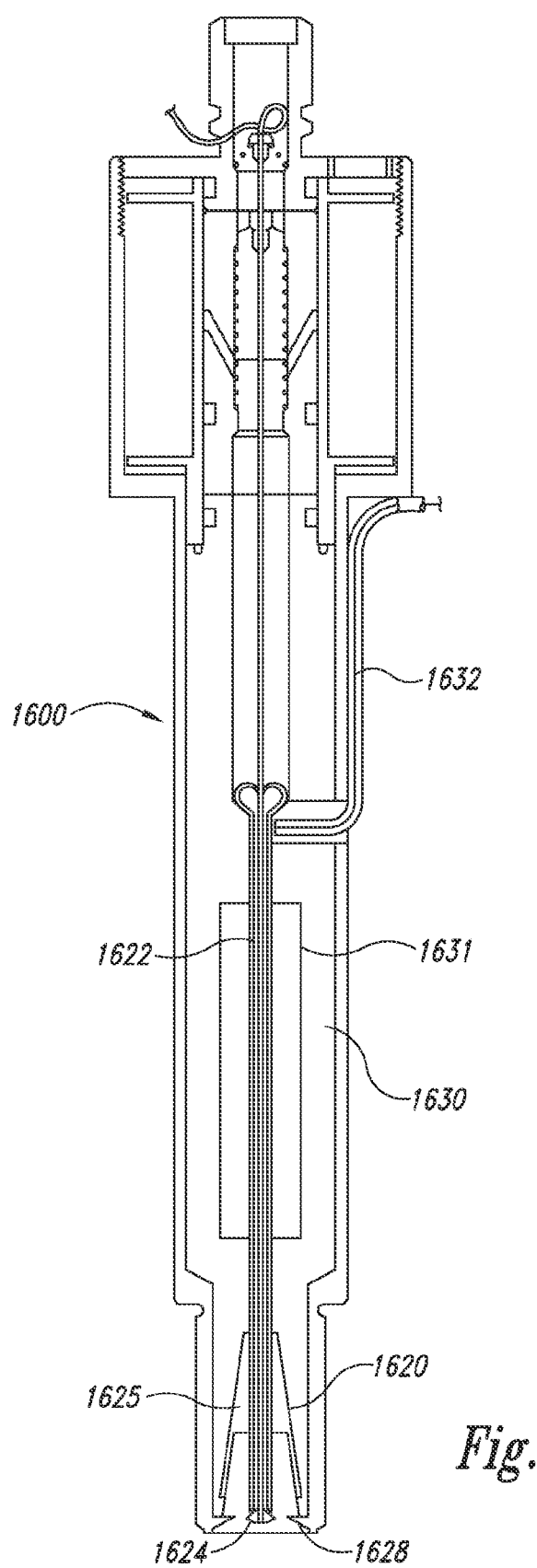

FIG. 28 illustrates an injector 1600 configured in accordance with yet another embodiment of the disclosure. More specifically, FIG. 28 is a cross-sectional side view of the injector 1600, which includes several features that are generally similar in structure and function to the corresponding features of the injector 1500 described with reference to FIG. 27A, as well as to the other injectors described herein. Accordingly, these similar features of the injector 1600 will not be described with reference to FIG. 28. In the embodiment illustrated in FIG. 28, however, the injector is configured to provide some or most of the energy conversion processes for at least the following: 1) monitoring conditions and events in the combustion chamber, including, for example, temperature, combustion processes, pressure, motions of fluids such as gases, vapors, and liquids, as well as with piston or rotor location, speed and acceleration; 2) operation of electronic transducers, processors, computers, and controllers (e.g., processors 1535 and 1539 described above with reference to FIG. 27A) in response to monitored conditions for the purpose of adaptively optimizing initiation of fuel injection, completion of the fuel injection, adjustment of the delay between any successive initiations of fuel injection, as well as with the selection and timing of correspondingly optimized ignition processes; 3) actuation and powering of valve operators and drivers that exert forces on corresponding flow and/or check valves; and 4) actuation and powering of adaptively optimized ignition system functions.

Thermoelectric generation of power for these purposes along with signal conduction or wireless communication to and from an electronic controller may be provided by utilization a portion of the energy transferred through the temperature difference between the combustion process and a lower temperature such as the incoming fuel that may be at or below the ambient air temperature. For example, one or more devices including selections such as a semiconductor thermoelectric generator 1620 may be carried by the injector 1600 to trap radiation from the combustion process and produce the high temperature needed. The corresponding lower temperature may be established by fuel that flows through the conductive tube 1622. Suitable thermoelectric films and circuits are available from sources such as Perpetua Power Source Technologies, Inc., 4314 SW Research Way, Corvallis, Oreg. 97333 (See, e.g., http://www.perpetuapower.com/products.htm). Moreover, wireless sensor nodes for these purposes are available from sources such as Microchip, Atmel, and Texas Instruments.

A power or electricity generator according to another embodiment can include a photovoltaic generator 1625, which may be located adjacent to or integral with the thermoelectric generator 1620. As such, the photovoltaic generator 1625 can convert radiation emitted from the combustion chamber into electricity. The photovoltaic generator 1625 can further serve as an instrumentation transducer for measuring the temperature or other combustion properties and events in the combustion chamber. The photovoltaic generator 1625 may be cooled by heat transfer to fuel that passes nearby in the fuel passageway through the nozzle portion of the injector 1600. For assured heat transfer to the fuel flowing through the nozzle portion, the photovoltaic generator 1625, as well as a cold side of the thermoelectric generator 1620 may be mounted on or joined with a high conductivity material such as silver, copper, aluminum, beryllium oxide, or diamond that delivers heat to the conductive tube 1622.

Other power generation subsystems that may be incorporated with the injector 1600 include vibration-driven electrets and electromagnetic generators. Somewhat larger magnitudes of energy may be generated by one or more piezoelectric devices 1631 as a portion of an insulator 1630 of the injector 1600. The piezoelectric device 1631 can be utilized for generating sparks or plasma to ignite fuel that is injected into the combustion chamber. Spark generation by such piezoelectric processes may be utilized to trigger discharge of high current plasma as generally disclosed in U.S. Pat. No. 4,122,816, which is incorporated herein by reference in its entirety. As an integral component of the injector 1600, the piezoelectric device 1631 may be mounted to receive force applied by events in the combustion chamber by retention within a relatively lower modulus of elasticity material selection for the insulator 1630 to provide for the piezoelectric device 1631 to be mechanically stressed.

Accordingly, the piezoelectric device 1631 may serve as a pressure transducer and as an electricity generator. For example, it can convert strain produced as it is compressed by the compression and/or combustion pressure in the combustion chamber to initially serve as an electrically open system that may be connected to the spark gap between a flow valve 1624 and an ignition feature 1628. Flashover in the spark gap occurs as the breakdown voltage in the gap occurs. In some modes of operation, such breakdown to produce flashover may be stimulated by additives to the fuel that reduce the breakdown voltage so that the timing of such ignition is commensurate with the passage of fuel through the gap. Additives to the fuel for such purposes may include selections from the additives previously described for producing desired radiation emissions upon being sufficiently heated, ionized, and/or de-ionized.

In some applications, additional energy from the piezoelectric device 1631 that is produced as a result of force applied by combustion may be applied through a high voltage cable 1632 to a separate injector that serves another cylinder. This additional energy can also be supplied for other purposes such as driving a piezoelectric or solenoid valve operator, actuators, and/or drivers. In such applications, a suitable circuit for conditioning, storing and switching the energy may include a transformer, a capacitor, a diode, and a switch as shown in the following references: An applications guide regarding piezoelectric sensor devices for measurement of force and pressure along with power generation is "Piezoelectric Ceramics, Properties and Applications" by J. W. Waanders, published by N.V. Phillips in April 1991, as well as information published at Morgan Electroceramics, each of which is incorporated herein by reference in its entirety.

Accordingly, the injector 1600 illustrated in FIG. 28 may provide for each cylinder of an engine, during each cycle of operation, adaptively optimized timing of fuel delivery in one or more successive fuel injection events. The injector 1600 can also provide optimized timing and adaptive utilization of ignition systems selected from piezoelectric, inductive, capacitance discharge, and plasma projection, along with control of peak combustion temperature. The illustrated injector 1600 may do so as a stand-alone adaptively optimized fuel injection and ignition system that only requires suitable connection to a fuel source. In other embodiments, the injector 1600 may operate in concert with other similar injectors, including the application of interactive artificial intelligence to improve performance. The illustrated injector 1600 may also distribute electrical energy to one or more other injectors for purposes such as powering fuel control valves or instrumentation to detect temperature and pressure transducers, to power ignition events, and/or to operate microprocessors or computers.

In operation, numerous combinations of the embodiments disclosed herein enable efficient utilization of virtually any fuel selection. Illustratively, a fuel selection that may include large molecular weight components such as low-cetane vegetable or animal fats, distillate, paraffin, or petroleum jelly that ordinarily cannot be used to start a cold engine may be used with the present embodiments to readily start a cold engine by initially assuring production of clean exhaust by application of the projected rapid ignition and combustion process disclosed regarding the capacitance discharge processes facilitated by injectors disclosed herein, including in particular, for example, the injector 1500 described with reference to FIG. 27A. After the engine produces sufficiently warm coolant and/or exhaust fluids to drive the thermochemical regeneration process to produce hydrogen as summarized below in Equation 7, the energy required to assure clean combustion is greatly reduced and ignition by a piezoelectric generator 1631 or thermoelectric generator 1620 included in the injector 1600 of FIG. 28 may be utilized to greatly reduce the energy expenditure for ignition.

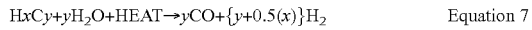

$$HxCy + yH_2O + HEAT \rightarrow yCO + \{y + 0.5(x)\}H_2 \quad \text{Equation 7}$$

Similarly, partial oxidation of such hydrocarbons may be utilized as summarized by Equation 8 to produce sufficient hydrogen in the reaction products to enable assured ignition by relatively low energy spark plasma generated by the piezoelectric generator 1631 or thermoelectric generator 1620.

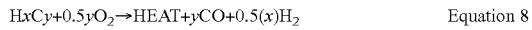

$$HxCy + 0.5yO_2 \rightarrow HEAT + yCO + 0.5(x)H_2 \quad \text{Equation 8}$$

Heat generated by the process summarized by Equation 8 may be utilized in endothermic processes such as shown in Equation 7.

Figure 29:
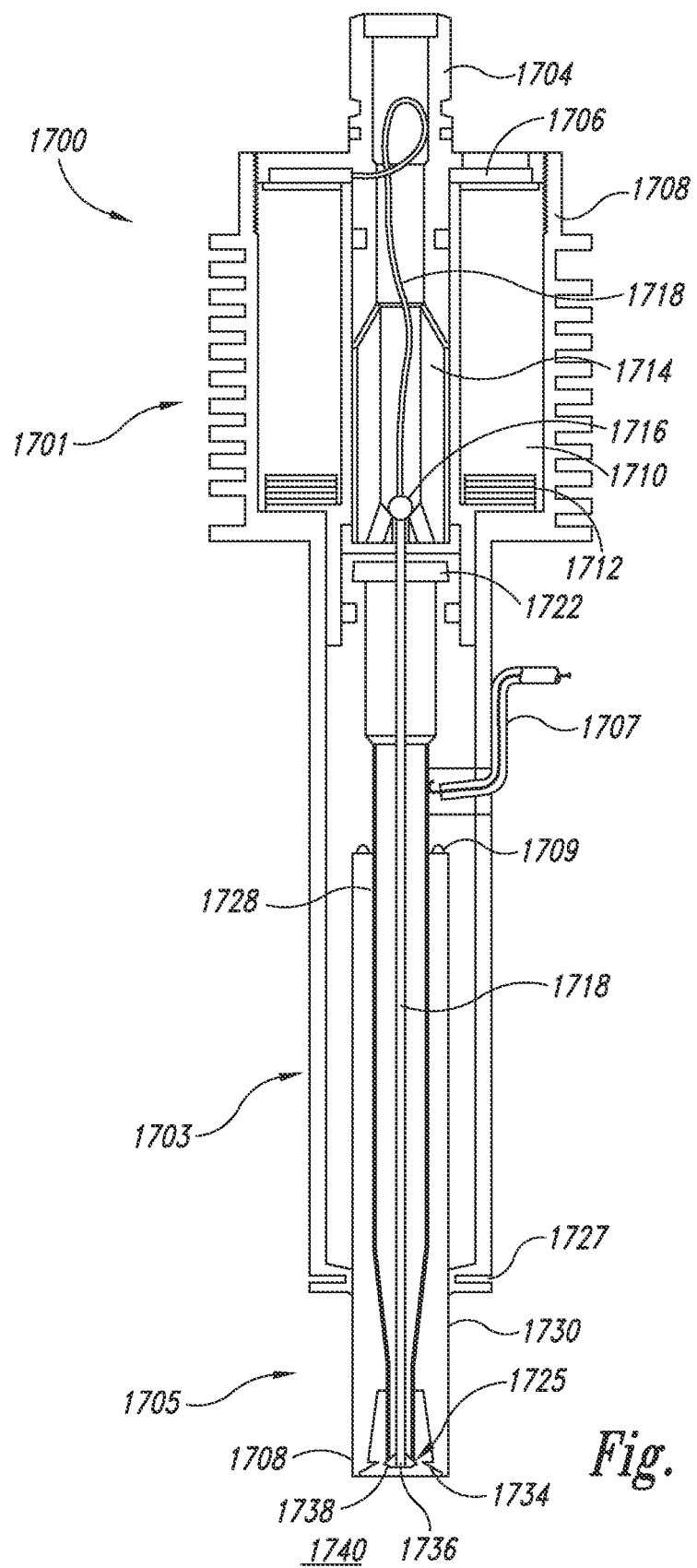

FIG. 29 is a cross-sectional side view of an injector 1700 configured in accordance with another embodiment of the disclosure. The illustrated embodiment includes several features that are generally similar in structure and function to corresponding features of the injectors described above. For example, the injector 1700 includes a middle portion 1703 extending between a base portion 1701 and a nozzle portion 1705. The injector 1700 also includes a tube fitting 1704 that also serves as a ferromagnetic pole of the solenoid and that includes an insulated winding in annular zone 1710 in the base portion 1701. The injector 1700 also includes a magnetic circuit path 1708 that forces a driver 1714 against a stop collar 1716. The stop collar 1716 is coupled to an actuator 1718, which is also coupled to a flow valve 1738 carried by the nozzle portion 1705. As the driver 1714 tensions the actuator 1718, the actuator 1718 retains the flow valve 1738 in a closed position. Similar to the other embodiments of injectors disclosed herein, the illustrated injector 1700 is configured for fuel control, metering, and injection functions resulting from one or more applications of suitable pneumatic, hydraulic, piezoelectric, and/or electromechanical processes applied to the actuating components of the injector 1700. As such, the injector 1710 is suited for interchangeable utilization of a wide range of fuel types. Moreover, the injector 1700 is also configured for use with engines having a wide turn-down ratio and that require a relatively flat torque curve.

In operation, administering current through the winding 1710 closes the flow valve 1738. More specifically, administering the current in the winding 1710 forces the driver 1714 toward the pole piece 1704, which tensions the actuator 1718. The flow valve 1738 can be adaptively opened by relaxing the tension in the actuator 1718. When the driver 1714 is not tensioning the actuator 1718, a biasing member 1722 can urge the driver 1714 away from the pole piece 1704. Examples of suitable biasing members 1722 include mechanical springs along with appropriate selections of ring-type permanent or electro-magnet springs. The biasing member 1722 can be located in the middle portion 1703 of the injector 1700 downstream from the driver 1714. When the driver 1714 is biased toward the pole piece 1704, a much lower solenoid force is required to move the driver 1714 than at times that the driver 1714 is at the most distant location from the pole piece 1704.

When the driver 1714 is biased toward the pole piece 1704, a voltage can be applied in coil winding 1710 to produce pulsed current according to a selected "hold" frequency. Each time the current in coil 1710 is pulsed, a counter electromotive force (CEMF) is produced. A charging circuit 1705 (shown schematically) may apply the CEMF to provide charging of a capacitor 1712 that may be located at the position shown. Various circuits for this purpose may be suitable. The circuit 1705 may be located within the injector 1700, on the surface of the injector 1700, or at other suitable locations, and may include one or more integrated circuits that provide appropriate applications of the principles disclosed in U.S. Pat. Nos. 4,122,816 and 7,349,193, each of which is incorporated herein by reference in its entirety. The output may be connected to conductive fibers or conductive coating (not shown for purposes of clarity) on the actuator 1718 and/or by electrical cable 1707.

At the appropriate time that a fuel injection event into oxidant 1740 of the combustion chamber is adaptively optimized by micro-controller 1706, the voltage applied to the coil 1710 is interrupted and the CEMF may be applied to the capacitor 1712, which is switched to deliver a current that is adaptively appropriate for optimizing the fuel ignition requirements. As noted above, these fuel injection requirements may be determined by analysis of combustion chamber data including optical and pressure information developed by transducers at the combustion chamber interface 1736, and/or by sensors 1709 and/or controller 1706 that transmit this data by wireless nodes or optically transmissive or electrically conductive fibers that may be incorporated in the actuator 1718.

In cold fuel, cold engine, acceleration, warm engine cruise, or stop and go applications, adaptively optimized current, including adaptively determined magnitudes of sufficiently high amperage current and voltage, may be delivered through one or more suitable conductors as described above to cause ionization between the conductive zone at the sharp rim of the flow valve 1738 and/or the conductive zone at the sharp rim of tube 1738 at zone 1725. Acoustical signal may be applied as previously disclosed for further impetus upon one or more fuel injection bursts. Accordingly, fuel that enters the zone between such sharp conductor zones is ionized and rapidly accelerated to velocities that typically exceed the speed of sound as ionized fuel components, along with impelled unionized fuel constituents, are blasted into oxidant 1740 to very rapidly complete the combustion processes.

This new technology enables very cold or slow burning fuel selections that may ordinarily have combustion rates that are 7 to 12 times slower than hydrogen to approach or exceed the speed of conventional hydrogen combustion. In the instance that this new technology is applied to hydrogen or hydrogen and hydrocarbon mixtures, even faster completion of combustion occurs. These advantages may be applied to very small engines that are capable of developing unexpectedly high specific power ratings by enabling operational efficiency improvements that are provided by reducing heat losses and back work losses to improve the brake mean effective pressure (P) along with increasing the cycle frequency limits (N). Thus as shown in Equation 9 below, power production (HP) is increased by increases in the brake mean effective pressure (P) and in the cycle frequency (N) for heat engine operation.

$$HP=PLAN \qquad \text{Equation 9}$$

Wherein:
HP is power delivered
L is stroke length
A is area of BMEP application
N is the frequency of cycle completion (such as RPM)

The new high strength dielectric material embodiments disclosed herein also enable new processes with various hydrocarbons that can be stored for long periods to provide heat and power by various combinations and applications of engine-generator-heat exchangers for emergency rescue and disaster relief purposes including refrigerated storage and ice production along with pure and or safe water and sterilized equipment to support medical efforts. Low vapor pressure and or stickey fuel substances may be heated to develop sufficient vapor pressure and reduced viscosity to flow quickly and produce fuel injection bursts with high surface to volume ratios that rapidly complete stratified or layered charge combustion processes. Illustratively, large blocks of parafin, compressed cellulose, stabilized animal or vegetable fats, tar, various polymers including polyethylenes, distillation residuals, off-grade diesel oils and other long hydrocarbon alkanes, aromatics, and cycloalkanes may be stored in areas suitable for disaster response. These illustrative fuel selections that offer long-term storage advantages cannot be utilized by conventional fuel carburetion or injection systems. However the present embodiments provide for such fuels to be heated including provisions for utilization of hot coolant or exhaust streams from a heat engine in heat exchangers 3436, 3426 (FIG. 14) to produce adequate temperatures, for example between approximately 150-425° C. (300-800° F.) to provide for direct injection by injectors disclosed herein for very fast completion of combustion upon injection and plasma projection ignition.

In operation, such preheated heated liquid fuels may be cooled somewhat by heat exchange to the ambient air or by coolant that passes through heat exchanger devices for the purpose of locally reducing the vapor pressure and thus the force required by the embodiments of the injectors disclosed herein to contain such fuels to thus prevent dribbling at undesirable times. Further assurance of containment may be accomplished as needed depending upon the particular fuel being utilized by providing more than one valve, such as the check valves disclosed herein.

However, very small engines and emerging high speed Diesel engine designs provide difficult problems because very little space is available for an integrated injector/igniter to enter the combustion chamber. Optimized process operations may be enabled particularly for engines that have very small access ports that limit the diameter of the injector nozzle portion 1705 extending to the combustion chamber interface. Heat dame or protection portion 1728 can provides high mechanical, fatigue, and dielectric strengths that are required to extend without reinforcement by a metal jacket at the nozzle portion 1705. Electrical conduction by the metal alloy of the engine proximate to the nozzle portion 1705 surrounding the insulator 1730 may be continued through a conductive zone 1734, which may consist of a suitable metallic plating, a metal alloy tip that is brazed on the end of the nozzle portion 1730, or a swaged in place metal form that thus attaches to tubular insulator 1730 as shown. Each of these methods may have applications to meet space requirements of various engines including new engine designs that are in development.

Injector embodiments that utilize the space saving features and high-speed operational capabilities as illustrated in FIG. 29 and with reference to the other embodiments of the disclosure may be held in place by various suitable arrangements including an axial clamp or forked leaf spring (not shown) that securely locks the assembly at the protection portion 1727 so that it is pressed against the lip of the engine port to the combustion chamber. Thus, the protection feature 1727 may serve as a heat dam and further to provide a convenient feature to hold the assembly securely in place. Various suitable seals to the combustion chamber may be utilized, including for example, a compressible or elastomeric annular seal or conically tapered compression seal.

In instances that more than one injector according to the present disclosure are to be utilized for fuel injection and/or ignition in a combustion chamber of a very large engine, and that it is desired to place such injectors at strategic locations that require relatively small entry ports, the fuel flow valve of the injector can be configured as shown in FIG. 30A. More specifically, FIG. 30A is a cross-sectional partial side view an injector illustrating a flow control valve 1850 configured in accordance with another embodiment of the disclosure. In one embodiment, the illustrated flow valve 1850 can be used with the injector 1700 described above with reference to FIG. 29, and/or with other embodiments of injectors described herein. As shown in FIG. 30A, the larger diameter portion of the fuel control valve 1850 may be held closed against a valve seat 1852 by cable assembly or actuator 1818. The actuator 1818 can be attached (e.g., bonded, crimped, etc.) to the valve 1850. A suitable driver (e.g., a piezoelectric or electromagnetic driver, such as driver 1714 illustrated in FIG. 29) can tension and relax the actuator 1818 to move the valve 1850. Moreover, the valve 1850 may be guided or limited to unidirectional travel within the inside diameter of the cage. For example, an electrode material can guide the valve 1850. In other embodiments, the valve 1850 can also move along a guide pin 1856 to provide alignment for the valve 1850.

The fuel control valve 1850 may be made of any suitable material including, for example, optical window materials such as fluoride glass compositions, quartz, sapphire, or polymer compositions including various composites of such materials for monitoring infrared, visible, and ultraviolet radiation, as well as pressure and motion events in the combustion chamber. The fuel control valve 1850 can also be plated or treated with various materials to produce desired confinement of radiation that may be received by lens and guide pin 1850. For example, the valve 1850 may be coated with materials including, for example, suitably protected sapphire, lithium fluoride, calcium fluoride, or ZBLAN fluoride glass including composites of such materials to deliver and or filter certain radiation frequencies of interest.

In operation, the tension on cable or actuator 1818 is reduced or relaxed to a desired value to flow fuel past the valve 1850 and produce full steady flow, one or more bursts of injected fuel, or fuel injections that receive impetus by a suitable acoustic signal. Moving the valve 1850 outwardly by fuel pressure and/or by other forces that may be imposed provide for one or more fuel injections per cycle of the combustion chamber. The illustrated embodiment also includes a valve seat 1852 that may include a permanent magnet and or an electromagnet. The valve 1850 includes a contact portion 1854 that faces the seat 1852. The contact portion 1854 of the valve 1850 may be ferromagnetic or comprised of a permanent magnet that may be repelled by selection of the magnetic pole of a permanent magnet in the valve seat 1852, or the pole produced by operation of an electromagnet in the valve seat 1852 to produce desired variations in the burst frequency and character of the fuel injection bursts.

In certain embodiments, combustion chamber properties and conditions can be detected and communicated by sensors carried by the flow valve 1850 and/or the guide pin 1856. Optical, electrical, and/or magnetic signals from the guide pin 1856 can be transmitted to corresponding communicators or fibers in the actuator 1818 through flexing sub-cables 1855, or through transmissive media such as gaseous, liquid, gel, or elastomeric material that fills the space as needed for communication to suitable transducers and or wireless nodes. This enables fly-eye or other another type of suitable lens 1853 carried by the guide pin 1856 to provide for desired monitoring and characterization of events in the combustion chamber. Information can accordingly be transmitted through optical pin assembly 156, including transmission through window material or communication cables 1855. This information can also be received at the communicators 1855 in the valve 1850 through slots 1858 or an opening 1858 in a first ignition and flow adjusting device or cover 1880 carried by the nozzle portion. FIG. 30B is a front view illustrating the first cover 1880a and it corresponding slots 1858 and opening 1857 that are configured to allow fuel to flow outwardly, as well as to provide exposure to combustion chamber conditions and properties. Suitable transducers, wireless communication nodes, and/or appropriate light or electrical conduction sub-cables in the actuator 1818 can communicate this information to a controller positioned on the injector for adaptive fuel injection and ignition timing operations.

FIG. 30C is a front view of a second ignition and fuel flow adjusting device configured in according with an embodiment of the disclosure. The second cover 1880b includes an opening 1857 to provide access to the guide pine 1856. The second cover 1880b further includes slots 1859. Referring to the covers 1880a and 1880b of FIGS. 30B and 30C, together, these covers can also be used for the ignition event. For example, ignition may be selected from arrangements for hot surface, catalytic stimulation, spark, plasma, or high peak energy capacitance discharge plasma that thrusts ionized air or ionized fuel-air mixture, or ionized fuel from the slots 1858, 1859, as well as from an annular zone 1862 that is between a lip 1860 of the access port of the engine head and a sharp rim 1857 (FIG. 30B) or sharp rim 1864 (FIG. 30C) of the corresponding covers.

Figure 31:
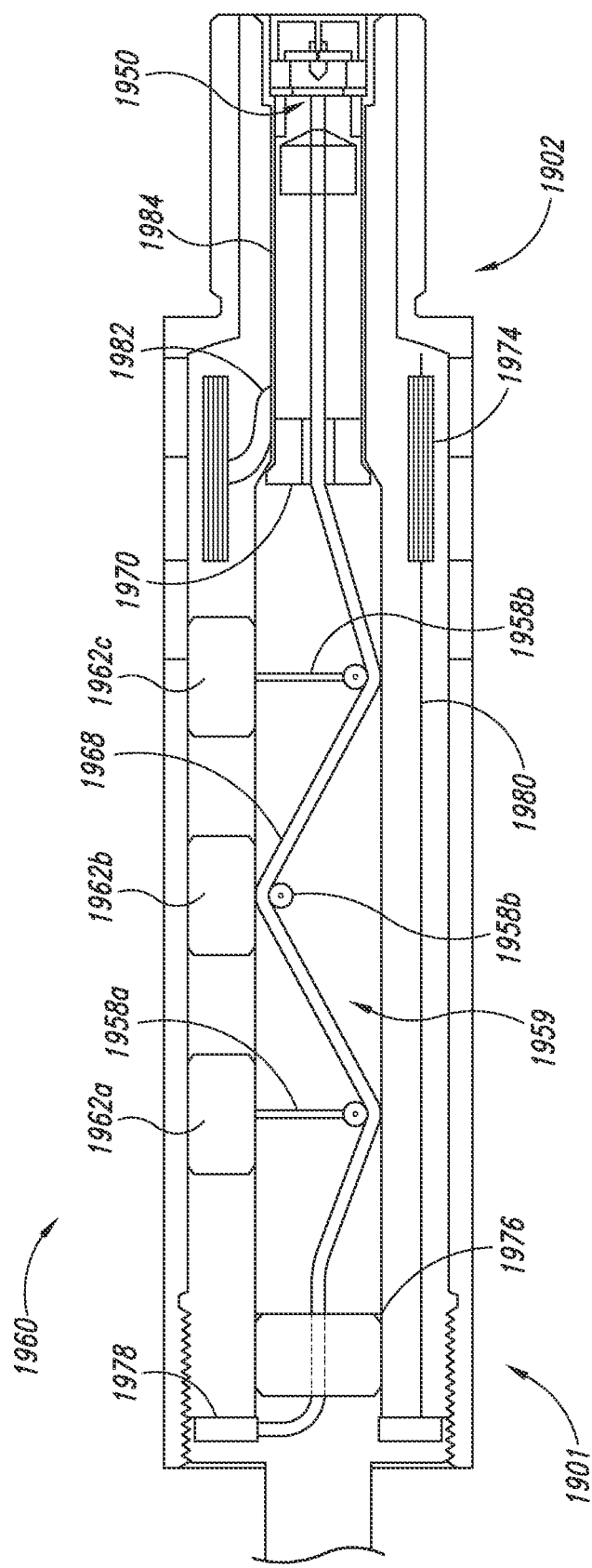
FIGS. 31 and 32 are cross-sectional side views of injectors configured in accordance with further embodiments of the disclosure.

FIG. 31 is a cross-sectional side view of an injector 1960 configured in accordance with another embodiment of the disclosure. The injector 1960 includes several space saving features. For example, the injector 1960 includes a cable or actuator 1968 coupled to a flow valve 1950 carried by the nozzle portion of the injector 1960. The injector 1960 also includes an actuation assembly 1968 that is configured to move the cable 1968 to actuate the flow valve 1950. More specifically, the actuation assembly 1959 includes also actuators 1962 (identified individually as first-third actuators 1962a-1962c) that are configured to displace the cable 1968. Although three actuators 1962 are illustrated in FIG. 31, in other embodiments the injector 1960 can include a single actuator 1962, two actuators 1962, or more than three actuators 1962. The actuators 1962 can be piezoelectric, electromechanical, pneumatic, hydraulic, or other suitable force generating components.

The actuation assembly 1959 also includes connectors 1958 (identified individually as first and second connectors 1958a, 1958b) operatively coupled to the corresponding actuators 1962 and to the cable 1968 to provide push, pull, and/or push and pull displacement of the cable 1968. The cable 1968 can freely slide between the connectors 1958 axially along the injector 1960. According to another feature of the actuation assembly 1959, a first end portion of the cable 1968 can pass through a first guide bearing 1976 at the base portion 1901 of the injector 1960. The first end portion of the cable 1968 is also operatively coupled to a controller 1978 to relay combustion data to the controller 1978 to enable the controller to adaptively control and optimize fuel injection and ignition processes. A second end portion of the cable 1968 extends through a guide bearing 1970 at the nozzle portion 1902 of the injector 1960 to align the cable 1968 with the flow valve 1950.

In operation, the actuators 1962 displace the cable 1968 to tension or relax the cable 268B for performing the desired degree of motion of the flow valve 1950. More specifically, the actuators 1962 cause the connectors to displace the cable 1968 in a direction that is generally perpendicular to the longitudinal axis of the injector 1960.

In instances that it is desired to deliver relatively large current bursts of plasma at the combustion chamber interface by ionizing fuel, air, or fuel-air mixtures, the injector 1960 can also include a capacitor 1974 at the nozzle portion 1902. The capacitor 1974 may be cylindrical to include many conductive layers such as may be provided by a suitable metal selection or of graphene layers that are separated by a suitable insulator such as a selection from Table 1, as well as any formulation such as a selection from Table 2. The capacitor 1974 may be charged with a relatively small current through a first insulated cable 1980, which can be coupled to a suitable power source. Capacitor 1974 may also be subsequently discharged much more rapidly at relatively high current through a larger second cable 1982 extending from the capacitor 1974 to a conductive tube or plating 1984. The plating 1984 can include the desired sharp edges for ignition properties and propagation as described above.

Figure 32:
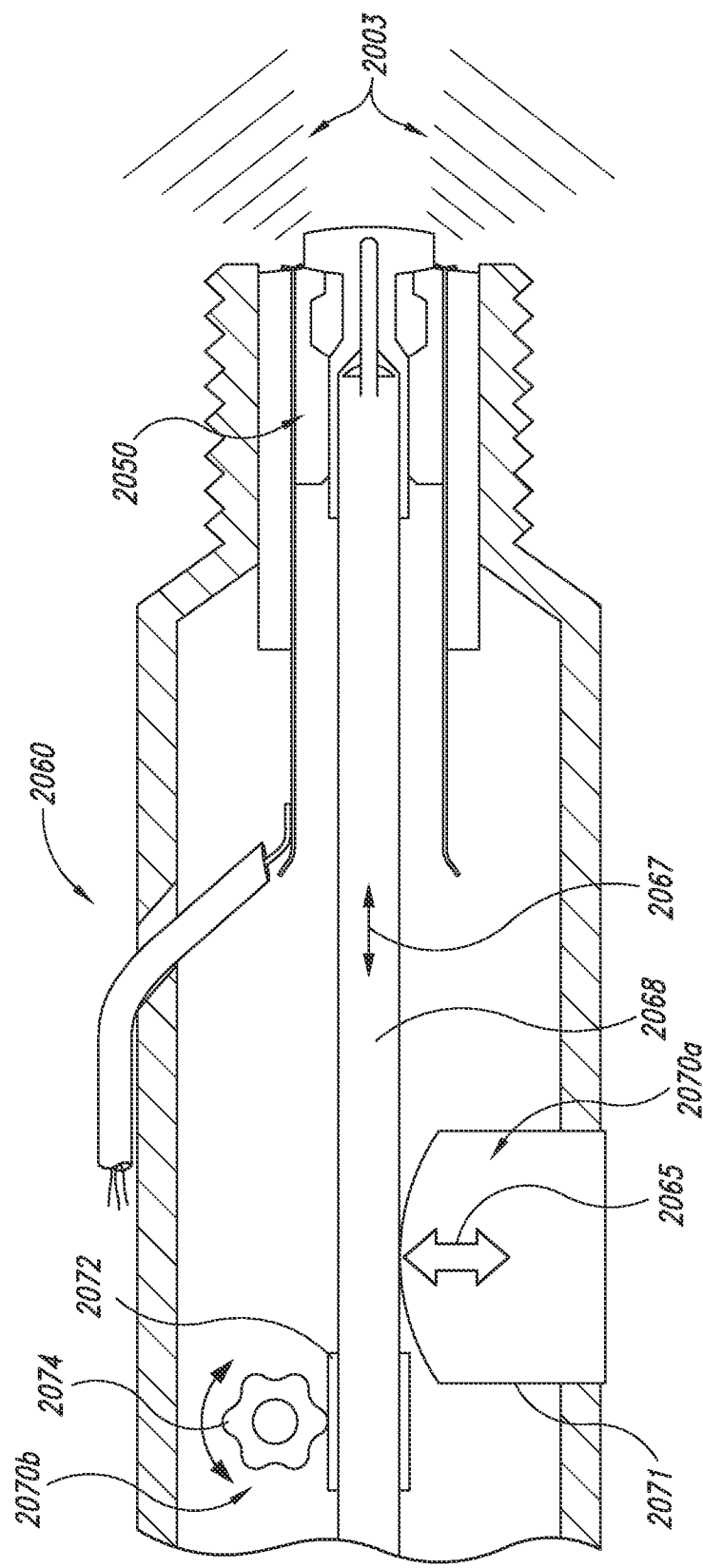

FIG. 32 is a cross-sectional side view of an injector 2060 configured in accordance with yet another embodiment of the disclosure for rapidly and precisely controlling the actuation of a flow valve 2050. The illustrated injector 2060 includes several features that are generally similar in structure and function to the corresponding features of the other injectors disclosed herein. As shown in FIG. 32, the injector 2060 includes an actuator or cable 2068 coupled to the flow valve 2050. The injector 2060 also includes different actuation assemblies 2070 (identified individually a first actuation assembly 2070a and a second actuation assembly 2070b) for moving the cable 2068 axially along the injector 2060 (e.g., in the direction of a first arrow 2067).

The first actuation assembly 2070a (shown schematically) includes a force generating member 2071 that contacts the cable 2068. The force generating member 2071 can be a piezoelectric, electromechanical, pneumatic, hydraulic, or other suitable force generating components. When the force generating member 2071 is energized or otherwise actuated, the force generating member 2071 moves in a direction generally perpendicular to a longitudinal axis of the injector 2060 (e.g., in the direction of a second arrow 2065). Accordingly, the force generating member 2071 displaces at least a portion of the cable 2068 to tension the cable 2068. When the force generating member 2071 is not longer energized or actuated, the cable 2068 is no longer in tension. Accordingly, the first actuation assembly 2070a can provide for very rapid and precise fuel injection bursts 2003 from the flow valve 2050.

The second actuation assembly 2070b (shown schematically) includes a rack and pinion type configuration for moving the cable 2068 axially within the injector 2060. More specifically, the second actuation assembly 2070b includes a rack or sleeve 2072 coupled to the cable 2068. A corresponding pinion or gear 2074 engages the sleeve 2072. In operation, the second actuation assembly 2070b transfers the rotational movement of the gear 2074 into linear motion of the sleeve 2072, and consequently the cable. As such, the second actuation assembly 2070b can also provide for very rapid and precise fuel injection bursts 2003 emitted from the flow valve 2050.

FIG. 33A is a cross-sectional side view and FIG. 33B is a left side view of an outwardly opening flow valve 2150 configured in accordance with another embodiment of the disclosure. FIG. 34A is a cross-sectional side view, FIG. 34B is a left side view, and FIG. 34C is a right side view of a valve seat 2270 configured in accordance with an embodiment of the disclosure. Referring to FIGS. 33A-34C together, the flow valve 2150 is configured for controlling the flow of fuel at the interface of a combustion chamber, and the valve seat 2270 is configured to align the valve 2150 within an injector. In the illustrated embodiment, the valve 2150 includes an elongated first end portion 2153 opposite a flanged second end portion 2152. The first end portion 2153 includes a cavity 2156 that can be coupled to a cable or actuator as described in detail above. The second end portion 2152 includes a first contact surface 2154.

The valve seat 2270 includes a first end portion 2273 opposite a second end portion 2271. The first end portion 2273 includes multiple channels or passages 2276 configured to allow fuel and/or instrumentation to pass through the valve seat 2270. The channels combine into a single passage or bore 2272 in the second end portion 2271 of the valve seat 2270. The second end portion 2271 also includes a second contact surface 2274. The valve seat 2270 is configured to at least partially receive the first end portion 2153. More specifically, the central channel or passage 2276 can receive the first end portion 2153 of the valve 2150. When the valve 2250 is seated in a closed position in the valve seat 2270, the first contact surface 2154 of the valve 2270 contacts or engages the second contact surface 2274 of the valve seat 2270 to prevent fuel flow therebetween. In certain embodiments, surfaces of the valve 2150 and/or the valve seat 2270 can be configured to affect the fuel flowing past these surfaces. For example, these components can include sharp edges that induce sudden gasification of the fuel as described above. Moreover, these components can have surfaces with grooves or patterns that affect the fuel flow, such as helical grooves, for example, to induce a swirling motion of the injected fuel. Although the embodiments illustrated in FIGS. 34A-34C show one configuration of a flow valve and corresponding valve seat 2270, one of ordinary skill in the art will appreciate that other valves and valves seats can include other configurations and features.

FIG. 35A is a cross-sectional side view of an injector 2300 configured in accordance with another embodiment of the disclosure. The injector 2300 includes several features that are generally similar in structure and function to the corresponding features of the injectors described above. For example, the injector 2300 includes a middle portion 2304 extending between a base portion 2302 and a nozzle portion 2306. The nozzle portion 2306 extends through an engine head 2303 to a combustion chamber 2301. The injector 2300 also includes a dielectric insulator 2340.

According to one feature of the illustrated embodiment, the dielectric insulator 2340 includes two or more portions with different dielectric strengths. For example, the insulator 2340 can include a first dielectric portion 2342 positioned generally at the middle portion 2304 of the injector 2300, and a second dielectric portion 2344 at the nozzle portion 2306 of the injector 2300. In certain embodiments, the second dielectric portion 2344 can be configured to have a higher dielectric strength than the first dielectric portion 2342 for the purpose of withstanding the harsh combustion conditions of the nozzle portion 2306 proximate to the combustion chamber 2301 (e.g., pressure, thermal and mechanical shock, fouling, etc.) and prevent degradation of the insulator 2340. In some embodiments, these dielectric portions can be made of different materials. In other embodiments, however, the second dielectric portion 2344 can be made from the same material as the first dielectric portion 2342, however, the second dielectric portion 2344 can be sealed or otherwise treated to increase the dielectric strength of the second dielectric portion 2344 (for example, with compressive loading in the exterior surfaces as explained above). The first and second dielectric portions 2342, 2344 can be made from any of the dielectric materials and/or processes described above, including for example, the materials listed in Table 1.

According to another aspect of the illustrated embodiment, the second dielectric portion 2344 does not extend along the nozzle portion 2306 all the way to the interface with the combustion chamber 2301. Accordingly, the nozzle portion 2306 includes an air gap 2370 between the engine block 2303 and a conductive portion 2338 of the injector 2300 that delivers voltage to the nozzle portion 2306 for ignition. This gap 2370 in the nozzle portion 2306 provides a space for capacitive discharge for plasma production from the nozzle portion 2306. Such discharge can also clear or at least partially prevent contaminant (e.g., oil) from depositing on the second dielectric portion 2344, thereby avoiding tracking or other types of degradation of the insulator 2340.

According to yet another feature of the illustrated embodiment, the injector 2300 can further include a second check valve 2330 and check valve seat 2332 at the base portion 2302 of the injector 2300. In certain embodiments, the check valve 2330 and the check valve seat 2332 can include magnetic portions (e.g., permanent magnets) that are attracted to each other. In operation, a force applied to the check valve 2330 (e.g., an electromagnetic or other suitable force that overcomes the attractive force of the check valve seat 2332) moves the check valve 2330 away from the check valve seat 2332 to allow fuel to flow through the injector 2300. Because the check valve 2330 remains in the closed position unless a force is applied to the check valve 2330, in the event of a power loss the check valve 2330 can prevent fuel from flowing or leaking into the injector 2330.

FIG. 35B is a front view illustrating an embodiment of a flow valve 2350 at the nozzle portion 2306 of the injector 2300 illustrated in FIG. 35A. As shown in FIG. 35B, the valve 2350 can include multiple slots 2358 and/or an opening 2357 to allow and/or affect the flow of fuel thereby. These slots 2358 and the opening 2357 can also allow the injector 2300 to sense combustion chamber properties and conditions through the valve 2350. Moreover, the valve 2350 can be made from an at least partially transparent material, such as quartz or sapphire, to enable the monitoring of the combustion chamber properties and conditions.

FIG. 36A is a cross-sectional partial side view of a nozzle portion 2402 of an injector 2400 configured in accordance with yet another embodiment of the disclosure. In the illustrated embodiment, the injector 2400 includes a connector 2442 that couples a cable or actuator 2440 to a first flow valve 2450. The first valve 2450 is an inwardly opening flow valve that rests against a valve seat 2452 when the first valve is in a closed position. The nozzle portion 2402 also includes a second check valve 2460 that rests against the valve seat 2452 when the second valve 2460 is in a closed position. As such, the nozzle portion includes an intermediate volume 2456 between the closed first and second valves 2450, 2460. The nozzle portion 2402 also includes an ignition and flow adjusting device or cover 2470. In certain embodiments, the nozzle portion 2402 can also include one or more biasing components that are configured to control the valving for the injection of the fuel. These biasing components can include, for example, springs, such as mechanical springs, and/or magnets including permanent magnets. More specifically, the first valve can include a first magnetic portion 2451 and the second valve 2460 can include a second magnetic portion 2463, each of which are attracted or biased toward a corresponding third magnetic portion 2454 of the valve seat 2452. Moreover, the cover 2470 can also include a fourth magnetic portion 2472, however, the fourth magnetic portion 2472 opposes or is otherwise biased away from the valve seat 2460. For example, the valve seat 2460 can include a fifth magnetic portion 2462 that is biased away from the fourth magnetic portion 2472 of the cover 2470. Accordingly, these biasing portions can help retain the valves in their closed positions. These biasing portions can further enhance the valve actuation by at least partially providing a restoring force to more quickly return these valves to their closed positions. The components of the illustrated nozzle portion (e.g., the actuator 2440, first valve 2450, valve seat 2452, second valve 2460, and/or cover 2470) can include various sensors and/or instrumentation for monitoring and communicating the combustion chamber conditions and/or properties.

In operation, moving the actuator 2440 in the direction indicated by arrow 2439 moves the first valve 2450 off the valve seat 2452 to open the first valve 2450. Opening the first valve 2450 allows fuel to flow along a first fuel path 2444a to enter the intermediate volume 2456. As the fuel enters the intermediate volume 2456, the pressure of the fuel opens the second check valve 2460 so that the fuel can exit the intermediate volume 2456 along a second fuel path 2444b. Subsequently, the fuel can flow beyond the cover 2470 to be injected into a combustion chamber. When the actuator 2440 returns to its original position, the first valve 2450 closes against the valve seat 2452 to stop the fuel flow. As the pressure in the intermediate volume 2456 drops, the second valve 2460 closes against the valve seat 2452 thereby preventing dribble of any fuel from the nozzle portion 2402. Accordingly, the rapid actuation of the actuator 2440 enables precise fuel bursts from the nozzle portion 2402.

FIG. 36B is a front view of the injector of FIG. 36A illustrating the ignition and flow adjusting device or cover 2470 configured in accordance with an embodiment of the disclosure. The illustrated cover 2470 includes slots 2474 for fuel flow and combustion chamber monitoring as described in detail above. Moreover, the cover 2474 can include multiple circumferentially spaced ignition portions 2476 to facilitate ignition with an engine head.

Figure 37:
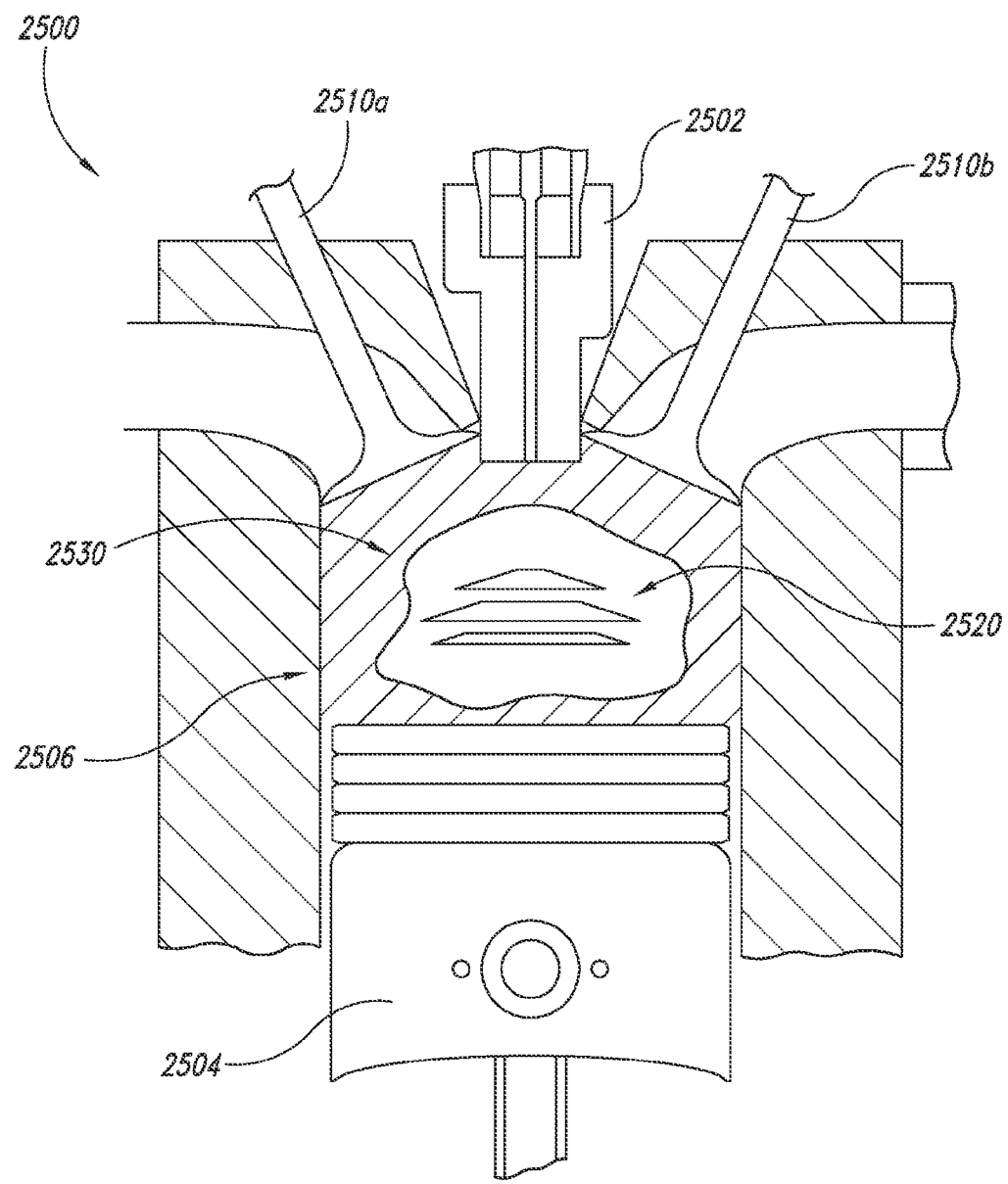
FIG. 37 is a schematic cross-sectional side view of a system configured in accordance with another embodiment of the disclosure.

FIG. 37 is a schematic cross-sectional side view of a system 2500 configured in accordance with another embodiment of the disclosure. In the illustrated embodiment, the system 2500 includes an integrated fuel injector/igniter 2502 (e.g., an injector according to any of the embodiments of the present disclosure), a combustion chamber 2506, one or more unthrottled air flow valves 2510 (identified individually as a first valve 2510a and a second valve 2510b), and an energy transferring device or piston 2504. As described in detail above, the injector 2502 is configured to inject a layered or stratified charge of fuel 2520 into the combustion chamber 2506. According to one aspect of the illustrated embodiment, the system 2500 is configured to inject and ignite the fuel 2520 in an abundant or excess amount of an oxidant 2530, such as air for example. More specifically, the system 2500 is configured such that the valves 2510 maintain an ambient pressure or even a positive pressure in the combustion chamber 2506 prior to the combustion event. For example, the system 2500 can operate without throttling or otherwise impeding air flow into the combustion chamber such that a vacuum is not created in the combustion chamber 2506 prior to igniting the fuel 2520. Due to the ambient or positive pressure in the combustion chamber 2506, the excess oxidant forms an insulative barrier 2530 adjacent to the surfaces of the combustion chamber (e.g., the cylinder walls, piston, engine head, etc.).

In operation, the injector 2502 injects the layered or stratified fuel 2520 into the combustion chamber 2506 in the presence of the excess oxidant. In certain embodiments, the injection can occur when the piston 2504 is at or past the top dead center position. In other embodiments, however, the injector 2502 can inject the fuel 2520 before the piston 2504 reaches top dead center. Because the injector 2502 is configured to adaptively inject the layered charge 2520 as described above (e.g., by injecting rapid multiple layered bursts between ignition events, with sudden gasification of the fuel, plasma projected fuel, supercooling, etc.), the fuel 2520 is configured to rapidly ignite and completely combust in the presence of the insulative barrier 2530 of the oxidant. As such, the insulative barrier 2530 shields the walls of the combustion chamber 2506 from the heat that is given off from the fuel 2520 when the fuel 2520 ignites thereby avoiding heat loss to the walls of the combustion chamber 2506. As a result, the heat released by the rapid combustion of the fuel 2520 is converted into work to drive the piston 2504, rather than being transferred as a loss to the combustion chamber surfaces. Moreover, in embodiments where the injector 2502 injects and/or ignites the fuel after the piston 2504 passes top dead center, all of the energy released by the rapid combustion of the fuel 2520 is converted into work to drive the piston 2504 without any losses due to back work since the piston is already at or beyond top dead center. In other embodiments, however, the injector 2520 can inject the fuel before the piston 2504 is at top dead center.

Figure 38A:
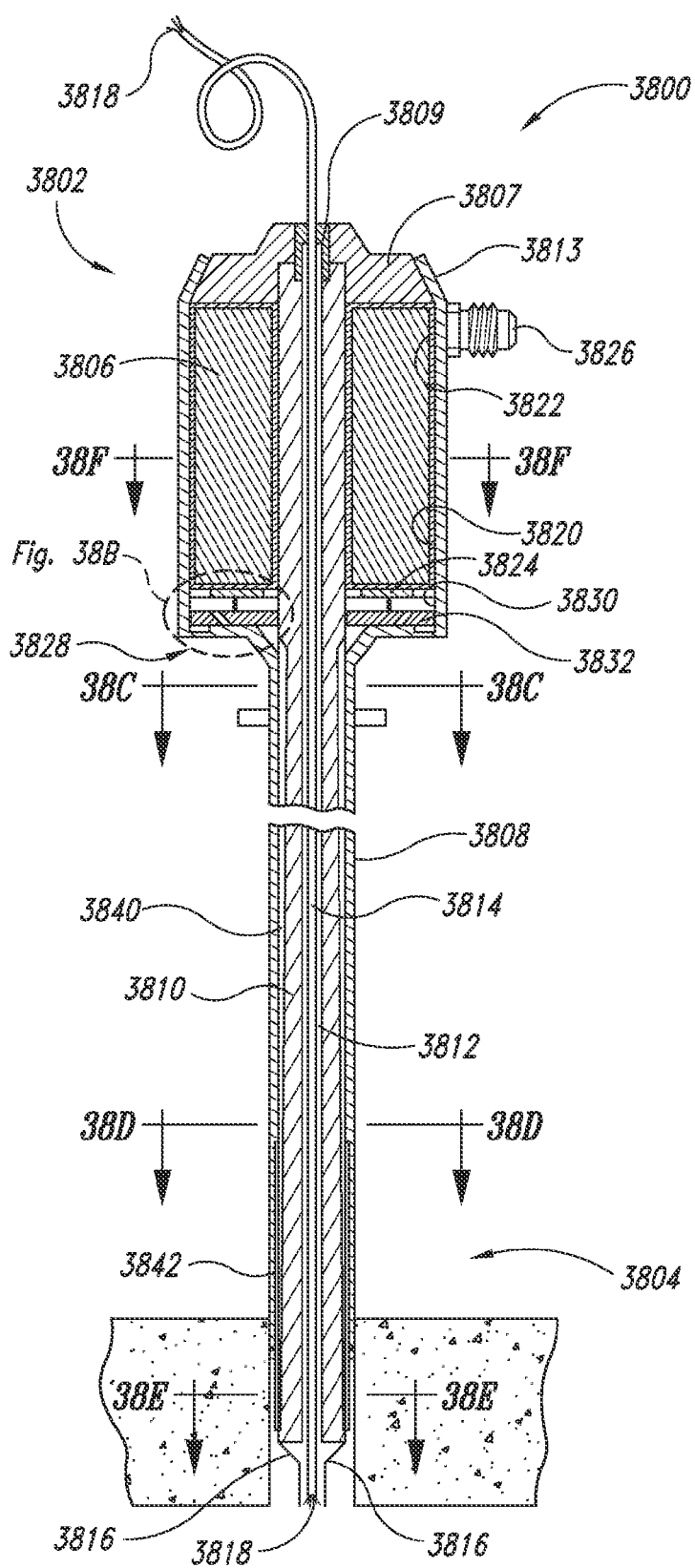
FIG. 38A is a cross-sectional side view of an injector configured in accordance with yet another embodiment of the disclosure.

FIG. 38A is a cross-sectional side view of an injector 3800 configured in accordance with yet another embodiment of the disclosure. The injector 3800 includes several features that are generally similar in structure and function to the corresponding features of the injectors described above with reference to FIGS. 1-37. For example, the injector 3800 includes a first or base portion 3802 opposite a second or nozzle portion 3804. The injector 3800 also includes a sleeve or body 3808 extending between the base portion 3802 and the nozzle portion 3804. The body 3808 surrounds a dielectric portion or dielectric body insulator 3810 extending longitudinally through the injector 3800. Further details regarding the materials and/or formation of the body insulator 3810 are described in detail below. The body insulator 3810 includes a conductor opening 3812 extending longitudinally and centrally therethrough. The conductor opening 3812 is configured to allow an electrode or electrical conductor 3814 to extend through the injector 3800 from the nozzle portion 3804 to the base portion 3802. For example, the conductor 3814 can be coupled to an energy source, such as a voltage source, to provide ignition energy to one or more electrodes or ignition features 3816 at a nozzle tip of the nozzle portion 3804. The conductor 3814 can also include one or more optical monitoring fibers or features 3818 extending longitudinally therethrough. The optical monitoring features 3818 are configured to detect or otherwise sense combustion chamber properties and transmit data relating to these properties to a controller or processor.

The base portion 3802 also includes a dielectric base portion insulator 3807 that is configured to contain high voltage that is supplied to the base portion 3802 via the conductor 3814. For example, the base portion insulator 3807 can dielectrically insulate a receiver 3809 in the base portion 3802 that receives the conductor 3814. The base portion insulator 3807 can further be sealed against a ferromagnetic force generator housing or casing 3820 by swaging, brazing, soldering, or applying adhesives such as epoxy, or by any other suitable sealing method or compound. In instances that production line brazing or soldering of the base portion insulator 3807 to the force generator casing 3820 is desired at a contact zone 3813, the contact zone of 3813 may be metallized by masked or otherwise localized hydrogen reduction of copper oxide and/or silver oxide. Alternatively the contact zone 3813 zone may be plated by other suitable technologies including, for example, sputtering or vapor deposition.

According to further features of the illustrated embodiment, the base portion 3802 includes a force generator 3806 (e.g., a suitable pneumatic, hydraulic, electromagnetic solenoid, piezoelectric component, etc.) positioned within the force generator casing 3820. The casing 3820 includes a fuel inlet 3822 connected to a fuel coupling 3826 to receive fuel into the casing 3820 from a fuel source. The casing 3820 also includes a fuel outlet 3824 to allow the fuel to exit the casing 3820 via a valve assembly 3828, which is shown in detail in FIG. 38B.

More specifically, FIG. 38B is an enlarged detail view of the valve assembly 3828 of the injector 3800. Referring to FIGS. 38A and 38B together, the force generator fuel outlet 3824 allows fuel to pass from the force generator casing 3820 into a valve cavity 3830. The valve cavity 3830 encompasses a flow valve 3832, such as a ferromagnetic valve, that is movable in response to an induced force from the force generator 3806. The valve 3832 also includes one or more valve fuel passages 3834 extending through the valve 3832. The valve fuel passage 3834 is configured to allow fuel to flow through the valve 3832 to exit the valve cavity 3830 via a fuel exit passageway 3836. In the illustrated embodiment, the valve fuel passage 3834 extends through the valve 3832 at an inclined angle relative to the longitudinal axis of the injector 3800 that is at least approximately equal to an inclined angle of the fuel exit passageway with reference to a longitudinal axis of the injector 3800. In other embodiments, however the valve fuel passage 3834 and the fuel exit passageway 3836 can extend at other angles relative to the longitudinal axis. The fuel exit passageway 3836 is further coupled to one or more insulator fuel flow channels 3840 extending longitudinally along the insulator 3810 between the body 3808 and the insulator 3810. Further features of the insulator fuel channels 3840 are described in detail below.

According to another feature of the illustrated embodiment, the valve assembly 3828 also includes an attractive element 3838 (e.g., a magnet, permanent magnet, etc.) that attracts or otherwise biases the valve 3832 to a first or closed position. The valve assembly 3832 can also optionally include a biasing member 3839 (e.g., a spring, coiled compression spring, etc., shown schematically in FIG. 38B) that urges the valve 3832 towards the closed position.

During operation of the valve assembly 3828, the force generator 3806 generates a force to rapidly and repeatedly move the valve 3832 between the closed position and a second or open position. In the illustrated embodiment, for example, the valve 3832 is shown in the closed position such that the valve 3832 prevents fuel from exiting the fuel cavity 3830 via the fuel exit passageway 3836. As the valve 3832 opens by moving towards the base portion 3802, fuel in the fuel cavity 3830 can go around the valve 3832 or pass through the valve 3832 via the valve fuel passage 3834. After passing through the valve fuel passage 3834, the fuel can exit the fuel cavity 3830 via the fuel exit passageway 3836 to be transmitted to the nozzle portion 3804 via the insulator fuel channels 3840.

In applications where a solenoid force generator 3806 assembly is used for actuating the valve 3832 at the base portion 3802 (e.g., rather than a piezoelectric, pneumatic, hydraulic, or mechanical linkage) a solenoid force generator 3806 can induce extremely fast operation of the ferromagnetic valve 3832 by application of 24 to 240 VDC to the insulated windings. This serves the purpose of developing exceptionally high current and valve actuation force for short times in about 3% to 21% duty cycles depending upon the mode of operation, to thereby enable cooling of the components of the force generator 3806 as a result of heat transfer to fuel that flows through the force generator 3806.

Referring again to FIG. 38A, the insulator fuel channels 3840 extend longitudinally through the injector 3800 along an outer surface of the insulator 3810. Accordingly, the insulator fuel channels facilitate flow of the fuel through the injector 3800 between the insulator 3810 and the body 3808. The injector 3800 also includes a deformable or elastomeric sleeve valve 3842 at the nozzle portion 3804. More specifically, the sleeve valve 3842 is coaxially disposed on the insulator 3810 to be positioned between the insulator 3810 and the body 3808. At the nozzle portion 3804, the body 3808 is configured to extend until a seal 3844 (e.g., an o-ring or similar seal) in a combustion chamber port. The sleeve valve 3842, however, extends beyond the seal 3844 towards the combustion chamber. As described in detail below, the elastomeric sleeve valve 3842 acts as a deformable elongated valve that allows fuel to exit the nozzle portion 3804 in response to a sufficient hydraulic or pressure gradient in the injector 3800. For example, the insulator fuel channels 3840 taper or otherwise become smaller along the insulator 3810 as the insulator fuel channels 3840 approach the nozzle portion 3804. The insulator fuel channels 3840 accordingly deliver the fuel to the nozzle portion 3804, however the sleeve valve 3842 seals against the insulator 3810 to prevent fuel injection until valve assembly 3828 creates a sufficient pressure gradient upstream from the sleeve valve 3842 to at least partially deform the sleeve valve 3842 and create an annular opening around the insulator 3810 to inject the fuel. As such, the injector 3800, as well as several other injectors described herein, provides the advantage of having more than one fuel flow control. In the illustrated embodiment, for example, the valve assembly 3828 provides a first or primary fuel flow control that is responsive to an actuated force, and the sleeve valve 3842 provides a secondary flow control that is responsive to fuel pressure (e.g., hydraulically) within the injector 3800.

In certain embodiments, the sleeve valve 3842 can be made from a suitable high strength polymer, such as polyamide-imide (Torlon) or a thermosetting composite with Kapton, glass fiber, and/or graphite reinforcement. In other embodiments, the sleeve valve 3842 can be metallic and made from an aluminum, titanium, steel alloy, or other suitable metallic material. Moreover, the port seal 3844 can be made an elastomeric materials, such as a FKM, Viton, and/or a fluorosilicone elastomer to seal the body 3808 at the nozzle portion 3804 against the gases produced in the combustion chamber and/or against engine lubricant.

FIGS. 38C-38E are a series of cross-sectional side views of the injector 3800 at various locations along the insulator 3810. More specifically, FIG. 38C is a cross-sectional side view of the injector 3800 taken substantially along lines 38C-38C of FIG. 38A. As shown in FIG. 38C, at this location along the insulator 3810 proximate to the base portion 3802, the insulator fuel channels 3840 are relatively large with reference to the insulator 3810. For example, the insulator fuel channels 3840 form generally concave or bowed depressions in an outer surface of the insulator 3810 adjacent to an inner surface of the body 3808. In other embodiments, however, the insulator fuel channels 3840 can have other cross-sectional profiles or shapes including, for example, curved, rectilinear, and/or other shapes. Although the illustrated embodiment includes six insulator fuel channels 3840, in other embodiments the insulator 3810 can include more or less than six insulator fuel channels 3840. According to another feature of the illustrated embodiment, the conductor 3814 extends through the conductor opening 3812 in the insulator 3810. Moreover, the optical monitoring fibers or features 3818 extend longitudinally through the conductor 3814.

Referring next to FIG. 38D, FIG. 38D is a cross-sectional side view taken substantially along lines 38D-38D of FIG. 38A. At this generally middle position along the insulator 3810 the insulator fuel channels 3840 have reduced or tapered to form relatively smaller depressions or channels in the insulator 3810 and adjacent to the inner surface of the body 3808. For example, compared with the size of the individual insulator fuel channels 3840 illustrated in FIG. 38C, in FIG. 38D the individual insulator channels 3840 are smaller and spaced apart from one another.

Referring next to FIG. 38E, FIG. 38E is a cross-sectional side view taken substantially along lines 3E-3E of FIG. 38A at the nozzle portion 3804 of the injector 3800. At this location along the insulator 3810, the insulator fuel channels no longer exist or are significantly reduced or tapered compared to the other locations along the insulator 3810 closer to the base portion 3802. Moreover, at this location along the insulator 3810 the elastomeric sleeve 3842 is coaxially disposed and sealed around the insulator (e.g., between the insulator 3810 and the body 3808). Accordingly, and referring again to FIG. 38A, the insulator channels 3840 taper or reduce as they extend along the insulator 3810 towards the nozzle portion 3804. At the nozzle portion 3804 proximate to the combustion chamber, the elastomeric sleeve valve 3842 is normally closed and seals around the insulator 3810.

During operation, fuel is delivered to the insulator fuel channels 3840 from the valve assembly 3828 in the base portion 3802. Pressurization of the fuel in insulator fuel channels 3840 expands or deforms the sleeve valve 3842 at the nozzle portion 3804 thereby creating an annular opening around the insulator 3810 to inject the fuel injected into the combustion chamber. After the fuel injection event, the pressure in the insulator channels 3840 drops to allow the sleeve valve 3842 to return to the normally closed or sealed position against the cylindrical portion of the insulator According to certain embodiments of the disclosure, the dielectric body insulator provides dielectric containment of more than 80,000 volts at direct current to megahertz frequencies in sections that are less than 1.8 mm (0.071") thick between the electrical conductor 3814 the outer surface of insulator 3810. In instances that high frequency voltage is applied to establish ion currents or ion oscillation between electrodes the ignition features 3816 and the engine head bore, a conductive layer of copper or silver may be applied on an outer surface of the electrode 3814. The conductive layer may also be increased by additional plating to provide greater high frequency conductivity. In alternative embodiments, however, a Litz wire braid may be placed over the monitoring features 3818 (e.g., optical fibers) in the core of the conductor 3814 to reduce resistive losses.

The body insulator 3810 and/or the base portion insulator 3807 can be made from a glass material with the following approximate composition by weight percentage in Formula 1. These dielectric insulative materials can be ball milled, melted in a suitable crucible such as a platinum, silica, magnesia, or alumina material selection, and extruded, compression molded, or cast into masses and shapes that are suitable for reheating and forming into parts of near net shapes and dimensions. FORMULA 1 can include, for example: $SiO_2$ 24-48%; MgO 12-28%; $Al_2O_3$ 9-20%; $Cr_2O_3$ 0.5-6.5%; F 1-9%; BaO 0-14%; CuO 0-5%; SrO 0-11%; $Ag_2O$ 0-3.5%; NiO 0-1.5%; and $B_2O_3$ 0-9%. In another embodiment, an alternative suitable composition by weight percentage in Formula 2 can be used when the material is melted at a temperature between at least approximately 1350° C. and 1550° C. in a covered platinum, alumina, magnesia, or silica crucible. FORMULA 2 can include, for example: $SiO_2$ 31%; MgO 22%; $Al_2O_3$ 17%; $Cr_2O_3$ 2.2%; F 4.5%; BaO 13%; CuO 0.4%; SrO 9.5%; $Ag_2O$ 0.3%; and NiO 0.1%.

Tubular profiles of these insulative materials can be extruded from the melted material or cooled material that has been hot formed at temperatures between about 1050° C. and 1200° C. Masses that are cast to provide the volume necessary for hot extrusion into tubing or other profiles, or for forging into parts of near net shape and dimensions can be slow cooled. Such masses are heated to a suitable temperature for hot forming such as between about 1050° C. and 1250° C. and formed by extrusion to the desired profile shapes and dimensions, and may be produced through a suitable die such as a refractory material such as platinum, molybdenum or graphite. The extruded profile can be dusted with one or more suitable crystallization nucleates such as BN, $B_2O_3$, $AlF_3$, B, $AlB_2$, $AlB_{12}$ or AlN to produce a greater number of small crystals in the resulting surface zones than in the central zones to thus reduce the volumetric packing efficiency to provide compressive stresses in the surface zones and tensile stresses in the central zones. Moreover, further development of such compressive stresses may be produced if desired by elongation of the crystals in the outer layers by deformation and drag induced by the die as the extruded article is forced to form a smaller cross section. In other embodiments, more complex shapes and forms may be compression molded or formed in a super alloy or graphite mold assembly that has been dusted with suitable crystallization nucleates, such as $B_2O_3$ or BN, for example, to produce similar compressive stresses in near surface zones.

Conventional applications have desired combinations of chemical formulas and heat treatments to produce machinable insulative materials. The present disclosure, however, accomplishes the opposite. For example, embodiments of the present disclosure ultimately produces articles that may not be able to be machined because the surface zones are too hard to be machined and are characterized by compressive stresses that are balanced by tensile stresses in central section zones between or adjacent to zones with compressive stresses. Such embodiments can accordingly overcome the inherent convention material problems of producing material that is designed to intentionally crack near zones where cutting tools apply stress to enable progressive chip formation to provide machinability. Although such characteristic crack formation allows machinability, it also inherently allows adverse admissions of substances into the insulative materials, such as organic compounds including engine lubricants, surfactants, hand fat, sweat, etc. into such cracks. Such organic material may eventually tend to dehydrogenate or in other ways become carbon donors which then subsequently become electrically conductive pathways along which various electrolytes that are introduced into such cracks may compromise the dielectric strength of the machinable ceramic article, thereby ultimately causes voltage containment failure.

According to yet another embodiment of the disclosure, another suitable composition by weight percentage in Formula 3 can be used to form the body insulator 3810 and/or the base portion insulator 3807. For example, Formula 3 can have the following approximate weight percentages: $SiO_2$ 30%; MgO 22%; $Al_2O_3$ 18%; $Cr_2O_3$ 3.2%; F 4.3%; BaO 12%; SrO 3.6%; CuO 4.9%; $Ag_2O$ 1.3%; and NiO 0.1%. In certain embodiment, after an insulator tube is extruded it is cooled to about 650° C. by passage of hydrogen through a bore which reduces the copper oxide and/or silver oxide to produce a metallic surface of copper and/or an alloy of silver and copper. After development of a suitable thickness of a conductive metal, the outer surface of the tube can be heated by a suitable source such as radiation from an induction heated tube or by an oxidizing flame, such as a surplus oxygen-hydrogen flame, and a suitable crystallization and/or fineness agent can be administered to the surface to produce compressive stresses that are balanced by tensile forces in the zone within the interior of insulator tube.

In embodiments including a force generator 3806 with a solenoid winding, a suitable insulation of the copper magnet wire for such applications can include a polyimide varnish and aluminum plating on the copper wire. The aluminum plating can be oxidized or partially oxidized to produce alumina. Such aluminum plating and oxidation may also be utilized in combination with polyimide or polyamide-imide, and/or parylene insulation films. The ferromagnetic components of the base portion 3802 can accordingly direct the magnetic flux produced by winding in the force generator 3806 through the ferromagnetic valve 3832 to enable very fast action of the valve 3832.

FIG. 38F is a cross-sectional side view of an embodiment of the force generator 3806 taken substantially along lines 38F-38F in FIG. 38A and configured in accordance with another embodiment of the disclosure. In the embodiment illustrated in FIG. 38F, the force generator 3806 includes multiple individual force generators or valve operators 3850 (shown schematically and individually identified as first through fourth valve operators 3850a-3850d). Each valve operator 3850 is configured to selectively actuate a corresponding valve in the valve assembly 3828, such as the valve 3832. Accordingly, in an embodiment including the force generator 3806 of FIG. 38F with four valve operators 3850, the valve assembly would include four corresponding flow valves. In the illustrated embodiment, the force generator 3806 also includes a fuel flow zone or area 3852 surrounding each of the valve operators 3850. The fuel flow area 3852 is configured to allow the fuel to flow past each of the valve operators 3850 and thereby at least partially cool the valve operators 3850. Such a configuration provides the benefit of a relatively large cooling surface to volume ratio of the force generator 3806.

In certain embodiments, the valve operators 3850 can be configured to open simultaneously or at different or separate times. For example, a single valve operator 3850 can be used to allow fuel flow for a first engine operation condition, such as an idle or lower power operation, two valve operators 3850 can be used simultaneously for a second engine operation condition, such as a cruising or moderate power operation, and three, four, or more valve operators 3850 can be used simultaneously for a third engine operation, such as an acceleration or full power operation.

The various features of the injector 3800 and corresponding components described above with reference to FIGS. 38A-38F provide several benefits over conventional fuel injectors. For example, the combustion chamber of a modern diesel engine is generally designed with very small diameter ports for a "pencil" type direct fuel injector that must fit within the complex and tightly crowded inlet and exhaust valve operating mechanisms. A typical diesel fuel injector's port diameter for entry into the combustion chamber is limited to about 8.4 mm (0.331"). In addition to such severe space limitations, the hot lubricating oil is constantly splashed in the engine head environment within the valve cover to heat the fuel injector assembly to more than 115° C. (240° F.) for most of the million-mile life requirement, which accordingly prohibits application of conventional air-cooled solenoid valve designs.

It is desirable to overcome requirements to limit diesel engine operation to compression ignition and the use of diesel fuel of a narrow cetane rating and viscosity along with strict requirements for elimination of particles and water. The potential exists for more plentiful fuel selections with far less replacement cost. As such, one purpose of the embodiments of the present disclosure is to utilize less expensive fuels with wide variations in cetane and/or octane ratings, along with impurities such as water, nitrogen, carbon dioxide, carbon monoxide, and various particulates. For example, conventional ethanol plants that now produce pure ethanol, which must be separated from non-fuel compounds such as water and carbon dioxide that are co-produced by fermentation, could more than double the production of useful fuel such as a blend of ethanol, water, and methanol or butanol.

The injector 3800 and other injectors described herein are capable of overcoming the aforementioned difficulties by providing and enabling at least: 1) up to 3000 times greater fuel flow capacity than a diesel fuel injector to enable utilization of low cost fuels such as landfill gas, anaerobic digester methane, and various mixtures of hydrogen and other fuel species along with substantial amounts of non-fuel substances such as water vapor, carbon dioxide, and nitrogen; 2) plasma ignition of such fuel as it is projected into the combustion chamber; and 3) replacement of diesel fuel injectors in the time of a tune-up.

Figure 39:
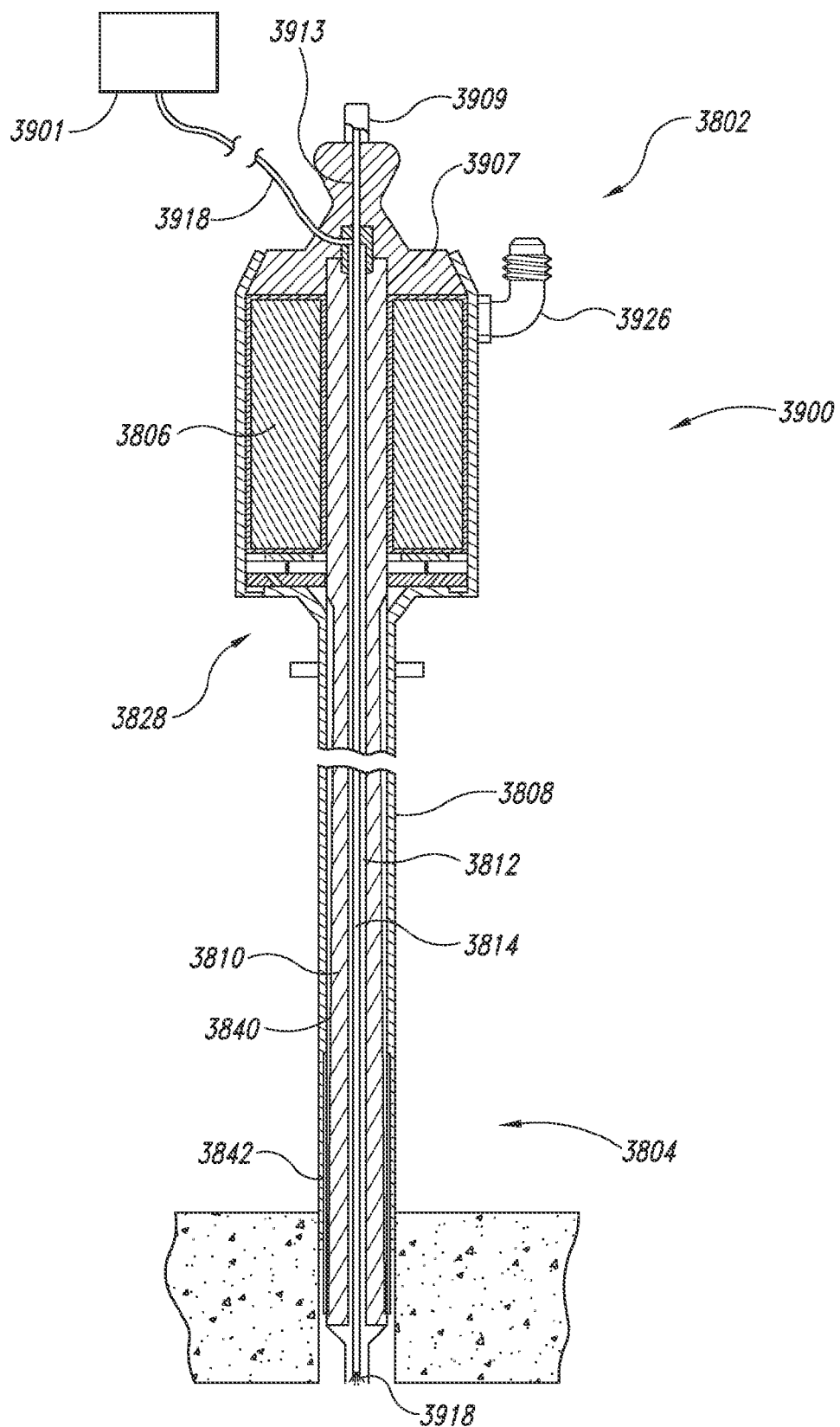
FIG. 39 is a cross-sectional view of an injector configured in accordance with another embodiment of the disclosure.

FIG. 39 is a cross-sectional view of an injector 3900 configured in accordance with another embodiment of the disclosure. The injector 3900 includes several features that are generally similar in structure and function to the corresponding features of the injector 3800 described above with reference to FIGS. 38A-38F, as well as the other injectors described herein. For example, injector illustrated in FIG. 39 includes the base portion 3802 opposite the nozzle portion 3804. The base portion 3802 includes the force generator 3806 and the corresponding valve assembly 3828, and the nozzle portion includes the elastomeric sleeve valve 3842 coaxially disposed over a portion of the dielectric body insulator 3810. Moreover, the conductor opening 3812 in the body insulator 3810 allows the electrode or electrical conductor 3814 to extend through the injector 3900 from the nozzle portion 3804 to the base portion 3802.

The conductor 3814 also includes one or more optical monitoring fibers or features 3918 extending longitudinally therethrough. The optical fibers 3918 are configured to monitor or otherwise detect combustion chamber properties at the nozzle portion. In the illustrated embodiment, however, the optical monitoring features 3918 exit from the base portion 3802 to relay or otherwise transmit the combustion chamber data to a controller or processor 3901. In certain embodiments, the processor 3901 can be carried by the injector 3900. In other embodiments, however, the processor 3901 can be located remotely from the injector 3900. Moreover, the optical fibers 3818 can be configured to transmit the combustion chamber data to the processor via a wire or wireless connection.

According to yet another feature of the illustrated embodiment, the base portion 3802 also includes a dielectric base portion insulator 3907 that is configured to contain high voltage that is supplied to the base portion 3802 via the conductor 3814. More specifically, the conductor 3814 includes an extension portion 3913 in the base portion 3802 that is separate from the optical fibers 3818. As also shown in the illustrated embodiment, the base portion 3802 includes an inlet fuel coupling 3926 that extends at a 90 degree angle with reference to a longitudinal axis of the injector 3900.

Figures 40A, 40B:
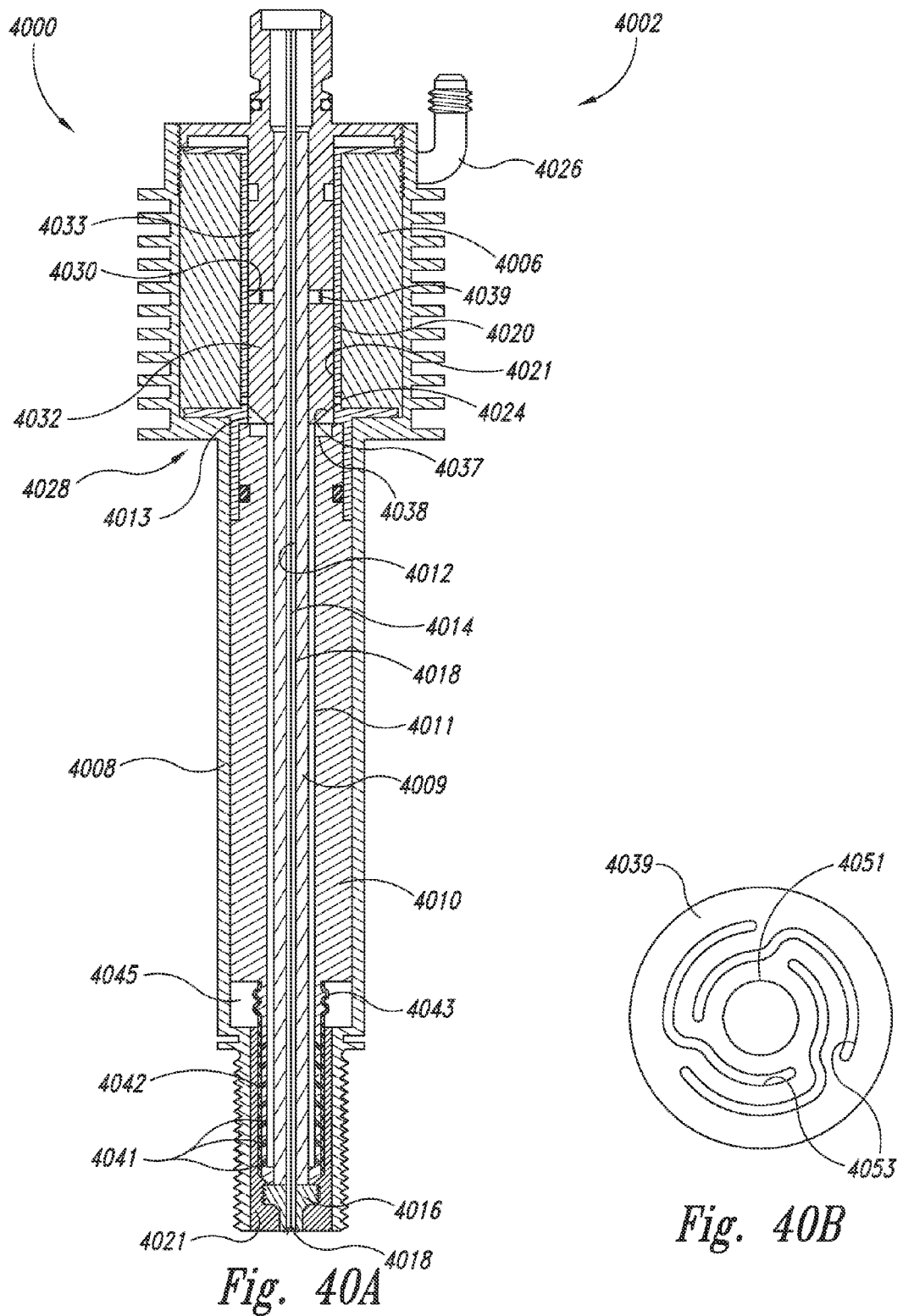
FIG. 40A is a cross-sectional side view of an injector configured in accordance with yet another embodiment of the disclosure.
FIG. 40B is a top plan view of a biasing member of the injector of FIG. 40A.

FIG. 40A is a cross-sectional side view of an injector 4000 configured in accordance with another embodiment of the disclosure. The injector 4000 includes several features that are generally similar in structure and function to the corresponding features of the injectors described above with reference to FIGS. 1-39. For example, the injector 4000 includes a first or base portion 4002 opposite a second or nozzle portion 4004. The injector 4000 also includes a sleeve or body 4008 extending between the base portion 4002 and the nozzle portion 4004. The body 4008 surrounds a first dielectric portion or dielectric body insulator 4009 extending longitudinally through the injector 4000 and coaxially disposed within a second dielectric portion or dielectric body insulator 4010. The second body insulator 4010 is spaced radially outwardly from the first body insulator 4009 by a gap forming a fuel flow channel 4011 extending longitudinally along the injector 4000 from the base portion 4002 to the nozzle portion 4004.

The first body insulator 4009 includes a conductor opening 4012 extending longitudinally and centrally therethrough. The conductor opening 4012 is configured to allow an electrode or electrical conductor 4014 to extend through the injector 4000 from the nozzle portion 4004 to the base portion 4002. For example, the conductor 4014 can be coupled to an energy source, such as a voltage source, to provide ignition energy to one or more electrodes or ignition features 4016 at the nozzle portion 4004. The conductor 4014 can also include one or more optical monitoring fibers or features 4018 extending longitudinally therethrough. The optical monitoring features 4018 are configured to detect or otherwise sense combustion chamber properties and transmit data relating to these properties to a controller or processor.

According to further features of the illustrated embodiment, the base portion 4002 includes a force generator 4006 (e.g., a suitable pneumatic, hydraulic, electromagnetic solenoid, piezoelectric component, etc.) positioned within a force generator casing 4020. The casing 4020 includes a fuel inlet 4022 connected to a fuel coupling 4026 to receive fuel into the casing 4020 from a fuel source. The casing 4020 also includes a fuel outlet 4024 configured to allow fuel to exit the casing 4020 via a valve assembly 4028. More specifically, the valve assembly 4028 includes a valve 4032 (e.g., a ferromagnetic valve) that is positioned in a valve cavity 4021. The valve cavity 4021 is fluidly coupled to the interior of the force generator casing 4020 via the fuel outlet 4024. The valve 4032 seals or closes the fuel outlet 4024 when the valve 4032 is in a normally closed position, as shown in FIG. 40A.

The valve assembly 4028 also includes a stationary ferromagnetic pole piece or pole element 4033 positioned in the valve cavity 4021. When the valve 4032 is in the closed position, the valve 4032 is spaced apart from the pole piece 4033 by a cavity 4030. A biasing member 4830, such as a non-ferromagnetic spring, disk spring, etc. can also optionally be positioned between the pole piece 4033 and the valve 4032 in the cavity 4030 to urge the valve 4032 away from the pole piece 4033 towards the closed position. The valve assembly 4028 further includes an attractive element 4038 (e.g., a magnet, permanent magnet, etc.) that attracts or otherwise biases the valve 4032 towards the closed position. More specifically, in the illustrated embodiment the valve 4032 has a generally cylindrical body with a generally tapered, conical, or frustoconical end portion 4037 adjacent to the attractive element 4038. As such, the conical end portion 4037 has a smaller cross-sectional dimension with reference to the cylindrical portion of the valve 4032.

In operation, current provided to the force generator 4006 magnetizes the pole piece 4033 to move the valve 4032 towards the pole piece 4033 to an open position (e.g., in a direction away from the nozzle portion 4004). When the valve 4032 moves in the valve cavity 4021 from the closed position to the open position adjacent to the pole piece 4033, the conical end portion 4037 of the valve 4032 is positioned adjacent to the force generator fuel outlet 4024 such that the valve 4032 no longer seals or occludes the fuel outlet 4024. As such, fuel can flow from the force generator 4006 into a fuel slot or orifice 4013 in the valve cavity 4021 for delivery into the fuel flow channel 4011 between the first body insulator 4009 and the second body insulator 4010. As such, as the valve 4032 moves towards the open position, the valve 4032 allows fuel to flow from the fuel outlet 4024 to the fuel flow channel via the fuel slot 4013 in the valve cavity 4021. Upon return of the valve 4032 to the normally closed position (e.g., in a direction towards the nozzle portion 4004), the valve 4032 slidably seals the fuel outlet 4024 to stop the fuel flow.

Accordingly, the valve 4032 at the base portion 4002 moves longitudinally through the injector 4000. According to further features of the illustrated embodiment, however, the injector 4000 can also include a second valve 4042 at the nozzle portion 4004. More specifically, the second valve 4042 is a deformable or elastomeric sleeve valve 4042 that is coaxially disposed over the first and second body insulators 4009, 4010 at the nozzle portion. A base portion of the sleeve valve 4042 can be adhered to the second body insulator 4010 with a suitable adhesive, thermopolymer, thermosetting compound, or other suitable adhesive. Moreover, in the illustrated embodiment, the sleeve valve 4042 includes an end portion 4043 configured to retain the sleeve valve 4042 against the second insulator body 4010 with a second elastomer retaining feature 4041. As such, the retaining feature 4041 can compressively anchor the valve sleeve against the second insulator body 4010.

In addition, the valve sleeve 4042 extends over a plurality of exit or injection ports 4041 in the nozzle portion. More specifically, the second insulator body 4010 includes multiple injection ports 4041 that are fluidly coupled to the fuel flow channel 4011 between the first body insulator 4009 and the second body insulator 4010. Accordingly, as the first valve 4032 opens and introduces pressurized fuel into the fuel flow channel 4011 extending longitudinally to the nozzle portion 4004, the sleeve valve 4042 expands over the injection ports 4041 to allow the fuel to exit the nozzle portion 4004.

FIG. 40B is a top plan view of the biasing member 4039 of FIG. 40A configured in accordance with one embodiment of the disclosure. In the illustrated embodiment, the biasing member 4039 can have a biased central portion 4051 separated from a peripheral portion of the biasing member by one or more channels 4053 extending through the biasing member 4039. In certain embodiments, the biasing member 4039 can be made from 0.1 mm (0.004") thick non-magnetic stainless steel sheet stock. Moreover, the biasing member 4039 can be stamped or photo-etched to achieve the illustrated geometrical form. The biasing member 4039 can further be heat treated to produce the desired spring functions in the central portion 4051 that elevates the central portion 4051. The non-magnetic nature of the biasing member 4039 enables the valve 4032 of FIG. 40A to quickly return to the normally closed position by providing about 0.1 mm (0.004") gap to prevent hard magnetic domains that may form from persisting with attractive forces to extend the open time of the valve 4032. In other embodiments, however, the biasing member can be another type of biasing member including, for example, a cone spring, spring washer, coiled compression spring, etc. Moreover, in still further embodiments, the biasing member 4039 can be omitted from the valve assembly 4028 of FIG. 40A.

Figure 41:
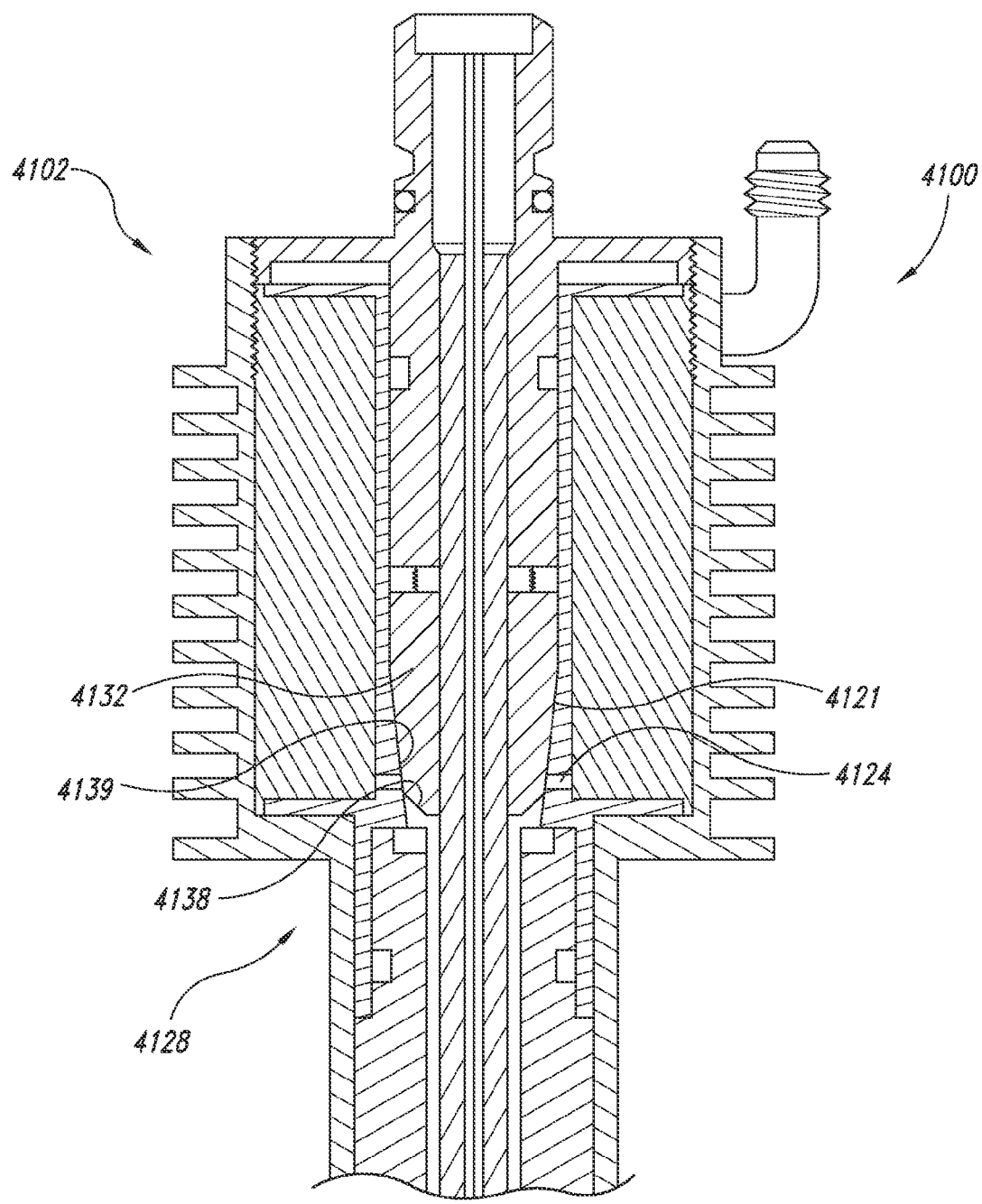
FIG. 41 is a cross-sectional side partial view of an injector configured in accordance with another embodiment of the disclosure.

FIG. 41 is a cross-sectional side partial view of an injector 4100 configured in accordance with another embodiment of the disclosure. In the illustrated embodiment, the injector 4100 includes a base portion 4102 having a valve assembly 4128 that is generally similar in structure and function to the valve assembly 4028 described above with reference to FIG. 40A. For example, the valve assembly 4128 of FIG. 41 includes a valve 4132 positioned in a valve cavity 4121. The valve cavity 4121 is fluidly coupled to a force generator fuel outlet 4124. In the illustrated embodiment, however, the portion of the valve cavity 4121 surrounding the fuel outlet 4124 has a tapered shape generally corresponding to the conical or frustoconical end portion of the valve 4132. More specifically, the end portion of the valve 4132 includes a first tapered, conical, or frustoconical surface 4138 extending from a second tapered, conical, or frustoconical surface 4139. The surface of the valve cavity 4121 that contacts the valve 4132 has the same or generally similar tapered, conical, or frustoconical shape as the second tapered surface 4139 of the valve 4132. One advantage of this embodiment is the tapered or conical configuration allows for relaxed tolerances between the valve 4132 and the surface of the valve cavity 4121 that contacts the valve 4132.

Figure 42:
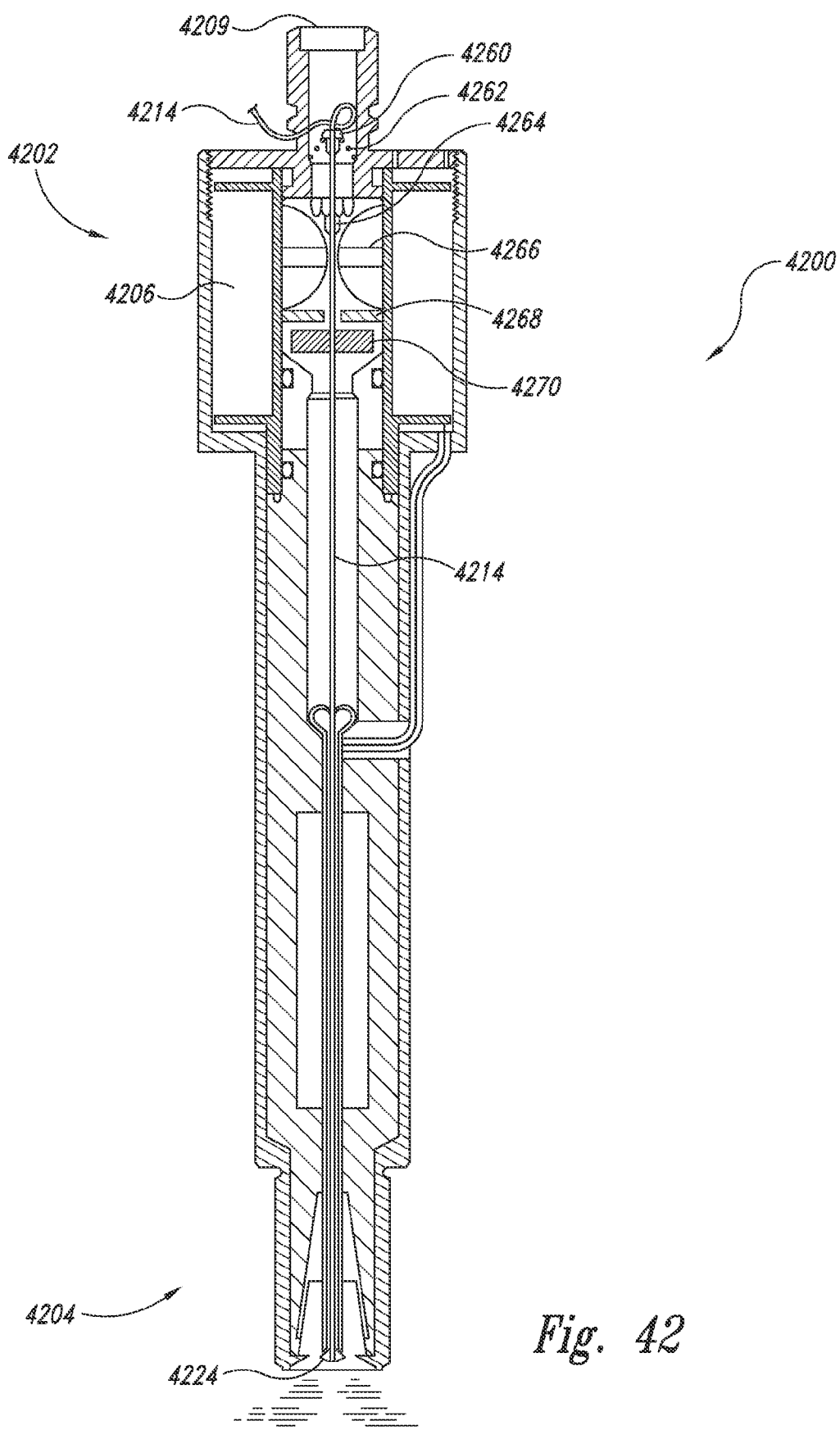
FIG. 42 is a cross-sectional side view of an injector configured in accordance with yet another embodiment of the disclosure.

FIG. 42 is a cross-sectional side view of an injector 4200 configured in accordance with yet another embodiment of the disclosure. The injector 4200 includes several features that are generally similar in structure and function to the injectors described herein, and in particular with the injector 1600 described above with reference to FIG. 28. In the embodiment illustrated in FIG. 42, for example, the injector 4200 includes a base portion 4202 opposite a nozzle portion 4204. An actuator rod or cable 4214 extends from the base portion 4202 to the nozzle portion 4204 within a longitudinal fuel passageway 4211. The cable 4214 is coupled to an outwardly opening flow valve 4224 positioned at the nozzle portion 4204. The cable 4214 can include one or more monitoring elements, such as fiber optic cables, to transmit combustion chamber data to a controller or processor. A fuel inlet 4209 in the base portion is fluidly coupled to the fuel passageway 4211.

The base portion 4202 also includes a force generator 4206 (e.g., a suitable pneumatic, hydraulic, electromagnetic solenoid, piezoelectric component, etc.) that provides an actuating force for a cable lock or brake 4266. The cable brake 4266 provides a constrictive or radially constrictive force against the cable 4214 to retain the cable 4214 in tension and keep the valve 4244 in a closed position. The base portion 4202 further includes an attractive element 4270, such as a magnet or permanent magnet, coupled to the cable 4214 downstream from the cable brake 4266. The attractive element 4270 is attracted towards a stationary ferromagnetic disk 4268 that is coupled to the base portion 4202 and positioned between the attractive element 4270 and the cable brake 4266. Accordingly, the attractive element 4270 also tensions the cable 4214 to at least partially retain the valve 4224 in the closed position.

According to further aspects of the illustrated embodiment, the base portion 4202 also includes a first stop member 4264 coupled to the cable 4214 that is configured to contact the cable brake 4266 to provide a limit on the amount of axial travel of the cable 4214. The base portion 4202 also includes a second stop member 4260 coupled to the cable 4214 upstream from the first stop member 4264. The first stop member 4260 contacts a biasing member 4262 (e.g., a spring, coiled compression spring, etc.) to further tension the cable 4214 to at least partially retain the valve 4224 in the closed position.

In operation, fuel is introduced into the fuel passageway 4211 via the fuel inlet 4209. The cable brake 4266 locks the cable 4214 to prevent the valve 4224 from opening by providing a constrictive force against the cable 4214. When fuel injection is desired, the force generator 4206 actuates the cable brake 4266 to a relaxed position. When the cable brake 4266 is in the relaxed position, the pressure from the fuel in the fuel passageway 4211 opens the valve 4244. More specifically, the pressure gradient in the fuel passageway 4211 must overcome then tensioning forces in the cable 4214 provided by the second stop member 4260 and biasing member 4262, as well as the attractive element 4270 and the ferromagnetic disk 4268. Moreover, the overall travel of the cable 4214 is limited by the first stop 4264 as the first stop 4264 contacts the cable brake 4266.

The embodiment of the injector 4200 illustrated in FIG. 42 accordingly provides for variable pressure control and increased control of the injection events. For example, the cable brake 4266 can provide a variable restrictive force against the cable 4214 to adjust the pressure required to open the valve 4224. Moreover, the second stop member 4260 and corresponding biasing member 4262, alone or in combination with the attractive element 4270 and the corresponding ferromagnetic disk 4268, can further selectively control the pressure required to open the valve. Similar to the other embodiments described herein, the fuel injector 4200 can also be adaptively controlled in response to one or more monitored combustion chamber properties.

According to further embodiments of the disclosure, and as discussed in detail above, injectors configured in accordance with embodiments of the disclosure can have one or more ignition features or electrodes that are carried by a nozzle portion of the corresponding injector. Such injectors can further have a cover at the nozzle portion to direct or control the fuel dispersal patter. In certain embodiments, for example, such nozzle portions and corresponding flow valves, electrodes, and end caps can have at least the following configurations: outwardly opening fuel control valve with stationary electrodes outside of the valve; outwardly opening fuel flow control valve with the stationary electrode inside of the valve; inwardly opening fuel flow control valve with the stationary electrode outside of the valve; inwardly opening fuel flow control valve with the stationary electrode inside of the valve;

electrodes that move outwardly with the outwardly moving valve; electrodes that move inwardly with the inwardly moving valve, etc.

Moreover, in certain embodiments, injectors with these nozzle portions (e.g., valve, electrode, and/or cap combinations) can project plasma axially away from the corresponding nozzle portion. For example, an end cap or electrode, such as the end cap described above with reference to FIG. 24*a*, can at least partially induce plasma generation extending radially or axially away from the nozzle portion. More specifically, end caps that have structural components that are in the way of the axial movement of the fuel can accordingly induce the plasma axially away from the nozzle portion. Inducing plasma in these directions, and in particular axially from the nozzle portion, can cancel out or otherwise account for the swirling motion of the injected fuel. Moreover, such plasma generation also provides for better shaping and control of the injector fuel patterns.

Further Embodiments

A fuel injection system including a fuel injector for injecting fuel, wherein the fuel is injected by means for valving the fuel, and a fuel igniter, wherein the fuel igniter is integral to the fuel injector, wherein the means for valving the fuel is occasionally opened by means for opening selected from the group comprising an insulated rod means, an insulated cable means, and an insulated fiber optic means for the opening and wherein force required by the means for opening is provided by a force generating means and wherein and the means for valving the fuel and the means for injecting the fuel and the means for igniting the fuel are integrated at the interface to a means for combusting the fuel.

The system described herein wherein the means for opening also provides detection or communication of detected information from the combusting to the controlling means.

The system as described herein wherein the means for controlling is integral to the fuel injector means.

The system as described herein wherein the force generating means is electromechanical.

The system as described herein wherein the force generating means provides an impact force upon the selection from the group comprising a cable, a rod, or a fiber optic means.

The system as described herein wherein the means for igniting the fuel is selected from the group comprising a spark, multiple sparks, and a plasma means.

The system as described herein wherein the means for controlling is cooled by the fuel.

The system as described herein wherein the fuel cools at least the force generating means or the means for valving.

The system as described herein wherein the fuel is injected to at least one of a heat engine or a fuel cell.

The system as described herein wherein the fuel is stored by a means for storage of fuel, and wherein the means for storage of fuel is selected from the group for the storage of fuel comprised of cryogenic liquids, cryogenic solids and liquids, cryogenic solids, liquids, vapors and gases; non-cryogenic liquids, non-cryogenic solids and liquids, and non-cryogenic solids, liquids, vapors, and gases.

The system as described herein wherein the fuel is selected from the group consisting of cryogenic liquid fuel, cryogenic solid fuel and cryogenic gaseous fuel.

The system as described herein wherein the fuel is selected from the group consisting of solid fuel, liquid fuel, fuel vapor, and gaseous fuel.

The system as described herein wherein the fuel is a mixture of cryogenic and non-cryogenic fuels.

The system as described herein wherein the fuel is delivered and combusted according to one of a stratified charge combustion mode, a homogenous charge combustion mode and a stratified charge combustion mode within a homogenous charge.

The system described herein wherein the means for valving is protected by material means selected from the group comprising sapphire, quartz, glass, and a high-temperature polymer.

The system described herein wherein the fuel is passed through a means for exchanging heat before being supplied to the injector.

The system described herein in which the means for igniting includes means selected from the group comprised of capacitance discharge, piezoelectric voltage generation, and inductive voltage generation.

A process for energy conversion comprising the steps of storing one or more fuel substances in a containment vessel means, transferring the fuel and or derivatives of the fuel to a device that substantially separates valve operator means from a flow control valve means located at the interface of a combustion chamber means of an engine means to control the fuel or derivatives of the fuel by an electrically insulating cable or rod means to eliminate fuel dribble at problematic times into the combustion chamber means of the engine means.

The process as described herein in which the control valve means is occasionally electrically charged to provide plasma discharge means.

The process as described herein in which the electrically insulating cable or rod means also provides detection and or communication of detected information from the combustion chamber means to a control means for the process.

The process as described herein in which the fuel derivatives are produced by means selected from the group comprised of a heat exchanger, a reversible fuel cell, and a catalytic heat exchanger.

The process as described herein in which the fuel or the fuel derivatives include hydrogen that is utilized as a heat transfer means and or to reduce losses in the operation of relative motion component means of the process for energy conversion.

The process as described herein in which the relative motion component means is an electricity generator.

The process as described herein in which the relative motion component means is a heat engine.

The process as described herein in which the vessel means insulates cryogenic substances.

The process as described herein in which the vessel means contains pressurized inventories of the fuel and or derivatives of the fuel.

A system for integrating fuel injection and ignition means in which occasionally intermittent flow to provide the fuel injection is controlled by a valve means that is electrically separated by insulation means h m and actuation means for the valve means and in which the actuation means applies force to the valve means by an electrically insulating means.

The system as described herein in which the actuation means applies force to the valve means by an electrically insulating means that consists of an electrically insulating cable or rod means.

The system as described herein in which the cable or rod means also provides detection and or communication of detected information from a combustion chamber means to a control means for operation of the system.

The system as described herein in which the control valve means is occasionally electrically charged to provide plasma discharge means to ignite occasionally injected fuel allowed to pass by the control valve means.

A system for providing fluid flow valve functions in which a moveable valve element means is displaced by a plunger means that is forced by means selected from the group consisting of a solenoid mechanism means, a cam mechanism means, and a combination of solenoid and cam mechanism means in which the valve element means is occasionally held in position for allowing fluid flow by means selected from a solenoid mechanism means, a piezoelectric mechanism means and a combination of solenoid and piezoelectric mechanism means.

The system as described herein in which at least a portion of the fluid flow is delivered to an engine means to accelerate air entry and increase the volumetric efficiency of the engine means.

The system as described herein in which at least a portion of the fluid flow is delivered to the combustion chamber of an engine means by a system for integrating fuel injection and ignition means in which intermittent flow to provide the fuel injection is controlled by a valve means that is electrically separated by insulation means h m an actuation means for the valve means and in which the actuation means applies force to the valve means by an electrically insulating means.

The system as described herein in which such operation provides adaptively maximized brake mean effective pressure upon cyclic combustion of various fuel selections regardless of the fuel octane, cetane, viscosity, energy content density, or temperature.

The system as described herein in which the fuel and or compounds that contain hydrogen are converted to hydrogen and or mixtures of hydrogen and other fluid constituents by a heat exchanger that supports endothermic reactions by transfer of heat from the engine to the fuel and or compounds that contain hydrogen.

The system as described herein in which the hydrogen is utilized for purposes selected from the group comprised of cooling rotating machinery, reducing windage losses of rotating machinery, as a medium to absorb and remove moisture, and as a fuel for two or more hybridized energy conversion applications.

The system as described herein in which the fluid contains hydrogen, which is utilized for purposes selected from the group comprised of cooling rotating machinery, reducing windage losses of rotating machinery, as a medium to absorb and remove moisture, and as a fuel for two or more hybridized energy conversion applications.

A fuel injection system including a microprocessor and a fuel injector for injecting fuel, wherein the fuel is injected by the opening of a valve element; a means for igniting the fuel, wherein the means for igniting the fuel is integral to the injector; wherein the valve element is opened with one of a cable or rod connected to an actuator; wherein the cable or rod are electrically insulated and further comprise a fiber optic element for communicating combustion data to the microprocessor.

The system as described herein, wherein the means for igniting the fuel is located near the valve element.

The system as described herein, wherein the actuator is an electromechanical actuator.

The system as described herein, wherein the actuator provides an impact force upon the cable or rod.

The system as described herein, wherein the means for igniting the fuel is selected from one of a spark, multiple sparks or a plasma discharge.

The system as described herein, wherein the microprocessor is located in a body of the fuel injector.

The system as described herein, wherein the microprocessor is located next to a conduit for supplying fuel to the injector, and the fuel passing through the conduit cools the microprocessor.

The system as described herein, wherein the fuel is used to cool at least one of the valve element or the actuator.

The system as described herein, wherein the fuel is injected to at least one of a heat engine or a fuel cell.

The system as described herein, wherein the fuel is stored in a fuel tank suitable for storing cryogenic fuels.

The system as described herein, wherein the fuel is selected from the group consisting of cryogenic liquid fuel, cryogenic solid fuel and cryogenic gaseous fuel.

The system as described herein, wherein the fuel is selected from the group consisting of solid fuel, liquid fuel and gaseous fuel.

The system as described herein, wherein the fuel is a mixture of cryogenic and non-cryogenic fuels.

The system as described herein, wherein the fuel is delivered and combusted according to one of a stratified charge combustion mode, a homogenous charge combustion mode and a stratified charge combustion mode within a homogenous charge.

The system as described herein wherein the valve element is made from one of the group of sapphire, quartz, glass and a high-temperature polymer.

The system as described herein, wherein the fuel is passed through a heat exchanger before being supplied to the injector.

An energy conversion system with means for cyclic achievement of oxidant admission, fuel injection, ignition, combustion, and work production wherein the oxidant is admitted in an amount that is in excess of the amount required to completely combust fuel delivered by the fuel injection and wherein the fuel injection is by means capable of multiple deliveries of fuel in each cycle of operation and wherein the ignition and combustion are monitored to determine information selected from the group comprised of the temperature, pressure, rate of combustion, and location of combustion, and wherein the information is utilized by a controller means to initiate the fuel injection and to halt the fuel injection after one or more fuel deliveries for the purpose of preventing a condition selected from the group consisting of temperature that fails to achieve a selected set point, temperature in excess of a selected set point, pressure in excess of a selected set point, combustion rate that fails to achieve a selected set point, combustion rate in excess of a selected set point, combustion in locations beyond a zone defined by selected set points.

The energy conversion system as described herein in which the fuel injection is provided by a valve means positioned substantially adjacent to or at the interface of a combustion chamber for achieving the energy conversion.

The energy conversion system as described herein in which the ignition is provided at or substantially proximate to the interface of a combustion chamber for achieving the energy conversion.

The energy conversion system as described herein in which after any event to halt the fuel injection, one or more fuel injections are resumed until the desired magnitude of work is accomplished by the energy conversion system.

An energy conversion system as described herein in which an oxidant in excess of the amount required to completely combust fuel delivered by the fuel injection is maintained as an envelop to insulate each of the combustion events.

It will be apparent that various changes and modifications can be made without departing from the scope of the disclosure. For example, the dielectric strength may be altered or varied to include alternative materials and processing means. The actuator and driver may be varied depending on fuel or the use of the injector. The cap may be used to insure the shape and integrity of the fuel distribution and the cap may vary in size, design or position to provide different performance and protection. Alternatively, the injector may be varied, for example, the electrode, the optics, the actuator, the nozzle or the body may be made from alternative materials or may include alternative configurations than those shown and described and still be within the spirit of the disclosure.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the disclosure can be modified, if necessary, to employ fuel injectors and ignition devices with various configurations, and concepts of the various patents, applications, and publications to provide yet further embodiments of the disclosure.

These and other changes can be made to the disclosure in light of the above-detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

I claim:

1. A fuel injector configured to inject fuel into a combustion chamber, the fuel injector comprising:
    a body having a base portion opposite a nozzle portion, wherein the body comprises a spiral shaped base layer of dielectric material with conductors extending longitudinally through the body through layers of the base layer;
    a fuel passageway extending through the body from the base portion to the nozzle portion;
    a force generator at the base portion;
    a first valve carried by the base portion, wherein the first valve is movable in response to actuation from the force generator to move from a closed position and an open position to introduce fuel into the fuel passageway; and
    a second valve at the nozzle portion, wherein the second valve is deformable in response to pressure in the fuel passageway to deform from a closed position and an open position to inject fuel into the combustion chamber.

2. The fuel injector of claim 1 wherein first valve is made from a ferromagnetic material and the second valve is made from an elastomeric polymer.

3. The fuel injector of claim 1 wherein the first valve comprises a valve fuel passage extending therethrough, and wherein fuel flows through the valve via the valve fuel passage as the valve moves from the closed position to the open position.

4. The fuel injector of claim 1 wherein the valve comprises an end portion having a generally conical or frustoconical shape facing the nozzle portion.

5. The fuel injector of claim 1, further comprising a casing at least partially housing the force generator, wherein the casing includes a fuel inlet to introduce fuel into the casing and a fuel outlet to allow fuel to exit the casing.

6. The fuel injector of claim 5 wherein in the closed position the first valve blocks the fuel outlet and in the open position the first valve opens the fuel outlet and allows fuel to flow from the fuel outlet into the fuel passageway.

7. The fuel injector of claim 1, further comprising a dielectric insulator extending through a portion of the body coaxially with the fuel passageway.

8. The fuel injector of claim 7 wherein the fuel passageway comprises a fuel flow channel formed in the insulator and extending longitudinally along the insulator.

9. The fuel injector of claim 8 wherein the fuel flow channel reduces in size as the fuel flow channel approaches the nozzle portion.

10. The fuel injector of claim 7 wherein the fuel passageway comprises a plurality of fuel flow channels formed in an exterior surface of the insulator and circumferentially spaced apart from one another on the insulator.

11. The fuel injector of claim 7 wherein the dielectric insulator is a first dielectric insulator, and wherein the 1 wherein the injector further comprises a second dielectric insulator extending through a portion of the body coaxially and spaced apart from the first insulator.

12. The injector of claim 11 wherein fuel passageway is between the first insulator and the second insulator.

13. The fuel injector of claim 12 wherein the fuel passageway is generally parallel with a longitudinal axis of the body, and wherein the injector further comprises a plurality of injection ports at the nozzle portion that are fluidly coupled to the with the fuel passageway, and wherein the individual injection ports are generally non-parallel with the longitudinal axis of the body.

14. The fuel injector of claim 1, further comprising a magnetic pole piece carried by the base portion, wherein the pole piece is spaced apart from the valve when the valve is in the closed position.

15. The fuel injector of claim 14 wherein the force generator magnetizes the pole piece to move the first valve from the closed position to the open position.

16. The fuel injector of claim 14, further comprising a biasing member positioned between the pole piece and the valve, wherein the biasing member made from a non-magnetic material and urges the valve away from the pole piece.

17. The fuel injector of claim 1, further comprising an electrical conductor extending longitudinally through a central portion of the body, wherein the conductor is configured to be coupled to an ignition energy source.

18. The fuel injector of claim 17, further comprising an ignition feature carried by the nozzle portion and operably coupled to the conductor.

19. The fuel injector of claim 17, further comprising one or more optical fibers coaxially disposed in the conductor, wherein the one or more optical fibers are configured to detect one or more combustion chamber properties.

20. A fuel injector configured to inject fuel into a combustion chamber and to ignite the fuel in the combustion chamber, the fuel injector comprising:
    a body having a base portion opposite a nozzle portion, wherein the base portion receives fuel into the body and the nozzle portion can be positioned adjacent to the combustion chamber and wherein the body comprises dielectric material having crystallized grains that are aligned circumferentially and layered around the body;

a casing at the base portion at least partially housing a force generator, wherein the casing includes a fuel inlet and a fuel outlet, wherein the fuel inlet is configured to receive fuel from a fuel source and the fuel outlet is configured to allow fuel to exit the casing;

a fuel passageway fluidly coupled to the fuel outlet of the casing, the fuel passageway extending longitudinally through the body from the base portion to the nozzle portion;

a first valve proximate to the force generator, wherein the first valve is movable in response to actuation from the force generator to move between a closed position and an open position to allow fuel to pass from the fuel outlet into the fuel passageway; and a second valve at the nozzle portion, wherein the second valve is movable in response to a predetermined fuel pressure in the fuel passageway to move between a closed position and an open position to inject fuel into the combustion chamber.

* * * * *